(12) United States Patent
Okumura et al.

(10) Patent No.: US 8,295,332 B2
(45) Date of Patent: *Oct. 23, 2012

(54) CHANNEL ESTIMATION DEVICE AND METHOD, DEMODULATION DEVICE AND METHOD, AND FADING FREQUENCY DECISION DEVICE AND METHOD

(75) Inventors: Yukihiko Okumura, Kanagawa (JP);
Hidehiro Ando, Kanagawa (JP);
Masafumi Usuda, Kanagawa (JP);
Yoshihiro Ishikawa, Kanagawa (JP);
Seizo Onoe, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,035

(22) Filed: Feb. 23, 2011

(65) Prior Publication Data

US 2011/0142102 A1    Jun. 16, 2011

Related U.S. Application Data

(63) Continuation of application No. 09/701,705, filed as application No. PCT/JP00/02105 on Mar. 31, 2000, now Pat. No. 7,929,592.

(30) Foreign Application Priority Data

Apr. 2, 1999 (JP) .................................. 11-96804
Nov. 30, 1999 (JP) .................................. 11-340638
Mar. 23, 2000 (JP) .................................. 2000-82929

(51) Int. Cl.
*H04B 1/69* (2011.01)
*H04L 25/20* (2006.01)

(52) U.S. Cl. ......... 375/148; 375/149; 375/150; 375/343

(58) Field of Classification Search .................. 375/142, 375/148, 340, 347; 370/335, 480, 252
See application file for complete search history.

(56) References Cited

U.S. PATENT DOCUMENTS 5,305,349 A * 4/1994 Dent .............................. 370/209
(Continued)

FOREIGN PATENT DOCUMENTS

EP         0715440         6/1996
(Continued)

OTHER PUBLICATIONS

Sadayuki Abeta, et al., "The Performance of Channel Estimation Method Using Weighted Multi-Symbol Averaging (WMSA) with Pilot Channel in DS-CDMA", Technical Report of IEICE. RCS97-163, pp. 43-50, Nov. 1997.

(Continued)

*Primary Examiner* — David Ometz
*Assistant Examiner* — Qutbuddin Ghulamali
(74) *Attorney, Agent, or Firm* — Workman Nydegger

(57) ABSTRACT

In this invention, a channel estimation value of data symbols of a data channel is calculated by weighting and averaging pilot symbols in a parallel time multiplexing method. Also, a channel estimation value of data symbols during each data symbol interval is calculated by dividing data symbols in a slot into a plurality of data symbol intervals, selecting pilot symbols suitable for calculation of a channel estimation value of data symbols during each data symbol interval and weighting and averaging that pilot symbols. Also, a fading frequency is detected based on an inner product value of pilot symbols. Weighting factors are changed based on the detected fading frequency. Also, a channel estimation value is calculated by weighting and averaging pilot signals using a plurality of weighting sequences. The calculated channel estimation value is used to demodulate received data. The output data with the highest quality is selected by judging reliability of these plurality of demodulated data. It is also possible to select some weighting sequences based on the result of the reliability judgment of the demodulated data for predetermined period of time. In this case, after the selection, demodulation is performed by using these selected weighting sequences only.

10 Claims, 44 Drawing Sheets

U.S. PATENT DOCUMENTS

| | | | |
|---|---|---|---|
| 5,506,861 A * | 4/1996 | Bottomley | 370/441 |
| 5,519,730 A * | 5/1996 | Jasper et al. | 375/260 |
| 5,619,524 A | 4/1997 | Ling | |
| 5,666,352 A | 9/1997 | Ohgoshi | |
| 5,717,723 A * | 2/1998 | Hulbert | 375/340 |
| 5,737,327 A | 4/1998 | Ling et al. | |
| 5,768,307 A | 6/1998 | Schramm | |
| 5,809,089 A * | 9/1998 | Vasic | 375/341 |
| 5,815,515 A | 9/1998 | Dabiri | |
| 5,881,056 A | 3/1999 | Huang et al. | |
| 5,907,582 A * | 5/1999 | Yi | 375/259 |
| 5,920,817 A * | 7/1999 | Umeda et al. | 455/437 |
| 5,982,327 A * | 11/1999 | Vook et al. | 342/380 |
| 5,999,560 A * | 12/1999 | Ono | 375/148 |
| 6,070,086 A | 5/2000 | Dobrica | |
| 6,128,276 A | 10/2000 | Agee | |
| 6,137,788 A | 10/2000 | Sawahashi | |
| 6,151,353 A | 11/2000 | Harrison | |
| 6,219,559 B1 | 4/2001 | Hill | |
| 6,272,167 B1 | 8/2001 | Ono | |
| 6,295,311 B1 | 9/2001 | Sun | |
| 6,304,624 B1 | 10/2001 | Seki | |
| 6,304,750 B1 * | 10/2001 | Rashid-Farrokhi et al. | 455/137 |
| 6,307,850 B1 | 10/2001 | Watanabe | |
| 6,314,131 B1 | 11/2001 | Roe | |
| 6,327,310 B1 | 12/2001 | Hochwald | |
| 6,370,130 B1 | 4/2002 | Zhou | |
| 6,381,229 B1 | 4/2002 | Narvinger et al. | |
| 6,434,375 B1 | 8/2002 | Chulajata | |
| 6,452,959 B1 | 9/2002 | McDonough | |
| 6,456,647 B1 | 9/2002 | Banister | |
| 6,483,821 B1 * | 11/2002 | Dabak et al. | 370/329 |
| 6,487,236 B1 | 11/2002 | Iwamatsu | |
| 6,519,300 B1 | 2/2003 | Ramesh | |
| 6,647,003 B1 | 11/2003 | Abeta et al. | |
| 6,700,919 B1 | 3/2004 | Papasakellariou | |
| 6,842,442 B2 | 1/2005 | Okawa | |
| 6,892,053 B2 | 5/2005 | Engstrom | |
| 6,977,910 B1 | 12/2005 | Hosur | |
| 7,106,791 B2 | 9/2006 | Chen | |
| 7,149,240 B2 | 12/2006 | McDonough | |
| 2005/0054366 A1 | 3/2005 | Chen | |

FOREIGN PATENT DOCUMENTS

| | | |
|---|---|---|
| EP | 0776105 | 5/1997 |
| EP | 0955741 | 11/1999 |
| EP | 0963056 | 12/1999 |
| EP | 0963071 A1 | 12/1999 |
| JP | 04-070149 | 3/1992 |
| JP | 07-162360 | 6/1995 |
| JP | 07-162361 | 6/1995 |
| JP | 08-265184 | 10/1996 |
| JP | 09008770 | 1/1997 |
| JP | 09-298489 | 11/1997 |
| JP | 10051424 | 2/1998 |
| JP | 10190625 | 7/1998 |
| JP | 11068698 | 3/1999 |
| JP | 11186990 | 7/1999 |
| JP | 11284600 | 10/1999 |
| JP | 11284990 | 10/1999 |
| JP | 2000-049662 | 2/2000 |
| JP | 200059267 | 2/2000 |
| WO | WO98/47246 | 10/1998 |
| WO | WO 99/27672 | 6/1999 |
| WO | WO 99/31835 | 6/1999 |
| WO | WO 99/55033 | 10/1999 |

OTHER PUBLICATIONS

Seiichi Sampei and Terumi Sunaga, "Rayleigh Fading Compensation for QAM in Land Mobile Radio. Communicaitons", IEEE Trans. Vehicular Technol., vol. 42, No. 2, pp. 137-147, May 1993.

Seiichi Sampei, "Rayleigh Fading Compensation Method for 16 QAM MODEM in Digital Land Mobile Radio Systems", IEICE (Sect. B-II), vol. J72-B-II, No. 1, pp. 7-15, Jan. 1989.

Hidehiro Andoh, et al., "Channel Estimation Filter Using Time-Multiplexed Pilot Channel for Coherent RAKE Combining in DS-CDMA Mobile Radio", IEICE Trans. Commun., vol. E81-B, No. 7, pp. 1517-1526, Jul. 1998.

H. Andoh, et al., "Performance of Pilot Symbols-Assisted Coherent RAKE Receiver Using Weighted Multi-Slot Averaging for DS-CDMA Mobile Radio", Technical Report of IEICE. RCS97-74, pp. 63-68, Jul. 1997.

Sadayuki Abeta, et al., "Performance Comparision Between Time-Multiplexed Pilot Channel and Parallel Pilot Channel for Coherent Rake Combining in DS-CDMA Mobile Radio", IEICE Trans. Commun., vol. E81-B, No. 7, pp. 1417-1425, Jul. 1998.

Sadayuki Abeta, et al., "DS/CDMA Coherent Detection System with a Suppressed Pilot Channel", IEEE GLOBECOM '94, pp. 1622-1626, 1994.

Sadayuki Abeta, et al., "A Coherent Detection System with a Suppressed Pilot Channel for DS/CDMA Systems", IEICE (Sect. B-II), vol. J77-B-II, No. 11, pp. 641-648, Nov. 1994.

Sadayuki Abeta, et al., "Adaptive Channel Estimation for Coherent DS-CDMA Mobile Radio Using Time-Multiplexed Pilot and Parallel Pilot Structures", IEICE Trans. Commun., vol. E82-B, No. 9, pp. 1505-1513, Sep. 1999.

Sadayuki Abeta et al., "The Performance of Channel Estimation Method Using Adaptive Weighted Multi-Symbol Averaging (WMSA) With Pilot Channel in DS-CDMA", Technical Report of IEICE. SSE98-20 (RCS98-20) pp. 67-74, Apr. 1998.

Sadayuki Abeta, et al., DS-CDMA; The Performance of Channel Estimation Method Using Adaptive Weighted Multi-Symbol Averaging (WMSA) with Pilot Channel in DS-CDMA, NTT Mobile Communication Network Inc., p. 67 to 79, (Apr. 1998).

Yashuharu Amezawa, Shinishi Sato, and Takao Suzuki, "Evaluation of the Radio Channel Estimation Based on the Least Squares Method", 1994.

H. Andoh, K. Higuchi, K. Lkawa, M. Sawahashi, and F. Adachi, "Experiments on Pilot Symbol-Assisted Coherent Rake Receiver for W-CDMA Mobile Radio", p. 59-65, (Apr. 1998).

Official Notice of Rejection Parent Application No. 2003-277907 Case No. DCMH150269, Jun. 2, 2005.

Official Notice of Rejection Parent Application No. 2003-277908 Case No. DCMH150270, Jun. 3, 2005.

Masafumi Usuda, et al., "An Application and a Demodulation Scheme Using Parallel Channel Estimators in W-CDMA Systems", B-5-3 W-CDMA, p. 238, Sep. 1998.

Yoshi Honda, et al., "Channel Estimation Based on Time-Multiplexed Pilot Symbols", (Aug. 1996), p. 31-35.

Translation of Priority Documents and Declaration in Support Thereof, Translation of Japanese Patent Application No. 11-96804 filed Apr. 2, 1999.

Official Action for Japanese Patent Application No. 2005-336044 dated Jan. 27, 2009 (10 pages).

Andoh, H. Sawahashi, M. Adachi, F.; R&D Dept, NTT Mobile Commun. Network, Kanagawa, Japan; vol. 3; Sep. 1997; pp. 954-958; Personal, Indoor and Mobile Radio Communications; The 8th IEEE International Symosium on Publication.

Mark E. Rollings et al, "Error Performance Analysis of MSLE for Frequency-Selective Rayleigh Fading Channels with Kalman Channel Estimation", IEEE, International Conference on Communications, May 1, 1994, pp. 321-326.

Office Action dated Aug. 30, 2005 cited in U.S. Appl. No. 09/701,705.
Office Action dated Feb. 10, 2006 cited in U.S. Appl. No. 09/701,705.
Office Action dated Jul. 13, 2006 cited in U.S. Appl. No. 09/701,705.
Office Action dated Jan. 16, 2007 cited in U.S. Appl. No. 09/701,705.
Office Action dated Jun. 13, 2007 cited in U.S. Appl. No. 09/701,705.
Office Action dated Sep. 6, 2007 cited in U.S. Appl. No. 09/701,705.
Office Action dated Feb. 27, 2008 cited in U.S. Appl. No. 09/701,705.
Office Action dated Sep. 15, 2008 cited in U.S. Appl. No. 09/701,705.
Office Action dated May 27, 2009 cited in U.S. Appl. No. 09/701,705.
Office Action dated Dec. 10, 2009 cited in U.S. Appl. No. 09/701,705.
Office Action dated Jun. 9, 2010 cited in U.S. Appl. No. 09/701,705.
Notice of Allowance dated Dec. 16, 2010 cited in U.S. Appl. No. 09/701,705.
Office Action dated Feb. 28, 2006 cited in U.S. Appl. No. 11/194,217.
Office Action dated Oct. 17, 2006 cited in U.S. Appl. No. 11/194,217.
Office Action dated Apr. 4, 2007 cited in U.S. Appl. No. 11/194,217.
Notice of Allowance dated Jul. 24, 2007 cited in U.S. Appl. No. 11/194,217.

* cited by examiner

CHANNEL ESTIMATION DEVICE AND METHOD, DEMODULATION DEVICE AND METHOD, AND FADING FREQUENCY DECISION DEVICE AND METHOD

CROSS-REFERENCE TO RELATED APPLICATIONS

This is a continuation application of U.S. patent application Ser. No. 09/701,705, filed Dec. 1, 2000, which is incorporated herein by reference in its entirety. That application claims priority to International Application PCT/JP00/02105 filed Mar. 31, 2000, which incorporates by reference application patent application Ser. Nos. 11/96,804, filed Apr. 2, 1999, 11/340,638 filed Nov. 30, 1999, and 2000/82929 filed Mar. 23, 2000, all of which filed in Japan.

BACKGROUND OF THE INVENTION

1. The Field of the Invention

The present invention relates to a channel estimation device and method, a demodulation device and method, and a fading frequency decision device and method. More specifically, the present invention relates to a channel estimation device, a demodulation device, or the like that is applicable to a mobile communication method for transmitting sounds and data in a fast fading environment. In addition, the present invention relates to a demodulation device and method in conformity with the CDMA method which carries out multidimensional connections by diffusing data to signals over a broad band using a diffusion code operating at a rate higher than a data rate.

2. The Relevant Technology

In a mobile communication environment, the amplitude or phase varies due to Rayleigh fading associated with movement of the relative locations of a mobile station and a ground station. According to the phase modulation method for transmitting information using a carrier phase, differential coding is generally used to load information on relative phases of a preceding and a following symbols, and a receiver carries out delayed detection to identify and determine the information data. This delayed detection, however, differentially codes the transmitted data as described above, whereby one-bit error within a wireless section corresponds to a two-bit error in the information data. Thus, at the same signal power to interference/noise power ratio (SNIR), the two-phase phase modulation method (BPSK modulation) has a higher reception error rate than synchronous detection by 3 dB.

In addition, absolute synchronous detection that identifies and determines an absolute phase of a received signal for each symbol has an efficient reception characteristic, but it is difficult to determine the absolute phase in a Rayleigh fading environment.

To solve this problem, a method has been proposed which inserts pilot symbols between data symbols so as to use these pilot symbols to estimate a channel for the data symbols. One of the methods for inserting pilot symbols, for example, time-multiplexes data symbols and pilot symbols into one channel (time multiplexing method; FIG. 16). Documents 1 to 3, which will be cited below, propose channel estimation methods using this time multiplexing method.

The document 1 (Electronic Information Communication Society Journal Vol. J72-B-11, No. 1, pp. 7 to 15, January 1989, SANPEI "Land Mobile Communication 16QAM Fading Distortion Compensation") proposes a method for solving the above problem by estimating and compensating for fading distortion using pilot symbols inserted between data symbols (information symbols) at a fixed cycle and the phases of which are known. This method inserts the pilot symbols into a communication channel at the rate of one pilot symbol per several data symbols to estimate a transmission path based on received phases of the pilot symbols. Signals received during each pass of each transmitter are measured at pilot symbols before and after a desired data symbol section for amplitude and phase, and the measured values are interpolated to estimate and compensate for transmission path variations within the data symbol section.

Document 2 (Electronic Information Communication Society Technical Report RCS97-74, ANDO at el. "RAKE Reception Using the Multislot Weighted Averaging Channel Estimation Method with Pilot Symbols in DS-CDMA") proposes a method for carrying out more accurate channel estimation using more pilot symbols. A channel for data symbols is estimated using pilot symbols inserted between data symbols at a fixed cycle. Specifically, pilot symbols (estimated complex fading envelope) in a plurality of slots before and after a slot for which a channel is estimated are averaged (in-phase addition), and the average value is subjected to weighted averaging using a weighting factor to obtain a channel estimated value. The channel estimation accuracy is thereby improved to prevent thermal noise or multipass interference and interference from other stations.

Document 3 (Electronic Information Communication Society Technical Report RCS98-20, ABETA at el. "Characteristics of the DC-CDMA Adaptive Plural Symbol Weighted Averaging Pilot Channel Transmission Path Estimation Method") proposes a method of adaptively controlling a weighting factor to reduce the effects of thermal noise while improving the capability of following fading variations. According to this method, channel estimation involves weighted averaging, and this weighting factor is sequentially varied using an adaptive signal to determine an optimal weighting factor.

The pilot symbol insertion methods include not only the time multiplexing method but also a parallel time multiplexing method (FIG. 1) and a parallel method (FIG. 22) that time-multiplex pilot symbols into a control channel parallel-multiplexed for a data channel.

For the parallel time multiplexing method, it is desirable to execute accurate channel estimation by subjecting the pilot symbols to weighted averaging to calculate a channel estimated value for the data symbols in the data channel.

In addition, according to the methods in Documents 1 to 3, channel variations within each slot are assumed to be small, and the same pilot symbol is used for all the data symbols within one slot to obtain the same channel estimated value. Consequently, the characteristics are disadvantageously degraded during fast fading.

Further, the method in the Document 2 provides a fixed weighting factor, and when the weighting factor for slots temporally remote from a desired slot is increased to reduce the effects of thermal noise, the capability of following fading variations is disadvantageously degraded, thereby causing the channel estimation accuracy to be degraded. Another problem of the method in the Document 3 is that despite the solution of the problem of the Document 2, the use of the adaptive signal process may make the configuration of a demodulation device complicated.

In the mobile communication environment, the amplitude or phase varies due to Rayleigh fading associated with movement of the relative locations of a mobile station and a ground station. The synchronous detection process using pilot signals is known as a method for compensating for the variations of the amplitude or phase to effectively synthesize multiple passes.

According to this method, a transmitter transmits a known pilot signal, while a receiver demodulates and temporally averages this pilot signal to estimate a channel. Then, the estimated channel vector is used to correct a phase of a data signal, which is then subjected to RAKE synthesis, thereby achieving demodulation using power of the received signal.

Since the channel estimation accuracy directly affects data quality, averaging must be carried out using appropriate temporal sections and an appropriate weight sequence. One sequence that improves the channel estimation accuracy is conventionally used as the weight sequence.

When the receiver estimates a channel, the channel estimation accuracy can be improved to enable high-quality communication, by using an appropriate weight sequence to average pilot signals. The appropriate weight sequence, however, depends on propagation conditions, principally, the movement speed, as described above.

That is, at a lower movement speed, channel variations occur at a lower speed, so that a weight sequence that increases the averaging time is effective, whereas at a higher movement speed, fast channel variations must be followed, so that a weight sequence that reduces the averaging time to some degree is effective.

However, the known channel estimation method using only the one weight sequence fails to enable averaging suitable for every movement speed, resulting in degradation of communication quality, an increase in transmission power required, a decrease in communication capacity achieved.

In addition, methods for varying the weight sequence depending on the movement speed include a method of detecting the movement speed to vary the weight sequence depending on the detected speed. A problem of this method, however, is that if the speed detection accuracy or the detection following capability is degraded, improvement of communication quality, a reduction in transmission power required, and an increase in capacity cannot be realized.

BRIEF SUMMARY OF THE INVENTION

It is an object of the present invention to carry out accurate channel estimation in the parallel time multiplexing method by subjecting pilot symbols to weighted averaging to calculate a channel estimated value for data symbols in a data channel.

It is another object of the present invention to carry out accurate channel estimation by dividing data symbols within a slot into a plurality of data symbol sections, selecting pilot symbols appropriate for calculation of a channel estimated value for data symbols within each of the data symbol sections, and subjecting the pilot symbols to weighted averaging to calculate the channel estimated value for the data symbols in each data symbol section.

It is yet another object of the present invention to decide a fading frequency based on an inner product value of the pilot symbols. It is still another object of the present invention to realize channel estimation optimal for the fading frequency using a simpler configuration.

It is still another object of the present invention to directly determine from reception quality, weight sequences effective on various movement speeds for use, thereby improving communication quality, reducing the amount of transmission power required, and increasing the communication capacity.

According to the invention as claimed in claim 1, a fading frequency decision device comprises:

inner product value calculating means for calculating an inner product value of pilot symbols, which are time multiplexed with a control channel, which is parallel multiplexed with a data channel; and decision means for deciding a fading frequency based on the inner product value calculated by the inner product value calculating means.

According to the invention as claimed in claim 2, in the fading frequency decision device as claimed in claim 1, the inner product value calculating means comprises:
normalizing means for normalizing mean values of the pilot symbols in each of two slots of the control channel;
inner product value calculation executing means for calculating an inner product value of the mean values of the two pilot symbols normalized by the normalizing means; and
inner product value averaging means for averaging inner product values calculated by the inner product value calculation executing means over a plurality of slots of the control channel, and
the decision means comprises
decision executing means for deciding the fading frequency by comparing the inner product value averaged by the inner product value averaging means and a threshold value.

According to the invention as claimed in claim 3, in the fading frequency decision device as claimed in claim 2, when the inner product value averaged by the inner product value averaging means is larger than a certain constant value, the fading frequency decision device performs the normalizing, the inner product value calculation, and the inner product value averaging on mean values of the pilot symbols in each of two slots having a farther interval in the control channel, and decides the fading frequency by comparing the averaged inner product value so obtained and a threshold value corresponding to the farther interval.

According to the invention as claimed in claim 4, in the fading frequency decision device as claimed in claim 1, the inner product value calculating means comprises:
normalizing means for normalizing the mean values of the pilot symbols in each of two slots of the control channel with respect to each of multipath signals to be used for RAKE combining;
inner product value calculation executing means for calculating the inner product value of the mean values of the two pilot symbols normalized by the normalizing means with respect to each of the multipath signals;
first inner product value averaging means for averaging the inner product values of each of the multipath signals calculated by the inner product value calculation executing means; and
second inner product value averaging means for averaging the inner product values averaged by the first inner product value averaging means over a plurality of slots of the control channel, and
the decision means comprises
decision executing means for deciding the fading frequency by comparing the inner product value averaged by the second inner product value averaging means and a threshold value.

According to the invention as claimed in claim 5, in the fading frequency decision device as claimed in claim 4, when the inner product value averaged by the second inner product value averaging means is larger than a certain constant value, the fading frequency decision device performs the normalizing, the inner product value calculation, averaging of the inner product values of each of the multipath signals, and averaging of the inner product values over the plurality of slots on the mean values of the pilot symbols in each of two slots having a farther interval in the control channel, and decides the fading frequency by comparing the averaged inner product value so obtained and a threshold value corresponding to the farther interval.

According to the invention as claimed in claim 6, in the fading frequency decision device as claimed in claim 1, the inner product value calculating means comprises:

normalizing means for normalizing the mean values of the pilot symbols in each of two slots in the control channel;

inner product value calculation executing means for calculating the inner product value of the mean values of the two pilot symbols normalized by the normalizing means for two or more cases with varying inner product measuring interval; and inner product value averaging means for averaging the inner product value calculated by the inner product value calculation executing means over a plurality of slots of the control channel with respect to each of the inner product measuring intervals, and the decision means comprises decision executing means for deciding the fading frequency using the inner product value for each of the inner product measuring intervals averaged by the inner product value averaging means.

According to the invention as claimed in claim 7, in the fading frequency decision device as claimed in claim 6, further comprising difference calculating means for calculating the difference of the inner product values for two inner product measuring intervals averaged by the inner product value averaging means, wherein the decision executing means decides the fading frequency using also the difference calculated by the difference calculating means.

According to the invention as claimed in claim 8, in the fading frequency decision device as claimed in claim 1, the inner product value calculating means comprises:

normalizing means for normalizing mean values of the pilot symbols in each of two slots in the control channel with respect to each of multipath signals to be used for RAKE combining;

inner product value calculation executing means for calculating the inner product value of the mean values of the two pilot symbols normalized by the normalizing means for two or more cases with varying inner product measuring interval with respect to each of the multipath signals;

first inner product value averaging means for averaging the inner product values of each of the multipath signals calculated by the inner product value calculation executing means with respect to each of the inner product measuring intervals; and second inner product value averaging means for averaging the inner product values averaged by the first inner product value averaging means over a plurality of slots of the control channel with respect to each of the inner product measuring intervals, and the decision means comprises decision executing means for deciding the fading frequency using the inner product value for each of the inner product measuring intervals averaged by the second inner product value averaging means.

According to the invention as claimed in claim 9, the fading frequency decision device as claimed in claim 8, further comprises difference calculating means for calculating the difference of the inner product values for two inner product measuring intervals averaged by the second inner product value averaging means, wherein the decision executing means decides the fading frequency using also the difference calculated by the difference calculating means.

According to the invention as claimed in claim 10, a fading frequency decision device comprises:

inner product value calculating means for calculating an inner product value of pilot symbols in a channel in which data symbols and the pilot symbols are time multiplexed; and decision means for deciding a fading frequency based on the inner product value calculated by the inner product value calculating means.

According to the invention as claimed in claim 11, in the fading frequency decision device as claimed in claim 10, the inner product value calculating means comprises:

normalizing means for normalizing mean values of the pilot symbols in each of two slots of the channel;

inner product value calculation executing means for calculating the inner product value of the mean values of the two pilot symbols normalized by the normalizing means; and inner product value averaging means for averaging the inner product values calculated by the inner product value calculation executing means over a plurality of slots of the channel, and the decision means comprises decision executing means for deciding the fading frequency by comparing the inner product value averaged by the inner product value averaging means and a threshold value.

According to the invention as claimed in claim 12, in the fading frequency decision device as clamed in claim 11, when the inner product value averaged by the inner product value averaging means is larger than a certain constant value, the fading frequency decision device performs the normalizing, the inner product value calculation, and the inner product value averaging on mean values of the pilot symbols in each of two slots having a farther interval in the control channel, and decides the fading frequency by comparing the averaged inner product value so obtained and a threshold value corresponding to the farther interval.

According to the invention as claimed in claim 13, in the fading frequency decision device as claimed in claim 10, the inner product value calculating means comprises:

normalizing means for normalizing mean values of the pilot symbols in each of two slots of the control channel with respect to each of multipath signals to be used for RAKE combining;

inner product value calculation executing means for calculating the inner product value of the mean values of the two pilot symbols normalized by the normalizing means with respect to each of the multipath signals;

first inner product value averaging means for averaging the inner product values of each of the multipath signals calculated by the inner product value calculation executing means; and second inner product value averaging means for averaging the inner product values averaged by the first inner product value averaging means over a plurality of slots of the channel, and the decision means comprises decision executing means for deciding the fading frequency by comparing the inner product value averaged by the second inner product value averaging means and a threshold value.

According to the invention as claimed in claim 14, in the fading frequency decision device as claimed in claim 13, when the inner product value averaged by the second inner product value averaging means is larger than a certain constant value, the fading frequency decision device performs the normalizing, the inner product value calculation, averaging of the inner product values of each of the multipath signals, and averaging of the inner product values over the plurality of slots on the mean values of the pilot symbols in each of two slots having a farther interval in the control channel, and decides the fading frequency by comparing the averaged inner product value so obtained and a threshold value corresponding to the farther interval.

According to the invention as claimed in claim 15, in the fading frequency decision device as claimed in claim 10,
the inner product value calculating means comprises:
normalizing means for normalizing the mean values of the pilot symbols in each of two slots of the channel;
inner product value calculation executing means for calculating the inner product value of the mean values of the two pilot symbols normalized by the normalizing means for two or more cases with varying inner product measuring interval; and
inner product value averaging means for averaging the inner product values calculated by the inner product value calculation executing means over a plurality of slots of the control channel with respect to each of the inner product measuring intervals, and
the decision means comprises
decision executing means for deciding the fading frequency using the inner product value for each of the inner product measuring intervals averaged by the inner product value averaging means.

According to the invention as claimed in claim 16, the fading frequency decision device as claimed in claim 15, further comprises difference calculating means for calculating the difference of the inner product values for two inner product measuring intervals averaged by the inner product value averaging means, wherein the decision executing means decides the fading frequency also using the difference calculated by the difference calculating means.

According to the invention as claimed in claim 17, in the fading frequency decision device as claimed in claim 10,
the inner product value calculating means comprises:
normalizing means for normalizing mean values of the pilot symbols in each of two slots of the channel with respect to each of multipath signals to be used for RAKE combination;
inner product value calculation executing means for calculating the inner product value of the mean values of two pilot symbols normalized by the normalizing means for two or more cases with varying inner product measuring interval with respect to each of the multipath signals;
first inner product value averaging means for averaging the inner product value of each of the multipath signals calculated by the inner product value calculation executing means with respect to each of the inner product measuring intervals; and
second inner product value averaging means for averaging the inner product values averaged by the first inner product value averaging means over a plurality of slots of the control channel with respect to each of the inner product measuring intervals, and
the decision means comprises
decision executing means for deciding the fading frequency using the inner product value for each of the inner product measuring intervals averaged by the second inner product value averaging means.

According to the invention as claimed in claim 18, in the fading frequency decision device as claimed in claim 17, further comprising difference calculating means for calculating the difference of the inner product values for two inner product measuring intervals averaged by the second inner product value averaging means, wherein the decision executing means decides the fading frequency also using the difference calculated by the difference calculating means.

According to the invention as claimed in claim 19, a fading frequency decision device comprises:
inner product value calculating means for calculating an inner product value of pilot symbols in a pilot channel which is parallel multiplexed with a data channel; and
decision means for deciding a fading frequency based on the inner product value calculated by the inner product value calculating means.

According to the invention as claimed in claim 20, in the fading frequency decision device as claimed in claim 19,
the inner product value calculating means comprises:
normalizing means for normalizing the mean value of the pilot symbols in each of two sections of the pilot channel;
inner product value calculation executing means for calculating an inner product value of mean values of the two pilot symbols normalized by the normalizing means; and
inner product value averaging means for averaging the inner product values calculated by the inner product value calculation executing means over a plurality of sections of the channel, and
the decision means comprises
decision executing means for deciding the fading frequency by comparing the inner product value averaged by the inner product value averaging means and a threshold value.

According to the invention as claimed in claim 21, in the fading frequency decision device as claimed in claim 20, when the inner product value averaged by the inner product value averaging means is larger than a certain constant value, the frequency decision device performs the normalizing, the inner product value calculation, and the averaging of the inner product values with respect to the mean values of the pilot symbols in each of two sections having a farther interval in the pilot channel, and decides the fading frequency by comparing the averaged inner product value so obtained and a threshold value corresponding to the farther interval.

According to the invention as claimed in claim 22, in the fading frequency decision device as claimed in claim 19,
the inner product value calculating means comprises:
normalizing means for normalizing the mean values of the pilot symbols in each of the two sections of the pilot channel with respect to each of multipath signals to be used for RAKE combining;
inner product value calculation executing means for calculating the inner product value of the mean values of the two pilot symbols normalized by the normalizing means with respect to each of the multipath signals;
first inner product value averaging means for averaging the inner product values of respective paths of the multipath calculated by the inner product value calculation executing means; and
second inner product value averaging means for averaging the inner product values averaged by the first inner product value averaging means over a plurality of sections of the pilot channel, and the decision means comprises
  decision executing means for deciding the fading frequency by comparing the inner product value averaged by the second inner product value averaging means and a threshold value.

According to the invention as claimed in claim 23, in the fading frequency decision device as claimed in claim 22, when the inner product value averaged by the second inner product value averaging means is larger than a certain constant value, the fading frequency decision device performs the normalizing, the inner product value calculation, averaging of the inner product values of each of the multipath signals, and averaging of the inner product values over the plurality of sections with respect to the mean values of the pilot symbols in each of two sections having a farther interval in the pilot channel, and decides the fading frequency by comparing the averaged inner product value so obtained and a threshold value corresponding to the farther interval.

According to the invention as claimed in claim 24, in the fading frequency decision device as claimed in claim 19,
  the inner product value calculating means comprises:
    normalizing means for normalizing the mean values of the pilot symbols in each of the two sections of the pilot channel;
    inner product value calculation executing means for calculating the inner product value of the mean values of the two pilot symbols normalized by the normalizing means for two or more cases with varying inner product measuring interval; and
    inner product value averaging means for averaging the inner product vales calculated by the inner product value calculation executing means over a plurality of sections of the control channel with respect to each of the inner product measuring intervals, and
  the decision means comprises
    fading frequency decision means for deciding the fading frequency using the inner product value for each of the inner product measuring intervals averaged by the inner product value averaging means.

According to the invention as claimed in claim 25, in the fading frequency decision device as claimed in claim 24, further comprising difference calculating means for calculating the difference of the inner product values for the two inner product measuring intervals averaged by the inner product value averaging means, wherein the decision executing means decides the fading frequency using also the difference calculated by the difference calculating means.

According to the invention as claimed in claim 26, in the fading frequency decision device as claimed in claim 19,
  the inner product value calculating means comprises:
    normalizing means for normalizing the mean values of the pilot symbols in each of the two sections of the pilot channel with respect to each of multipath signals to be used for RAKE combining;
    inner product value calculation executing means for calculating the inner product value of the mean values of the two pilot symbols normalized by the normalizing means for two or more cases with varying inner product measuring interval with respect to each of the multipath signals;
    first inner product value averaging means for averaging the inner product value for each path of the multipath calculated by the inner product value calculation executing means with respect to each of the inner product measuring intervals; and
    second inner product value averaging means for averaging the inner product values averaged by the first inner product value averaging means for a plurality of sections of the control channel with respect to each of the inner product measuring intervals, and
  the decision means comprises
    decision executing means for deciding the fading frequency using the inner product value for each of the inner product measuring intervals averaged by the second inner product value averaging means.

According to the invention as claimed in claim 27, the fading frequency decision device as claimed in claim 26, further comprises difference calculating means for calculating the difference of the inner product values for two inner product intervals averaged by the second inner product value averaging means, wherein the decision executing means decides the fading frequency also using the difference calculated by the difference calculating means.

According to the invention as claimed in claim 28, a method for deciding the fading frequency, comprises the steps of:
  calculating an inner product value of pilot symbols being time multiplexed in a control channel that was parallel multiplexed together with a data channel; and
  deciding the fading frequency based on the inner product value.

According to the invention as claimed in claim 29, a method for deciding the fading frequency, comprises the step of:
  calculating an inner product value of pilot symbols in a channel in which data symbols and pilot symbols are time multiplexed; and
  deciding the fading frequency based on the inner product value.

According to the invention as claimed in claim 30, in a method for deciding the fading frequency, the fading frequency is decided based on an inner product value of pilot symbols of a pilot channel that was parallel multiplexed together with a data channel.

With the above configuration, accurate channel estimation can be carried out in the parallel time multiplexing method by subjecting pilot symbols to weighted averaging to calculate a channel estimated value for data symbols in a data channel.

In addition, accurate channel estimation can be carried out by dividing data symbols within a slot into a plurality of data symbol sections, selecting pilot symbols appropriate for calculation of a channel estimated value for data symbols within each of the data symbol sections, and subjecting the pilot symbols to weighted averaging to calculate the channel estimated value for the data symbols in each data symbol section.

Further, a fading frequency can be decided based on an inner product value of the pilot symbols. In addition, channel estimation optimal for the fading frequency can be realized using a simpler configuration.

In addition, with the above configuration of the present invention, by preparing a plurality of weight sequences ranging from one that becomes effective at a lower movement speed for increasing the averaging time to some degree to one that becomes effective at a higher movement speed for reducing the averaging time to some degree and using all of the plural weight sequences constantly or at fixed time intervals to execute demodulation processing in parallel, a weight sequence effective on various movement speeds can be directly determined from reception quality for use, thereby improving communication quality, reducing the amount of transmission power required, and increasing the communication capacity.

It is possible to use weighting sequences which are adapted to various movement speeds to perform channel estimation with high accuracy by performing channel estimation using a plurality of weighting factors constantly and selecting data sequence and weighting factors with high reliability by reliability judgment using received data sequence.

Further, by periodically selecting a small number of weight factors and using only the selected weight factors for channel estimation within a fixed period of time, loads on the system can be diminished.

In addition, weight sequences effective on various movement speeds are directly determined from reception quality for use, thereby enabling improvement of communication quality, a reduction in transmission power required, and an increase in communication capacity achieved.

The above and other objects, effects, features, and advantages of the present invention will become more apparent from the following description of embodiments thereof taken in conjunction with the accompanying drawings.

BRIEF DESCRIPTION OF THE DRAWINGS

FIG. 13 is a diagram showing relationship between FIGS. 13A and 13B;

FIG. 30 is a diagram showing relationship between FIGS. 30A and 30B;

FIG. 31 is a diagram showing relationship between FIGS. 31A and 31B;

FIG. 36 is a diagram showing relationship between FIGS. 36A and 36B;

FIG. 37 is a diagram showing relationship between FIGS. 37A and 37B;

BEST MODE FOR CARRYING OUT THE INVENTION

The best mode for carrying out the invention will now be described with reference to the accompanying drawings.

First Embodiment

Figure 1:
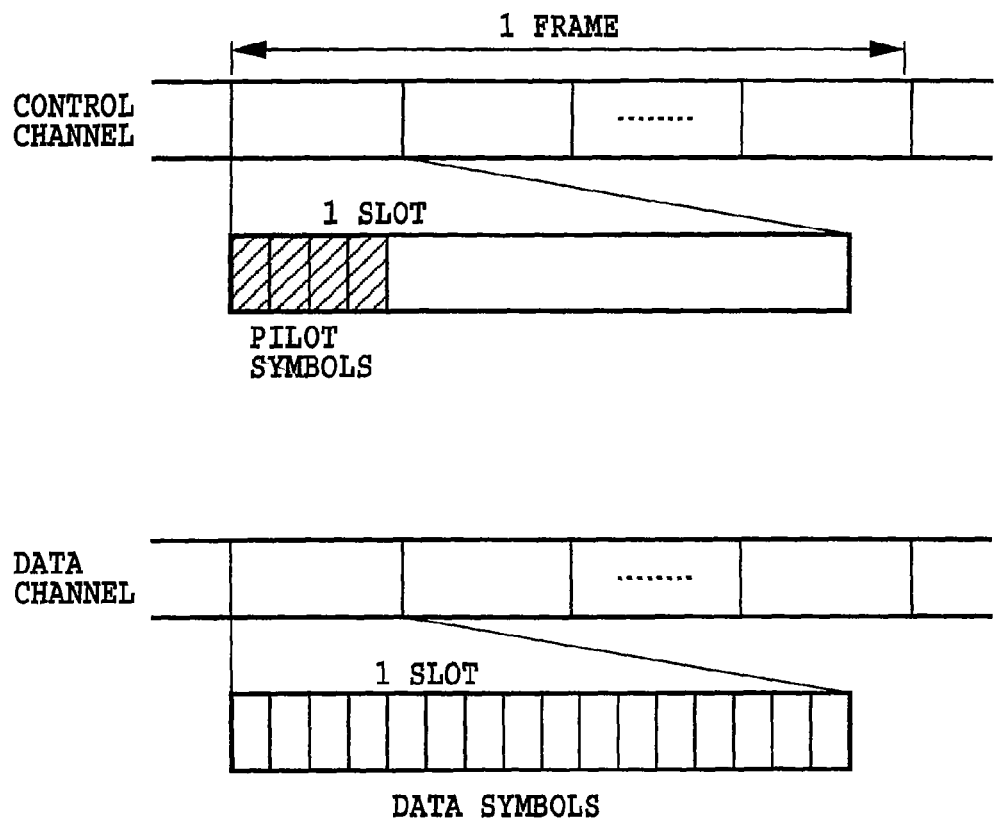
FIG. 1 is a view showing an exemplified configuration of a frame structure of a signal received by a demodulation device according to a first embodiment of the present invention.

FIG. 1 is a view showing an exemplified configuration of a frame structure of a signal received by a demodulation device according to a first embodiment of the present invention. The demodulation device according to the present invention receives and demodulates signals on a data channel and a control channel that is parallel multiplexed with the data channel. The control channel carries time-multiplexed pilot symbols of a known transmission pattern (of which phase is known, for example, when phase modulation is the primary one). This is called a parallel time multiplexing technique. The received signal (phase and amplitude) at the pilot symbol is used as a reference signal to estimate channel fluctuations of data symbols on the data channel.

Figure 2:
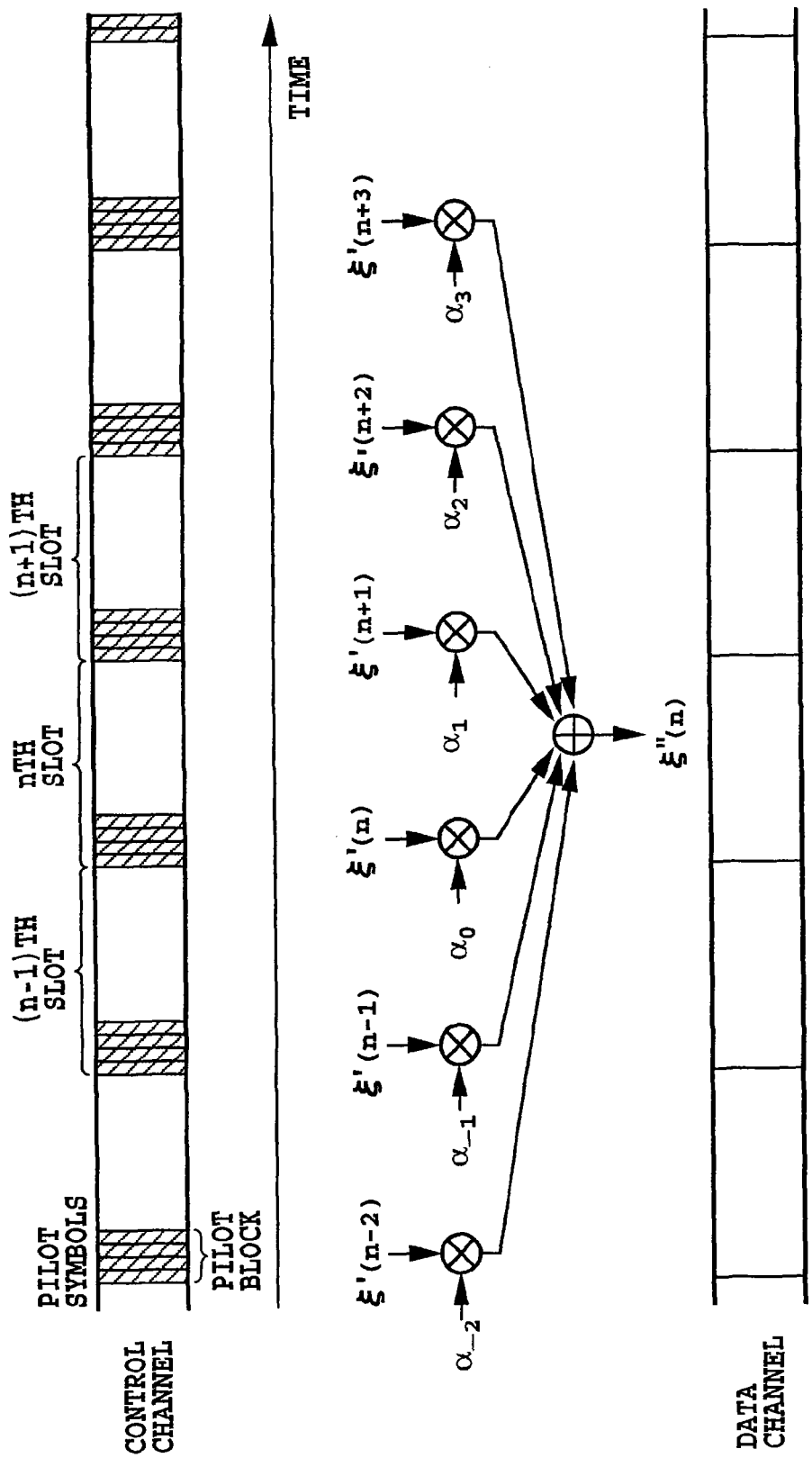
FIG. 2 is a view for use in describing how the demodulation device according to the first embodiment of the present invention estimates channels.

FIG. 2 is a view for use in describing how the demodulation device according to the first embodiment of the present invention estimates channels. The pilot symbols are used for the channel estimation. More specifically, the pilot symbols (estimated complex fading envelopes) ξ are subjected to coherent combination to take an average value thereof in two or more slots. A weighted sum of the average values ξ' are then taken with, for example, weighting factors $\alpha_0$, $\alpha_1$ to thereby calculate a channel estimation value ξ".

FIG. 2 is for the calculation of the channel estimation value ξ"(n) for the data symbols in the nth slot with the channel estimation values of from ξ'(n−2) to ξ'(n+3). The channel estimation value ξ'(n−2) is obtained from the average of the pilot symbols in the (n−2)th pilot blocks that is formed of all pilot symbols in the (n−2)th slot. The channel estimation value ξ'(n+3) is the one for the (n+3)th pilot block. The calculation in FIG. 2 is carried out as follows:

$$\xi''(n) = \sum_{i=-2}^{3} \alpha_i \cdot \xi'(n+1) \quad (1)$$

With many pilot symbols belonging to different slots enables highly accurate channel estimation. This is because in an actual mobile propagation environment, interference signals generated due to thermal noise (the noise affects much particularly at cell edges to minimize the transmission power), and by cross-correlation from other users, are added to the desired signal of the current channel, and the channel estimation accuracy is degraded because of the phase and the amplitude of the received signal that vary at every moment due to fading. For the cases where the transmission power is controlled for each slot, the pilot symbols in different slots have different power. However, the channel estimation error due to the power difference is less than the reduction effect by the thermal noise and interference signals caused from using pilot symbols in more slots.

Figure 3:
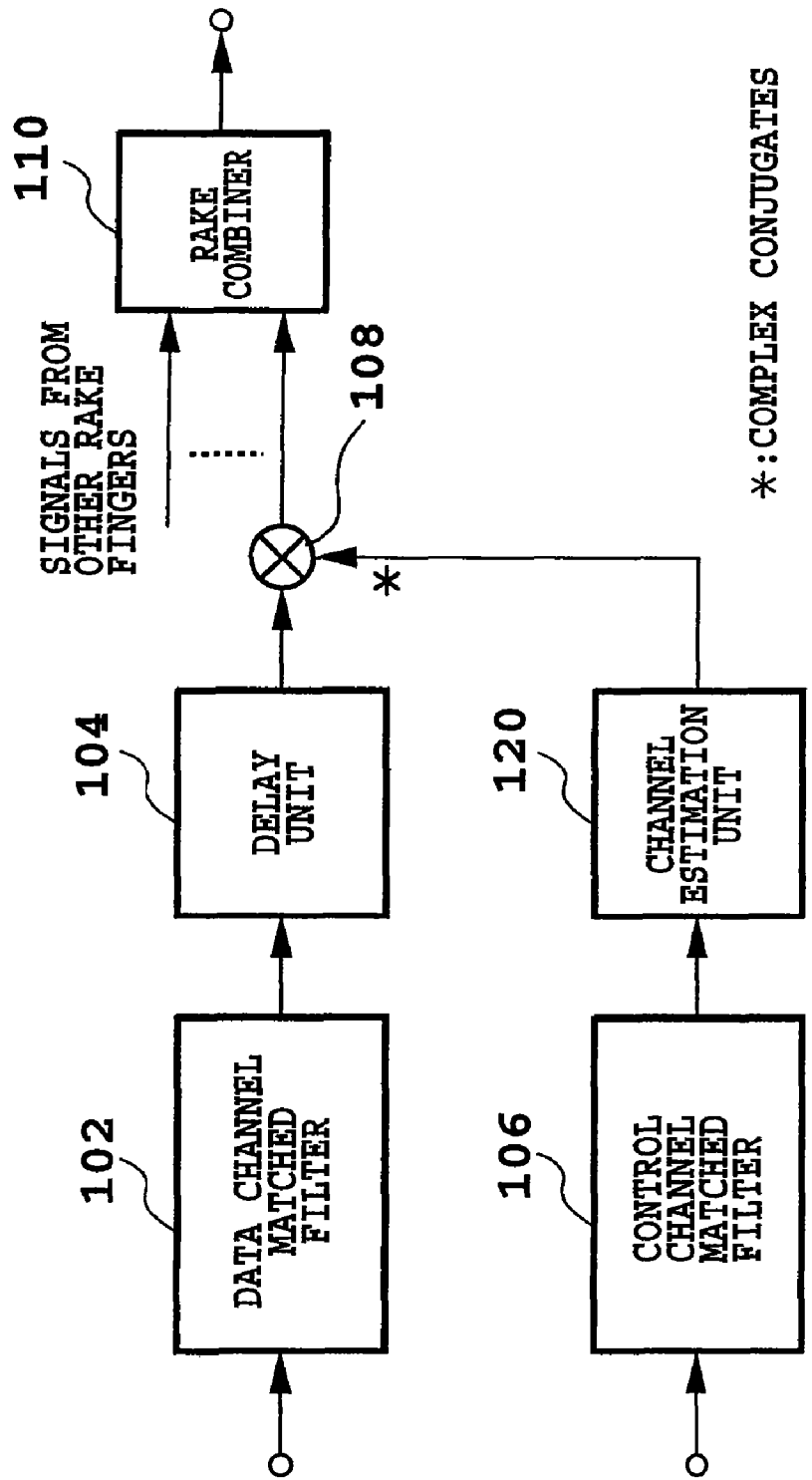
FIG. 3 is a block diagram showing a configuration of a demodulation device according to the first embodiment.

FIG. 3 is a block diagram showing a configuration of a demodulation device according to this embodiment. The demodulation device of this embodiment comprises a data channel matched filter 102, a delay unit 104, a control channel matched filter 106, a channel estimation unit 120, a multiplication unit 108, and a RAKE combiner 110. The demodulation device according to this embodiment is based on the code division multiple access (CDMA) architecture. However, it is apparent that the present invention may be applied to demodulation devices based on other architectures including the time division multiple access (TDMA) and the frequency division multiple access (FDMA).

Figure 4:
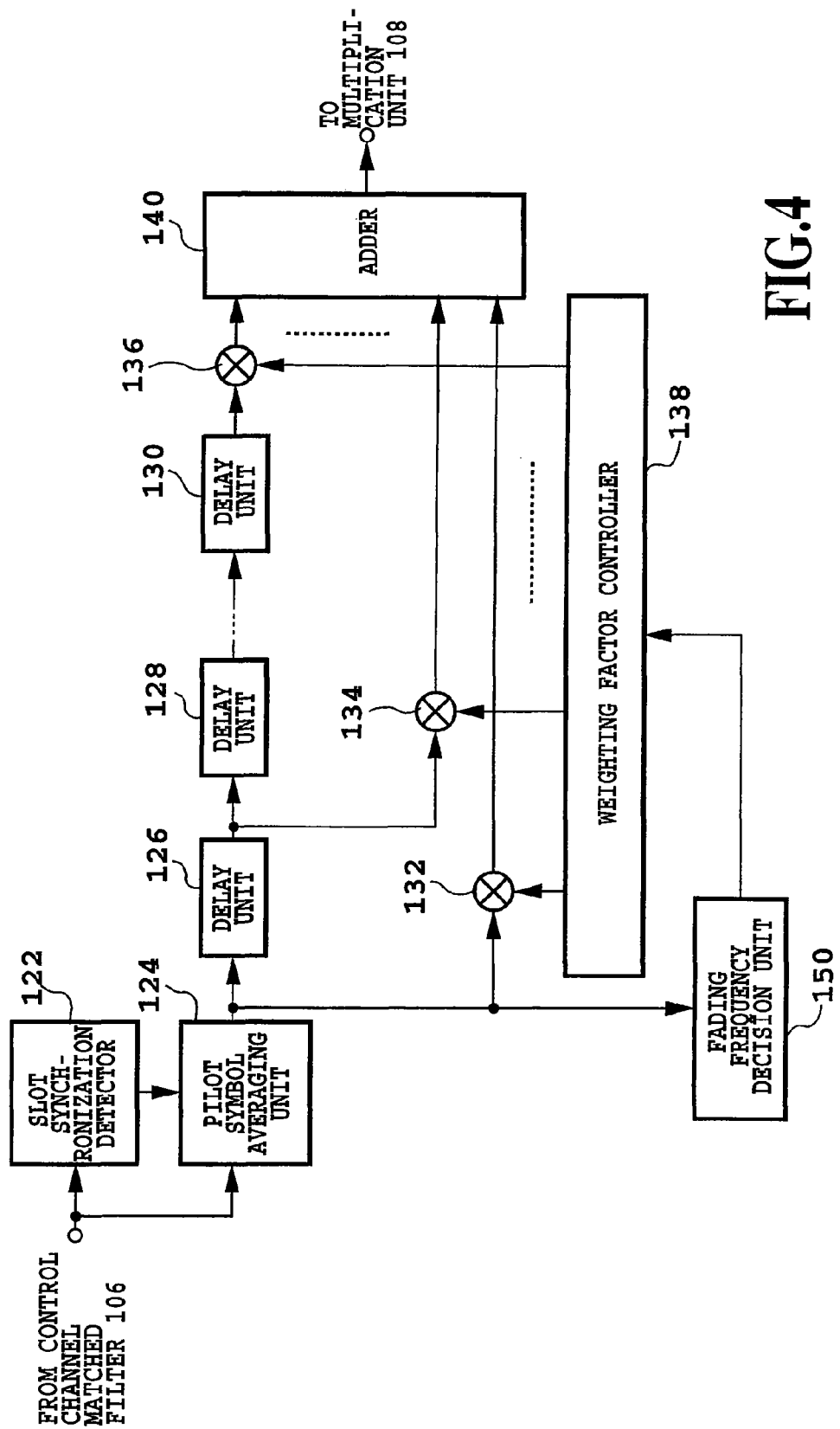
FIG. 4 is a block diagram showing a configuration of the channel estimation unit according to the first embodiment.

FIG. 4 is a block diagram showing a configuration of the channel estimation unit according to this embodiment. The channel estimation unit 120 of this embodiment comprises a slot synchronization detector 122, a pilot symbol averaging unit 124, delay units 126, 128, and 130, multiplication units 132, 134, and 136, a weighting factor controller 138, an adder 140, and a fading frequency decision unit 150. The channel estimation unit 120 may be implemented in the form of hardware. Alternatively, it may be implemented in the form of software with, for example, a digital signal processor (DSP).

Figure 5:
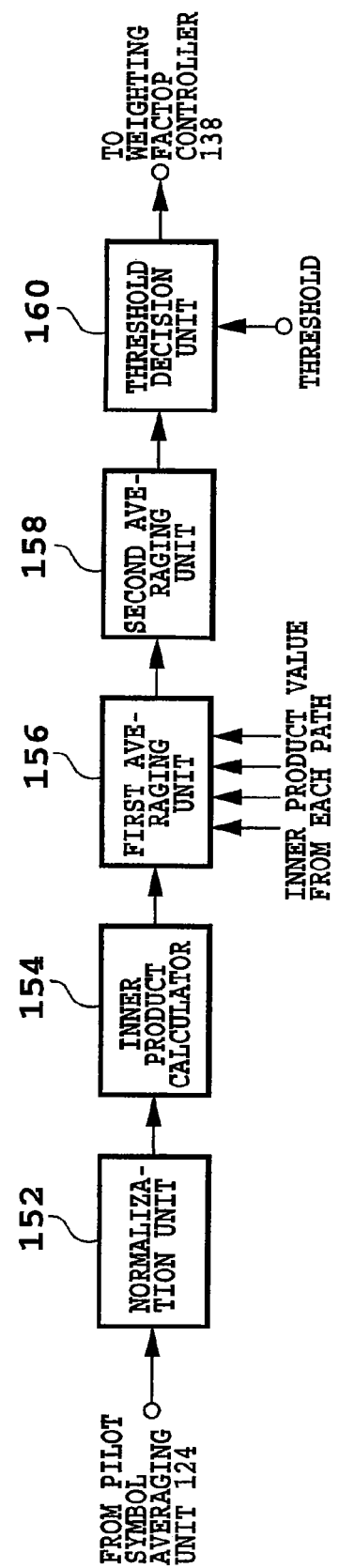
FIG. 5 is a block diagram showing a configuration of a fading frequency decision unit according to the first embodiment.

FIG. 5 is a block diagram showing a configuration of a fading frequency decision unit according to this embodiment. The fading frequency decision unit 150 of this embodiment comprises a normalization unit 152, an inner product calculator 154, a first averaging unit 156, a second averaging unit 158, and a threshold decision unit 160.

An operation of the demodulation device according to this embodiment is now described with reference to FIGS. 3 through 5. The data channel matched filter 102 despreads a received spread signal on the data channel with a spread code replica depending on the timing of the multiple path reception by the individual users. The control channel matched filter 106 despreads a received spread signal on the control channel with the spread code replica depending on the timing of the multiple path reception by the individual users. The slot (pilot block) synchronization detector 122 in the channel estimation unit 120 detects the position of the pilot symbols on the control channel. The pilot symbol averaging unit 124 averages the received channels for the pilot symbols in each pilot block to estimate the channel for the corresponding pilot block, based on the timing information received.

The estimated channel information for each pilot block is supplied to the delay units 126, 128, and 130 to cause them to happen at the same time. Subsequently, with the weighting factor generated by the weighting factor controller 138, the multiplication units 132, 134, and 136, and the adder 140 carries out the weighting averaging (weighting sum) to calculate the channel estimation value.

As shown in, for example, FIG. 2, the channel estimation value for the data symbol in the nth slot may be calculated with the pilot blocks of from the (n−K+1)th pilot block, wherein K is a natural number, to the (n+K)th pilot block (K=3 in the example in FIG. 2). Alternatively, considering a delay, it may be calculated with the pilot blocks of from (n−K+1)th pilot block to the nth pilot block.

Figure 6:
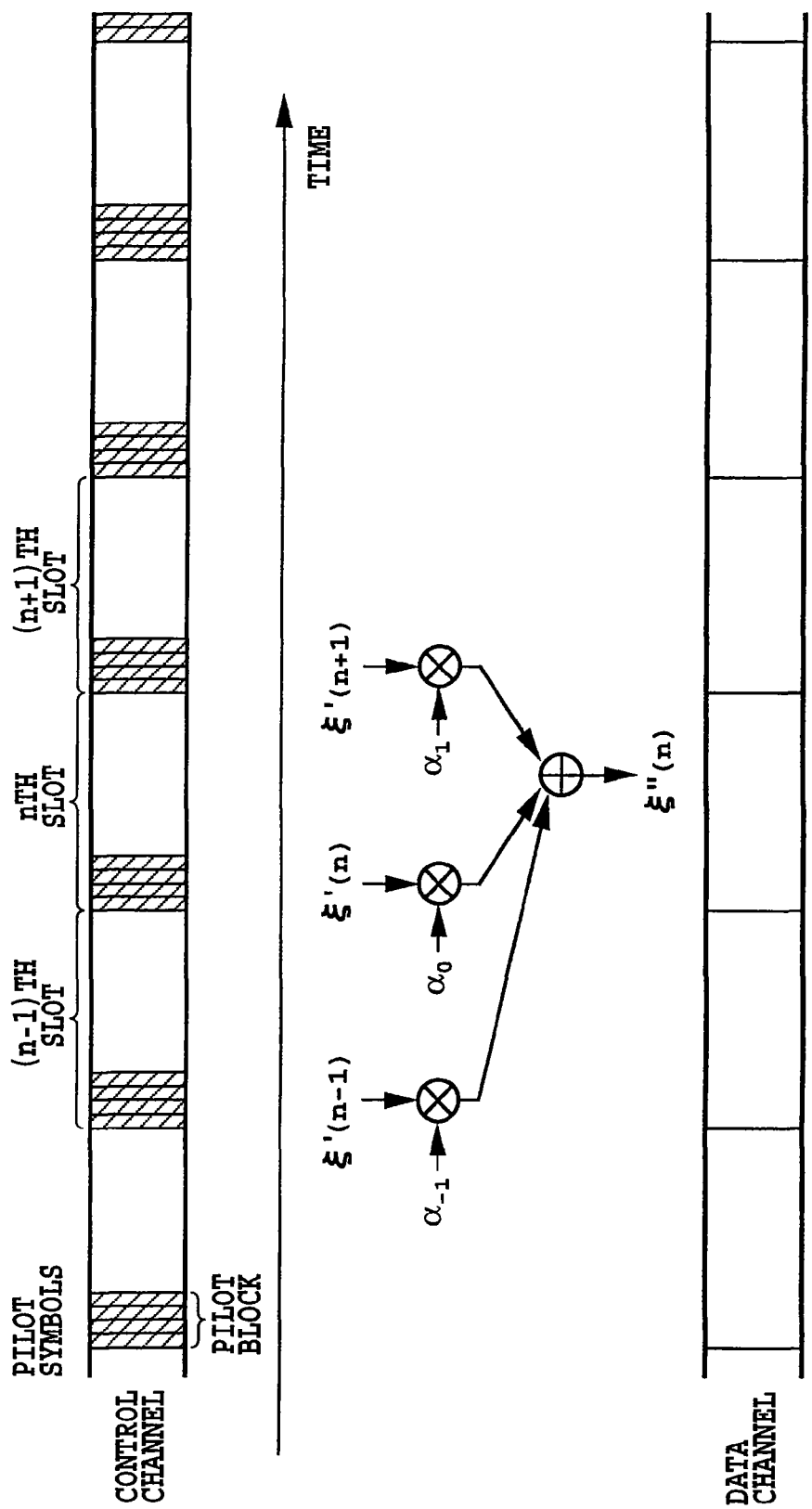
FIG. 6 is a view illustrating an exemplified calculation of the channel estimation value.

FIG. 6 is a view illustrating an exemplified calculation of the channel estimation value. In FIG. 6, the channel estimation value for the data symbols in the nth slot is calculated with the pilot blocks of from (n−1)th pilot block to the (n+1)th pilot block. In this event, a ratio of the weighting factors may be $\alpha_{-1}:\alpha_0:\alpha_1=0.4:1.0:0.4$. It is preferable that the pilot blocks closer (in time) to the data symbol of which channel estimation value is to be calculated have a larger value of the weighting factor. Such a closer pilot block reflects more the state of a propagation path upon the reception of the data symbol because the propagation path varies at every moment. In the frame configuration in FIG. 6, the pilot blocks (pilot symbols) in the slot occur previously (that is, they are located on the left side in FIG. 6). It is thus possible that a better channel estimation value be obtained with the ratio of the weighting factors of, for example, $\alpha_{-1}:\alpha_0:\alpha_1=0.2:1.0:0.6$. As apparent from the above, to determine the weighting factors depending on the location of the pilot symbols in the slot often results in the channel estimation value of higher accuracy.

In FIGS. 2 and 6, all pilot symbols in the slot are used for the calculation of the channel estimation value. In addition, the average of the pilot symbols in the pilot block is calculated before taking the weighting average thereof. However, the channel estimation value may be calculated using only some of the pilot symbols in the slot. The weighting factor may be determined for each pilot symbol to take the weighting average of the pilot symbols. No average calculation is required for the pilot block having only one pilot symbol.

While the same channel estimation value is applied to all data symbols in the single slot in FIGS. 2 and 6, the data symbols in the slot may be separated into two or more data symbol segments to select a suitable pilot symbol for the calculation of the channel estimation value in each data symbol segment. In this event, the pilot symbols are averaged with the weighting factors to estimate the channel estimation value for the data symbols in each data symbol segment.

Figure 7:
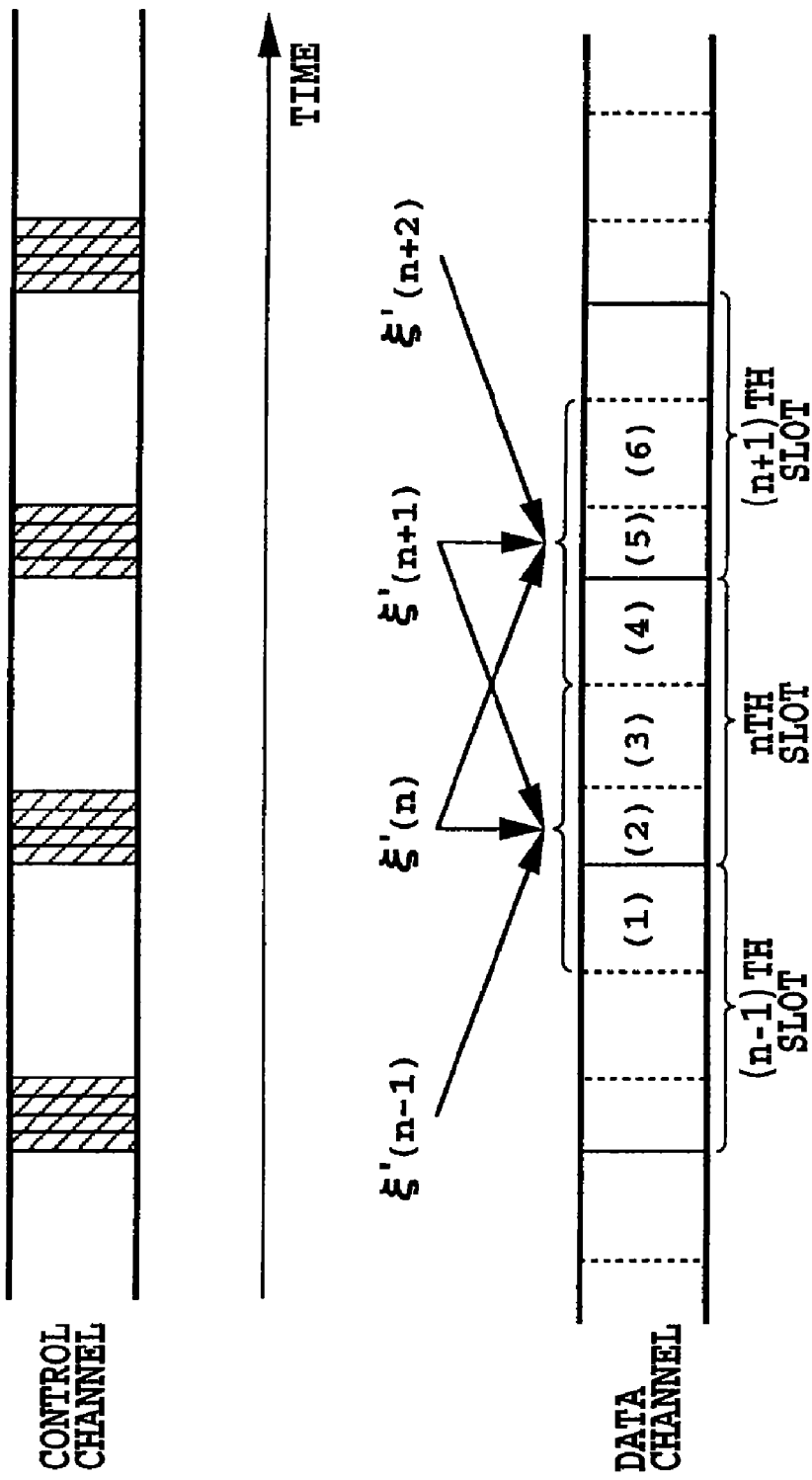
FIG. 7 is a view illustrating an operation to calculate the channel estimation value for the respective data symbol segments obtained by means of separating the data symbols in a single slot.

FIG. 7 is a view illustrating an operation to calculate the channel estimation value for the respective data symbol segments obtained by means of separating the data symbols in a single slot. In FIG. 7, the channel estimation values are calculated with the pilot blocks of from the (n−1)th pilot block to the (n+1)th pilot block for the data symbol segments (1), (2), and (3). Likewise, the channel estimation values are calculated with the pilot blocks of from the nth pilot block to the (n+2)th pilot block for the data symbol segments (4), (5), and (6). The channel estimation values may be calculated with the same weighting factor for the data symbol segments (1), (2), and (3). Alternatively, these values may be calculated with different weighting factors. This is also true for the data symbol segments (4), (5), and (6).

In FIG. 7, the same pilot symbol is selected for the calculation of the channel estimation value for the data symbols in the last data symbol segment (1) in the (n−1)th slot and the calculation of the channel estimation value for the data symbols in the first data symbol segment (2) in the nth slot. The average of these pilot symbols are taken with the weighting factor to obtain the channel estimation value for the data symbols in each data symbol segment.

Figure 8:
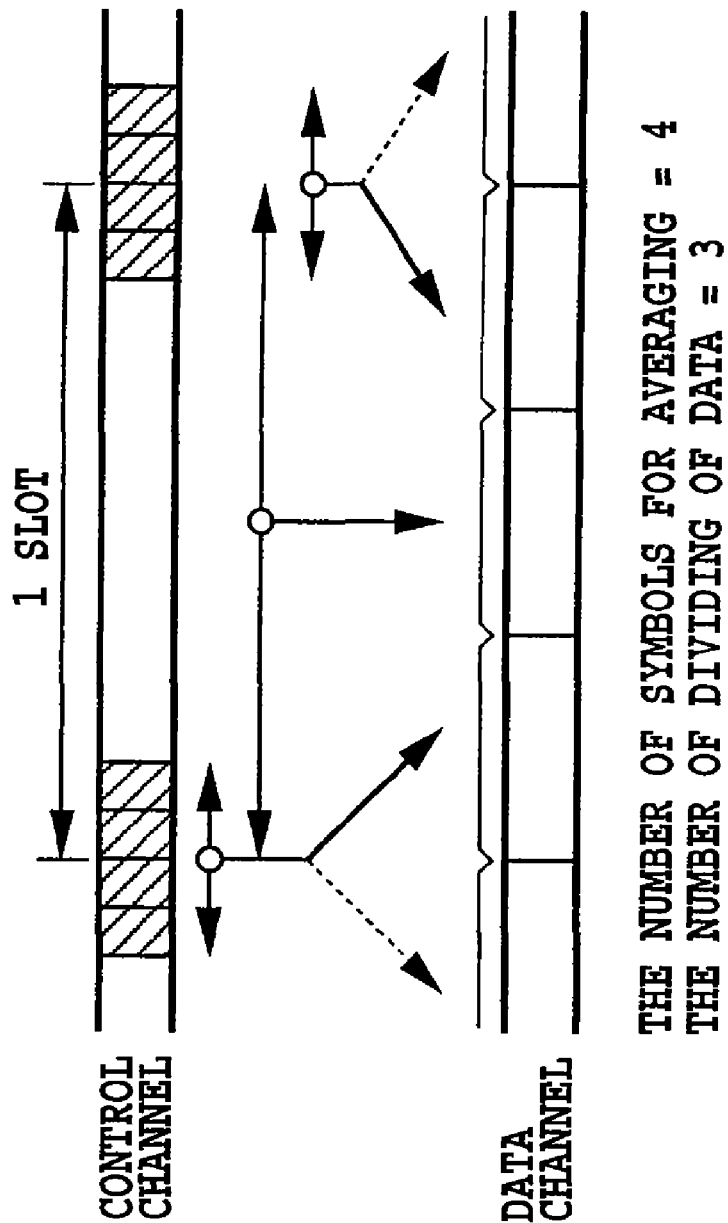
FIG. 8 is a view illustrating calculations of the channel estimation values for the respective data symbol segments that are obtained by means of separating the data symbols in a single slot.
Figure 9:
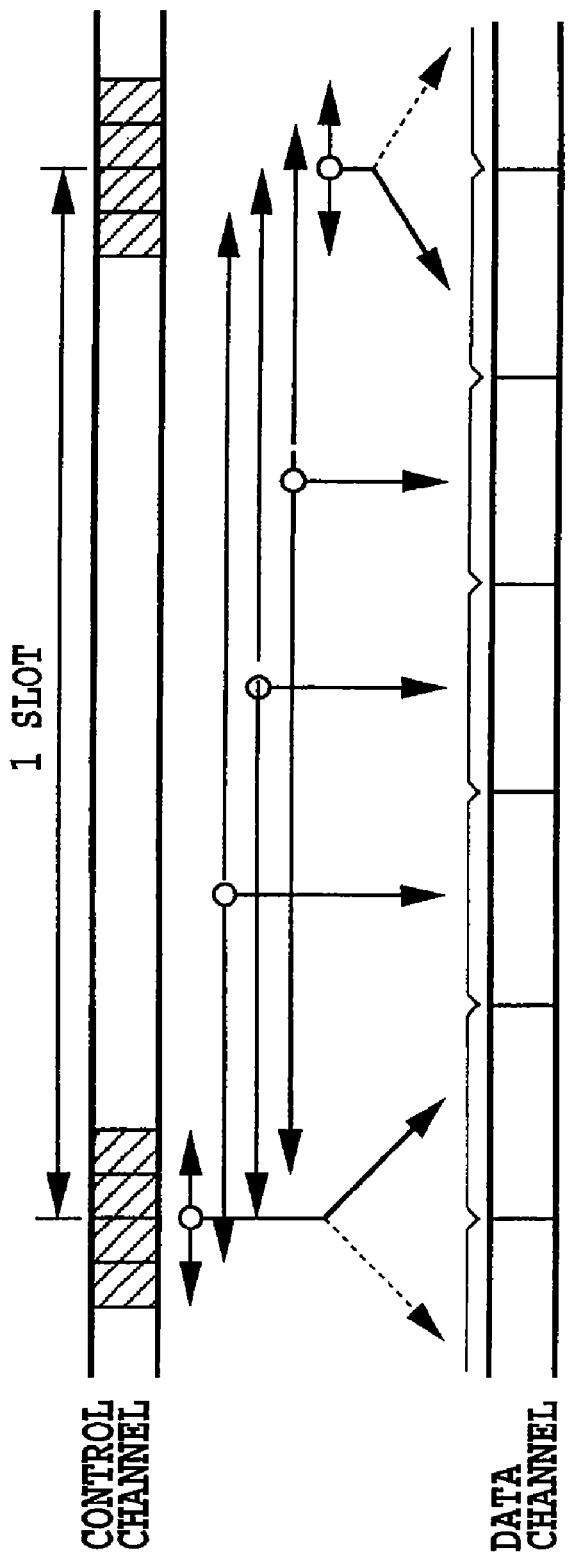
FIG. 9 is a view illustrating calculations of the channel estimation values for the respective data symbol segments that are obtained by means of separating the data symbols in a single slot.
Figure 10:
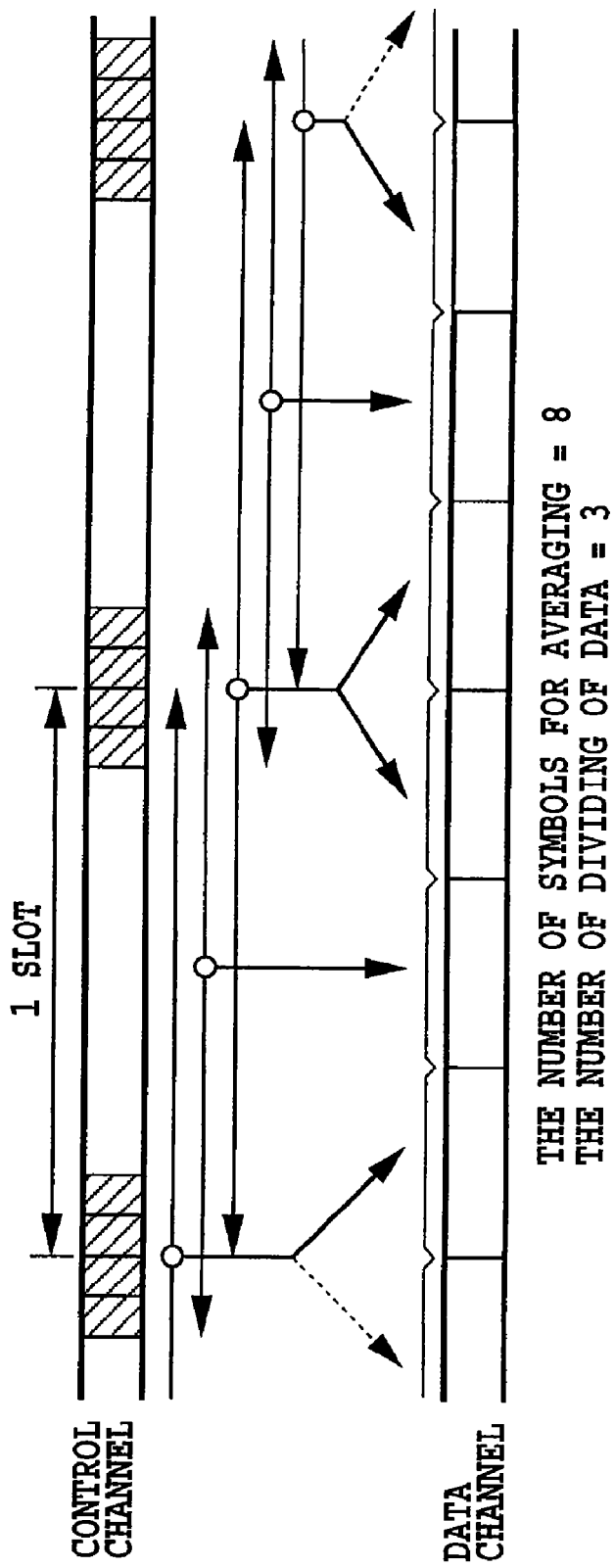
FIG. 10 is a view illustrating calculations of the channel estimation values for the respective data symbol segments that are obtained by means of separating the data symbols in a single slot.

FIGS. 8 through 10 are views illustrating calculations of the channel estimation values for the respective data symbol segments that are obtained by means of separating the data symbols in a single slot. In FIGS. 8 through 10, two symbols before and two symbols after the current symbol in the slot on the control channel serve as the pilot symbols. Upon the estimation of the channel, an average value for a certain number of pilot symbols is calculated while shifting the symbol position successively. In FIGS. 8 through 10, no average value for the pilot symbols for each pilot block is obtained. Instead, the pilot symbols are directly averaged with the weighting factor.

In FIG. 8, four pilot symbols are used to take the weighting average. The data symbol in a single slot is separated into three segments. In FIG. 9, four pilot symbols are used to take the weighting average. The data symbol in a single slot is thus separated into four segments. In FIG. 10, eight pilot symbols are used to take the weighting average. The data symbol in a single slot is separated into three segments.

In FIGS. 8 through 10, the same pilot symbol is selected for the calculation of the channel estimation value for the data symbols in the last data symbol segment in the ith slot, where i is an integer, and the calculation of the channel estimation value for the data symbols in the first data symbol segment in the (i+1)th slot. The average of these pilot symbols are taken with the weighting factor to obtain the channel estimation value for the data symbols in each data symbol segment.

In this embodiment, the weighting factors used for taking the weighting average are varied depending on the fading frequency. The fading frequency decision unit 150 decides the fading frequency based on the average value for the pilot symbols. The weighting factor controller 138 varies the weighting factor according to the decision result.

The fading frequency decision unit 150 normalizes the average values for the pilot symbols in each of the two slots on the control channel to calculate an inner product value.

Figures 11A, 11B:
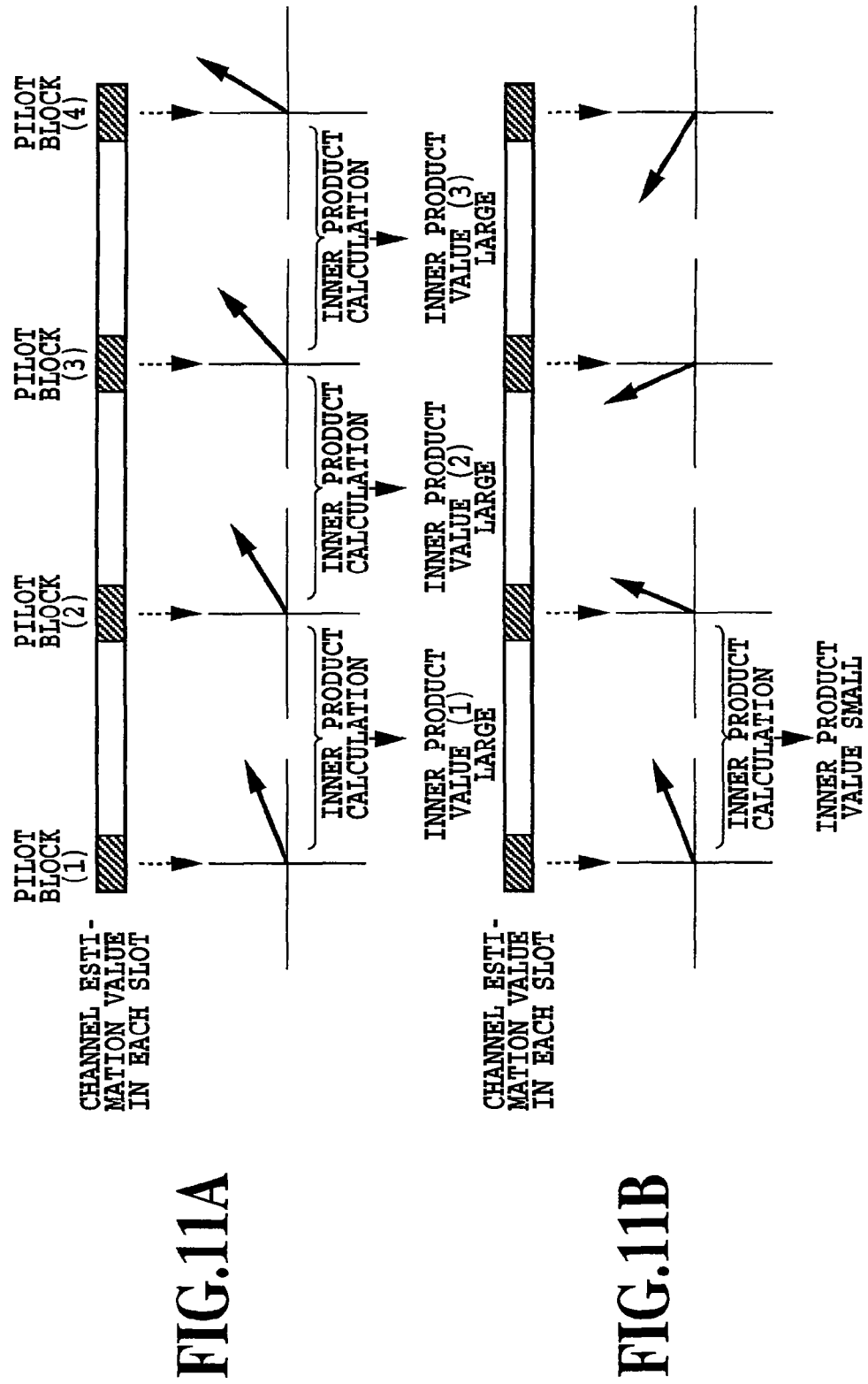
FIGS. 11A and 11B are views for use in describing a concept of the fading frequency decision.

FIGS. 11A and 11B are views for use in describing a concept of the fading frequency decision. As shown in FIG. 11A, the channel estimation values in the slots correlates with each other to a larger degree with the slower fluctuation of the fading, indicated by a smaller fading frequency. This provides a larger inner product value. On the contrary, as shown in FIG. 11B, the channel estimation values in the slots correlates with each other to a smaller degree with the faster fluctuation of the fading, indicated by a larger fading frequency. This provides a smaller inner product value.

Figure 12:
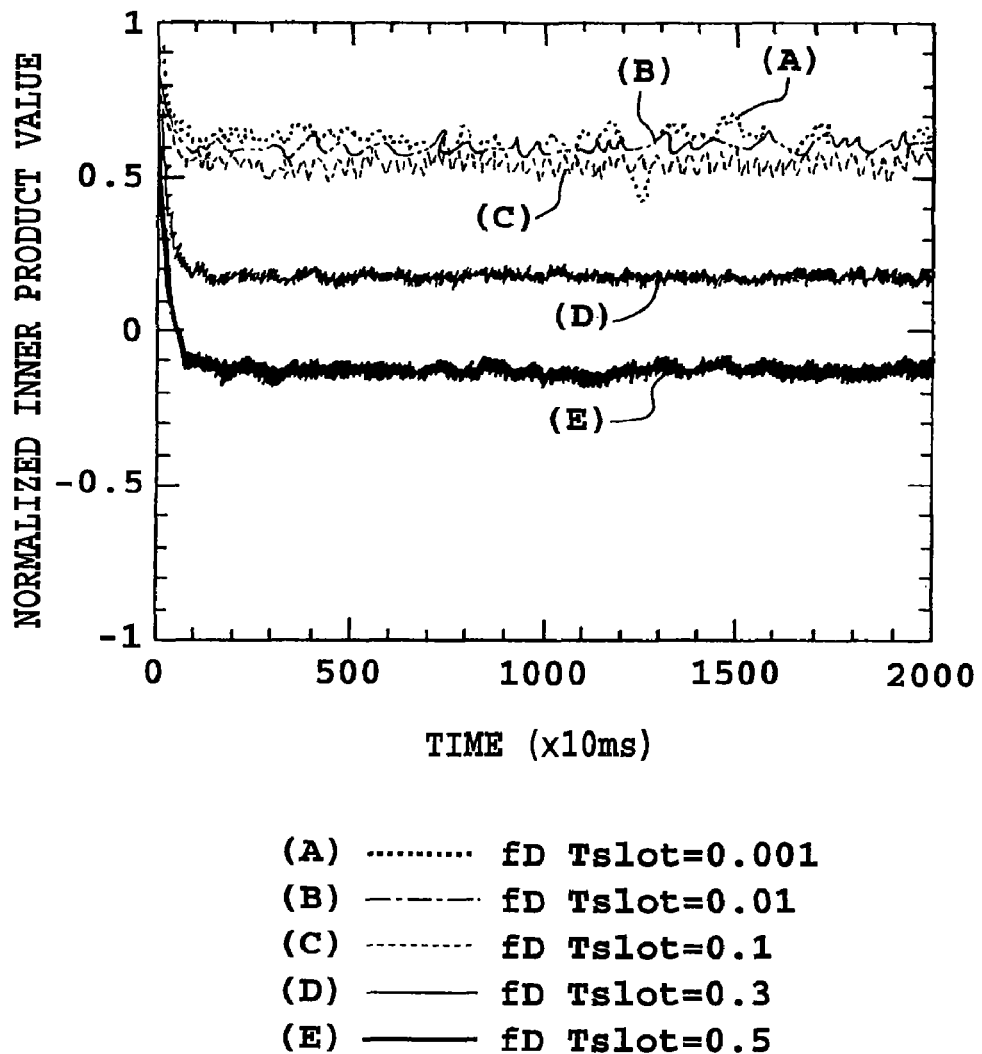
FIG. 12 is a graphical representation of a simulated result obtained through a computer, in which the abscissa represents a measurement time and the ordinate represents a measured value with the fading frequency (fDTslot) being used as a parameter.

FIG. 12 is a graphical representation of a simulated result obtained through a computer, in which the abscissa represents a measurement time and the ordinate represents a measured value with the fading frequency (fDTslot) being used as a parameter. In FIG. 12, a threshold value is set to, for example, 0.3 for the measured value in order to decide whether the fading frequency is a fast fading of 0.3 or larger. The fading frequency of 0.3 or larger is decided when the measured value is smaller than the threshold value.

The normalization unit 152 in the fading frequency decision unit 150 normalizes the average values for the pilot symbols in two pilot blocks, that is, two slots on the control channel. The inner product calculator 154 calculates an inner product value of the average values for the two normalized pilot symbols.

The demodulation device according to the present embodiment is a demodulation device which performs the RAKE combining and it performs the normalization and inner product calculation for each of the multiple paths used for the RAKE combining as described above. The inner product values obtained from the multiple paths are averaged by the first averaging unit 156. If such averaging is not to be performed among the multiple paths, the first averaging unit 156 is not required.

The average value calculated by the first averaging unit 156 is further averaged among the plurality of slots by the second averaging unit 158 (for example, the inner product values (1), (2), and (3) are averaged in FIG. 11A). This may reduce possible influence of thermal noise. If such averaging is not to be performed among the plurality of slots, the second averaging unit 158 is not required.

The threshold decision unit 160 compares the average value calculated by the second averaging unit 158 with the threshold to perform a fading frequency decision. Specifically, it is decided which of the plurality of regions the fading frequency belongs to, by performing a threshold decision with a preset threshold by several steps. The fading frequency decision is performed with the threshold in the present embodiment and however, it may be performed, for example, through calculations.

According to the present embodiment, the fading frequency decision is performed by calculating an inner product of the average value obtained from the pilot symbols of two pilot blocks. These two pilot blocks may be, for example, those for adjacent slots (for example, the pilot blocks (1) and (2) in FIG. 11A) or those for every other slot (for example, the pilot blocks (1) and (3) in FIG. 11A). Alternatively, the fading frequency decision may be performed by calculating an inner product of one pilot symbol and another pilot symbol without any pilot block.

If an inner produce (its average value) of pilot symbols (their average value) (for example, an output of the second averaging section 158 in FIG. 5) is larger than a predetermined value, an average value calculated from the pilot symbols of two slots at a longer interval in the control channel may be subjected to the normalization, the inner product calculation, the inner product averaging among the multiple paths, and the inner product averaging among the plurality of slots as described above and then the averaged inner product value may be compared with a threshold corresponding to such a longer interval to perform the fading frequency decision.

As seen from a graph in FIG. 12 for the inner product value with a fading frequency as a parameter, for higher fading frequencies, it is possible to easily perform the fading frequency decision with a threshold because a difference in frequency results in a relatively large difference in inner products (that is, a higher resolution). On the contrary, for lower fading frequencies, it tends to be difficult to perform the fading frequency decision because such a difference in inner products is relatively small (that is, a lower resolution).

The resolution for lower fading frequencies can be enhanced by increasing an interval between slots which include pilot symbols used for inner product calculation (inner product measurement interval). For this purpose, if an inner product value with a lower resolution is initially obtained (from pilot symbols of slots at a shorter interval) and the inner product value is larger than a predetermined value (that is, the inner product value is a frequency lower than a predetermined fading frequency), much more accurate decision can be made with respect to a wider range of frequencies from higher fading frequencies to lower fading frequencies by using an inner product value with a higher resolution (from pilot symbols of slots at a longer interval) for the fading frequency decision.

For example, if an inner product value (its average value) of pilot symbols (their average value) of adjacent slots (inner product measurement interval=one-slot interval) (for example, an output of the second averaging unit 158 in FIG. 5) is a value corresponding to a fading frequency equal to or lower than a predetermined frequency, the fading frequency decision can be made with a much higher resolution by performing the threshold decision on another inner product value of pilot symbols at a two-slot interval which is longer than the previous interval by one slot.

If the inner product value for a two-slot interval is a value corresponding to a fading frequency equal to or lower than a predetermined lower frequency, the fading frequency decision can be made more accurately by using an inner product value of pilot symbols at a three-slot interval which is longer than the previous interval by one slot. Accordingly, the resolution can be enhanced by increasing the inner product measurement interval gradually. (The reason why the inner product measurement interval is varied from a smaller value to a larger value in this way is that the frequency which can be decided for a given inner product measurement interval may become lower as the interval increases.)

It should be appreciated that several inner product calculations with different inner product measurement intervals can be performed in parallel and an appropriate result can be obtained from even such a step-by-step decision as described above for a short time by doing so.

It should be further appreciated that two or more inner product values can be calculated with different inner product measurement intervals to perform the fading frequency decision.

Figure 13A:
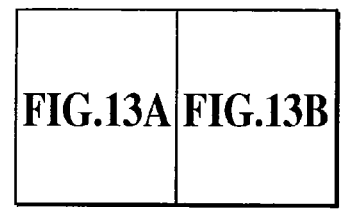
FIGS. 13A and 13B are block diagrams showing another configuration of the fading frequency decision unit 150 according to the first embodiment.
Figure 13A:
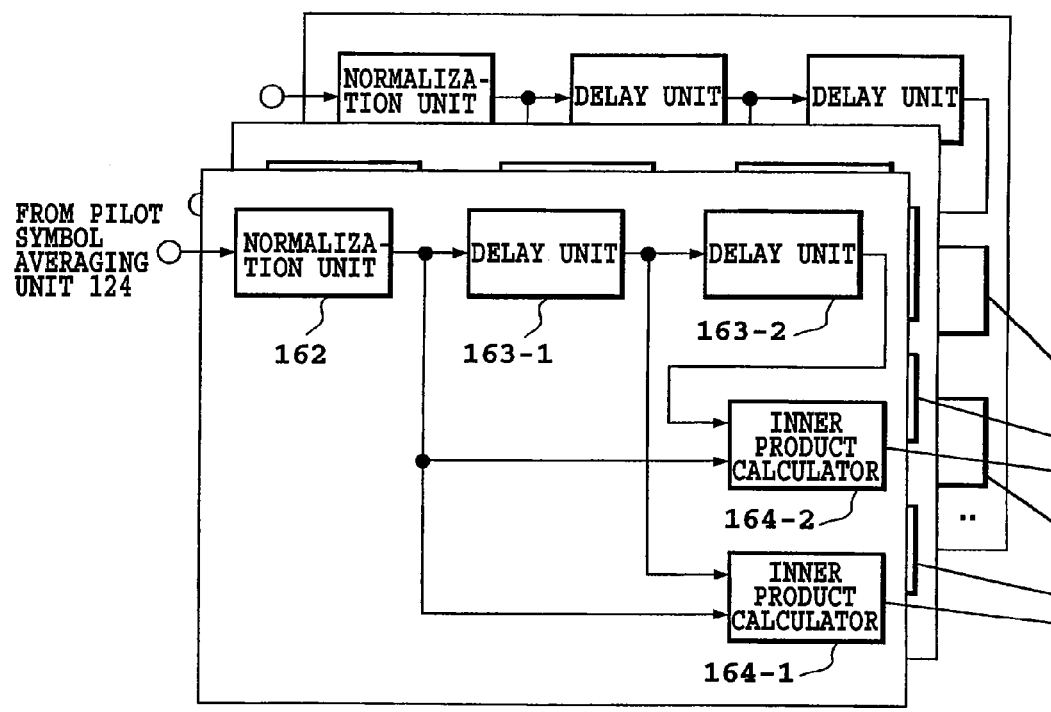
Figure 13B:
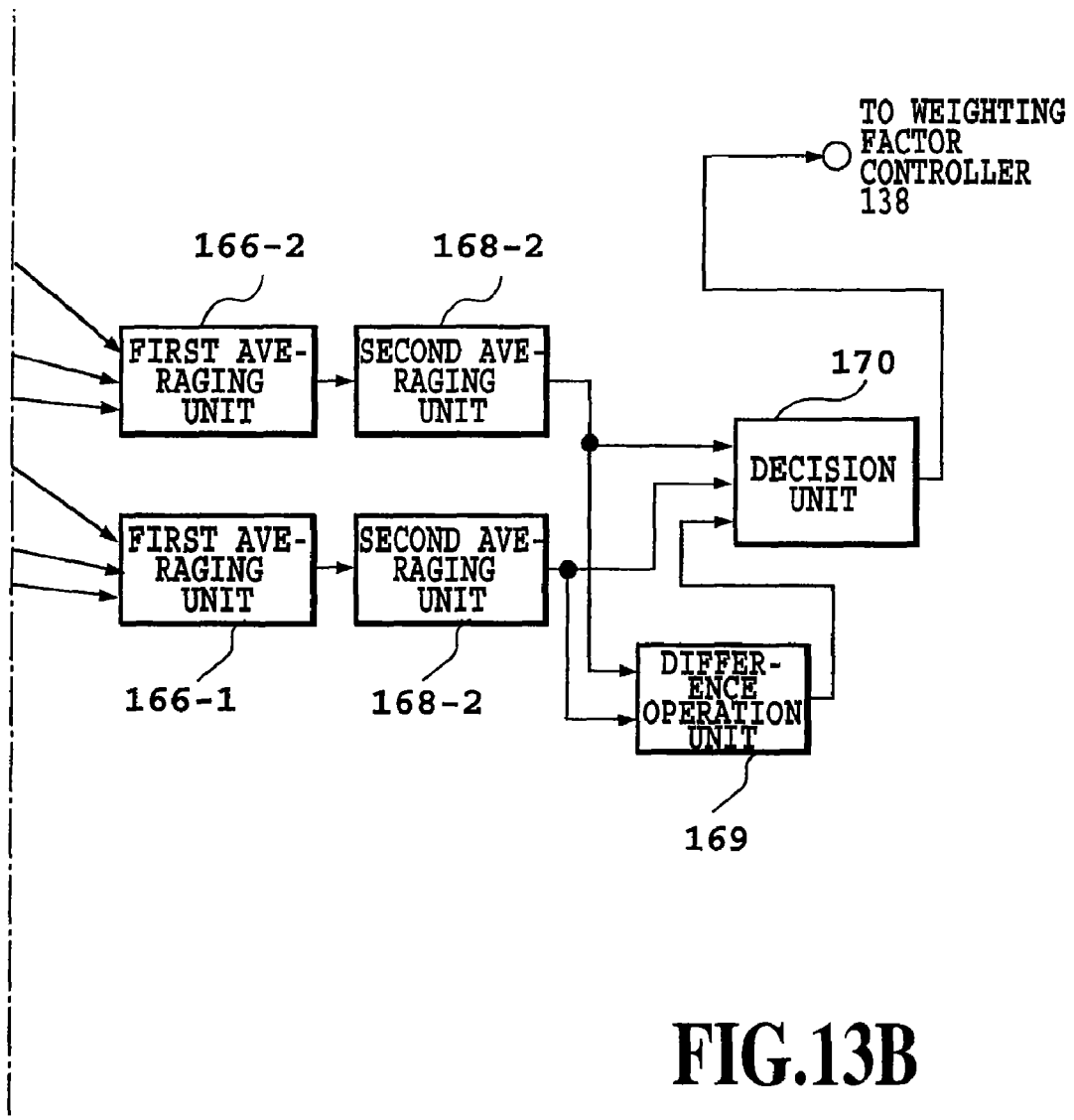

FIGS. 13A and 13B are block diagrams showing another configuration of the fading frequency decision unit 150 according to the present embodiment. The fading frequency decision unit shown in FIGS. 13A and 13B comprises a normalization unit 162, delay units 163-1 and 163-2, inner product calculators 164-1 and 164-2, first averaging units 166-1 and 166-2, second averaging units 168-1 and 168-2, a difference operation unit 169, and a decision unit 170.

In the configuration example of FIGS. 13A and 13B, the inner product calculator 164-1 calculates an inner product value for an inner product measurement interval of one slot and the inner product calculator 164-2 calculates an inner product value for that of two slots (that is, every other slot).

After the inner product values for these different inner product measurement intervals are averaged among the multiple paths by the first averaging units 166-1 and 166-2 and further averaged among the plurality of slots by the second averaging units 168-1 and 168-2, the difference operation unit 169 calculates a difference between the inner product values for two different inner product measurement intervals (a difference between the inner product value for a one-slot interval and that for a two-slot interval). Then the decision unit 170 performs the fading frequency decision by using the inner product value for a one-slot interval, that for a two-slot interval, and a difference between them.

It should be appreciated that in the example of FIGS. 13A and 13B, both the averaging among the multiple paths and the averaging among the plurality of slots are performed but either one or neither of them may be performed.

Figure 14:
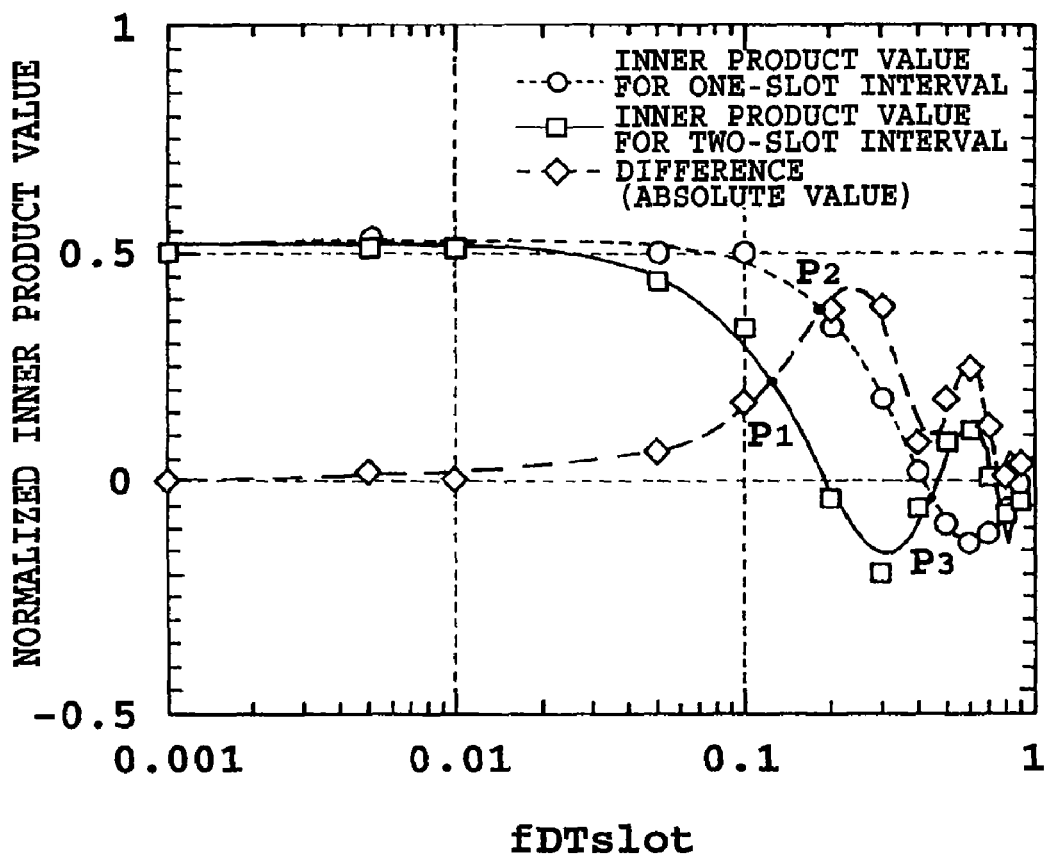
FIG. 14 is a schematic diagram for explaining an example of the fading frequency decision.

FIG. 14 is a schematic diagram for explaining an example of the fading frequency decision. In the example of FIG. 14, the fading frequency decision is made by using a point $P_1$ (a point where the inner product value for a two-slot interval coincides with the difference (absolute value) first), a point $P_2$ (a point where the inner product value for a one-slot interval coincides with the difference first), and $P_3$ (a point where the inner product value for a one-slot interval coincides with that for a two-slot interval first). That is, as the result of such fading frequency decision, any frequency will be decided to be lower than the fading frequency at the point $P_1$, to be equal to or higher than the fading frequency at the point $P_1$ and lower than the fading frequency at the point $P_2$, to be equal to or higher than the fading frequency at the point $P_2$ and lower than the fading frequency at the point $P_3$, or to be higher than the fading frequency at the point $P_3$.

It should be appreciated that such decision may eliminate the need for threshold establishment. It should be further appreciated that it can provide more thorough decision than the case where only one inner product value is calculated for an inner product measurement interval. Therefore, still more inner product values calculated with more different intervals could provide much more thorough decision.

In addition, the fading frequency decision can be made by using only several inner product values without any difference calculation. In that case, only the point $P_3$ in the example of FIG. 14 will be used for decision Based on thus decided fading frequency, the weighting factor controller 138 varies the weighting factor. Considering the example of FIG. 6, if the fading frequency is higher, a larger weighting factor is used for pilot blocks close (in time) to the data symbols for which channel estimation values are to be calculated, as compared with that for a lower fading frequency. That is because, for a higher fading frequency, channel fluctuation for data symbols for which channel estimation values are to be calculated is quite different from channel fluctuation for pilot blocks distant (in time) from these data symbols. For example, suppose that the weighting factor ratio for a lower fading frequency is $\alpha_{-1}:\alpha_0:\alpha_1=0.2:1.0:0.6$ and the weighting factor ratio for a higher fading frequency is $\alpha_{-1}:\alpha_0:\alpha_1=0.05:1.0:0.5$ (on the assumption that the pilot blocks in the nth slot, those in the (n+1)th slot, and those in the (n−1)th slot are close, in this order, to data symbols for which channel estimation values are calculated).

It should be appreciated that, in the present embodiment, the weighting factor used for calculating a weighted average varies according to the fading frequency but a fixed weighting factor may be used.

The channel estimation values (the output of the adder 140) calculated as described above are used to compensate for channel fluctuation (fading fluctuation) of despread data symbols timed by the delay unit 104. Specifically, the despread data symbols are multiplied by the complex conjugates of the channel estimation values to compensate for such channel fluctuation. Then the RAKE combiner 110 carries out coherent combining of the compensated signals.

It should be appreciated that, in the present embodiment, the data channel has the same transmission rate as that of the control channel but these two channels may have different transmission rates.

Figure 15:
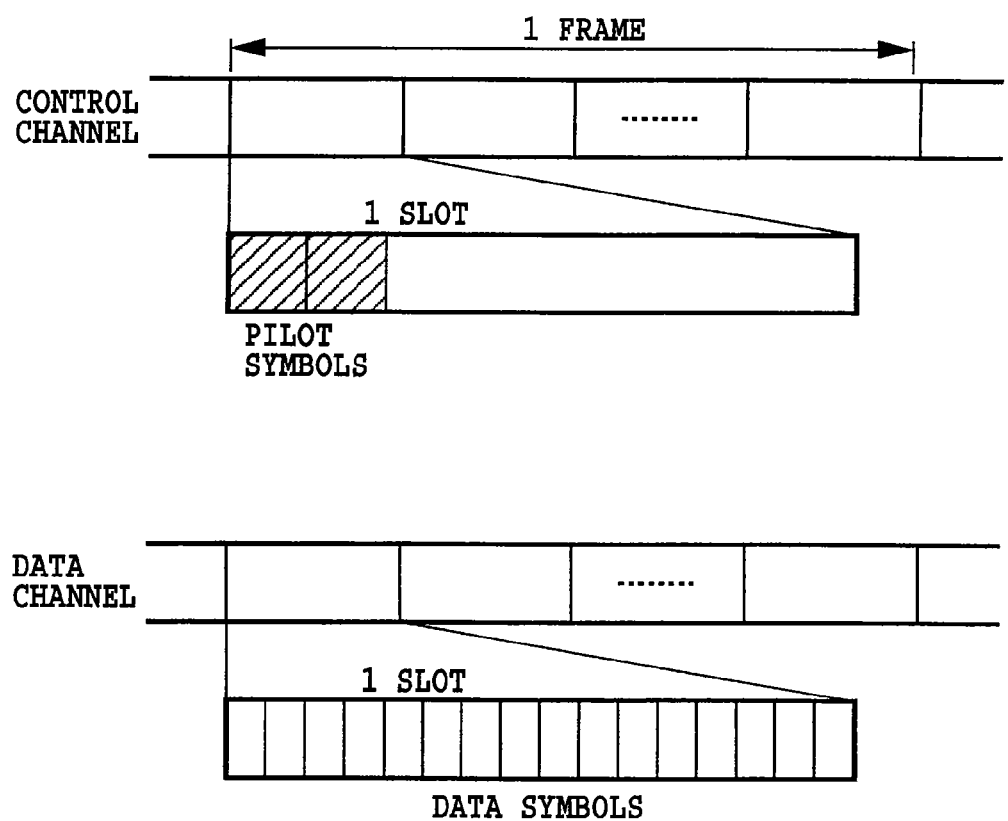
FIG. 15 shows an example of different transmission rates for the data and control channels.

FIG. 15 shows an example of different transmission rates for the data and control channels. In the example of FIG. 15, the control channel has half the transmission rate of the data channel. Even if such different transmission rates are used for these channels, channel estimation values can be obtained from pilot symbols.

Second Embodiment

Figure 16:
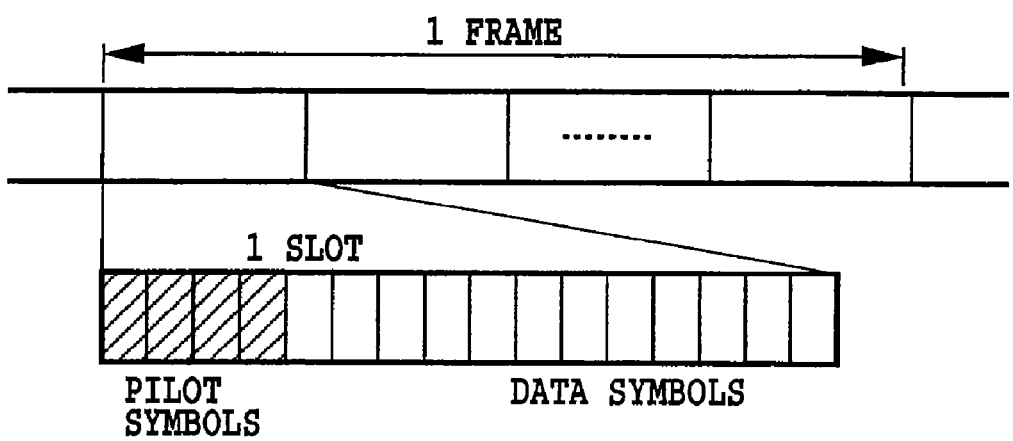
FIG. 16 is a drawing showing a frame configuration example of a signal received by the demodulation device in accordance with the second embodiment of the present invention.

FIG. 16 is a drawing showing a frame configuration example of a signal received by the demodulation device in accordance with the second embodiment of the present invention. The demodulation device in accordance with the present embodiment receives and demodulates a signal of a channel in which data symbols and pilot symbols are time multiplexed (time multiplexing system). A signal received by this pilot symbol section (phase, amplitude) is used as a reference signal to estimate channel fluctuations of data symbols. Pilot symbols are inserted into data symbols at fixed intervals. The channel estimation method in the demodulation device in accordance with the present embodiment is the same as the channel estimation method in the demodulation device in accordance with the first embodiment of the present invention.

Figure 17:
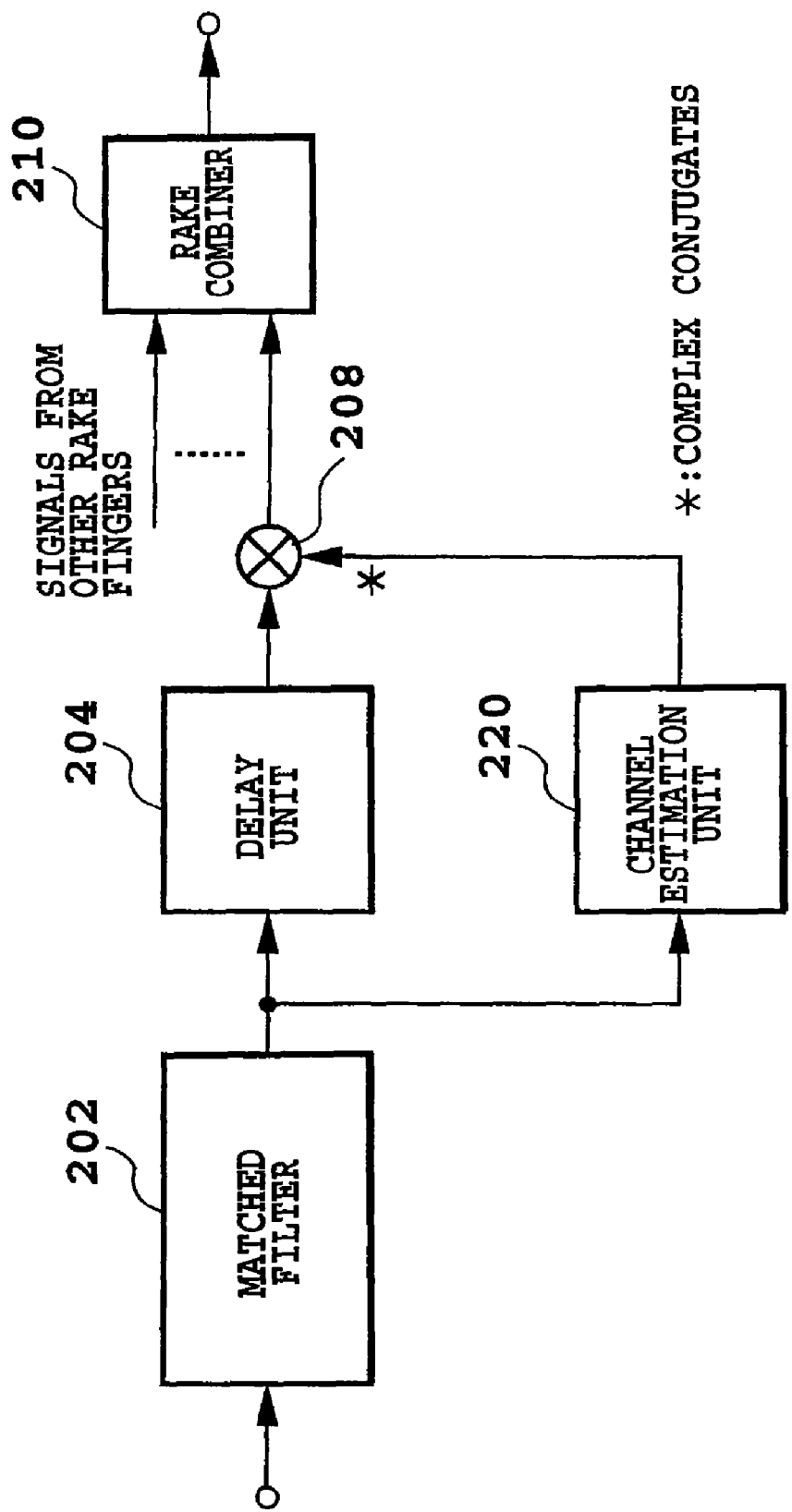
FIG. 17 is a block diagram showing a configuration example of the demodulation device in accordance with the second embodiment.

FIG. 17 is a block diagram showing a configuration example of the demodulation device in accordance with the present embodiment. The demodulation device in accordance with the present embodiment comprises a matched filter 202, a delay unit 204, a channel estimation unit 220, a multiplication unit 208 and a RAKE combiner 210. Although the demodulation device in the present embodiment is also compliant with a CDMA system, it is also possible to apply the present invention to demodulation devices compliant with other systems (for example, TDMA system and FDMA system). The demodulation device in the present embodiment carries out multiple access transmission by spreading a signal into a wideband signal using a spreading code faster than an information rate.

The configuration example of the channel estimation unit 220 in accordance with the present embodiment is the same as the configuration example of the channel estimation unit 120 in accordance with the first embodiment of the present invention shown in FIG. 4. Slot synchronization detector 122 detects pilot symbol locations in a channel in which data symbols and pilot symbols are time multiplexed. The configuration example of the fading frequency decision unit of the present embodiment is also the same as the configuration example of the fading frequency decision unit 150 of the first embodiment of the present invention shown in FIG. 5 (it can also be configured as shown in FIG. 13A and FIG. 13B).

The operation of the demodulation device of the present embodiment is also the same as the operation of the demodulation device of the first embodiment of the present invention.

Figure 18:
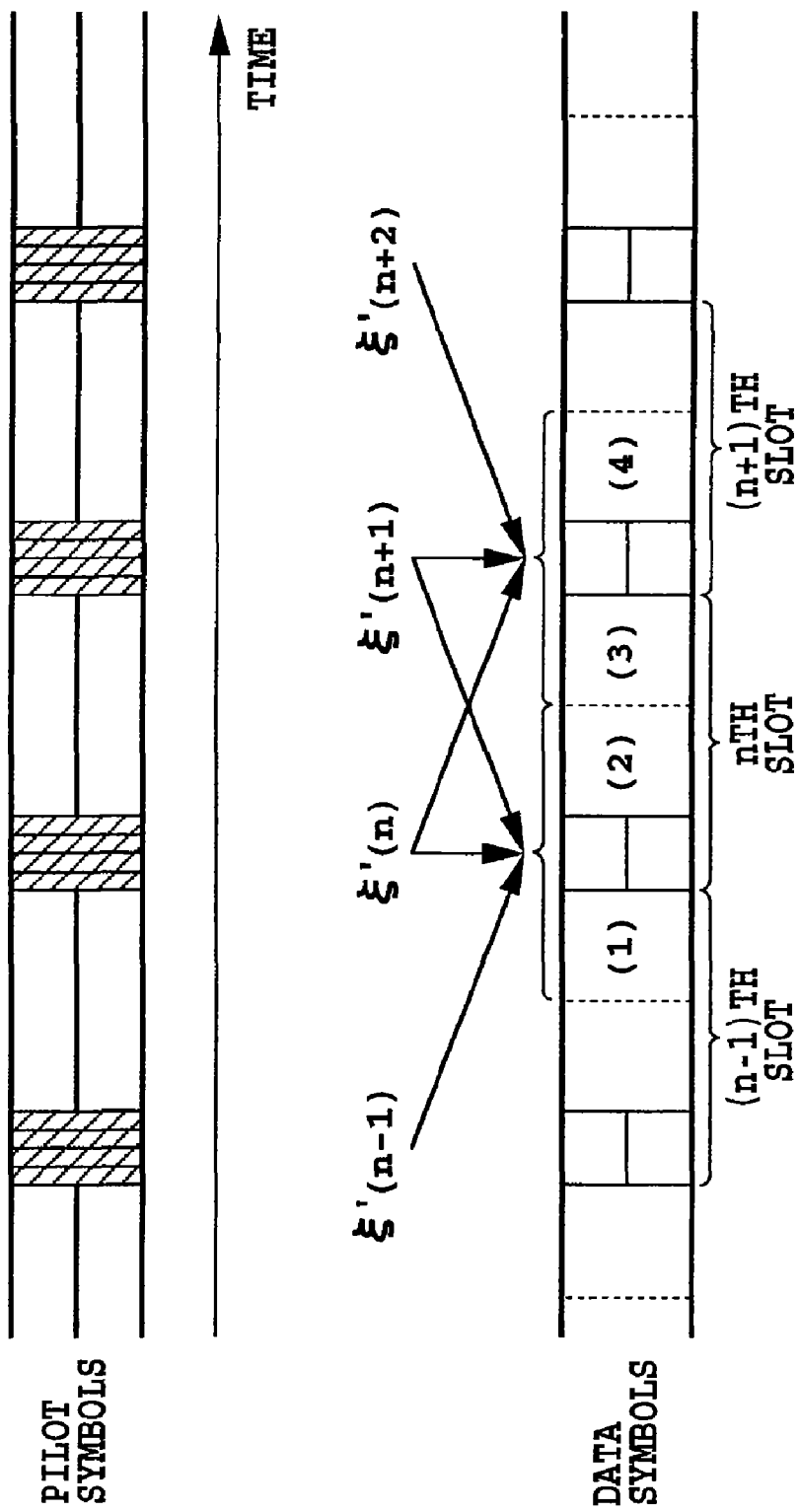
FIG. 18 is a drawing showing a case where data symbols in one slot are divided into a plurality of data symbol intervals and a channel estimation value is calculated for every data symbol interval.

FIG. 18 is a drawing showing a case where data symbols in one slot are divided into a plurality of data symbol intervals and a channel estimation value is calculated for every data symbol interval. In the example of FIG. 18, for data symbol intervals (1) and (2), a channel estimation value is calculated using the (n−1)th pilot block to the (n+1)th pilot block, and for data symbol intervals (3) and (4), a channel estimation value is calculated using the nth pilot block to the (n+2)th pilot block. The channel estimation values for data symbol intervals (1) and (2) can be calculated using a same weighting factor or using different weighting factors. The same applies to data symbol intervals (3) and (4).

Moreover, in the example of FIG. 18, in calculating a channel estimation value of data symbols in the last data symbol interval (1) of the (n−1)th slot and calculating a channel estimation value of data symbols in the first data symbol interval (2) of the nth slot, a same pilot symbol is selected and the pilot symbol is weighted and averaged to calculate a channel estimation value of data symbols during each data symbol interval.

Figure 19:
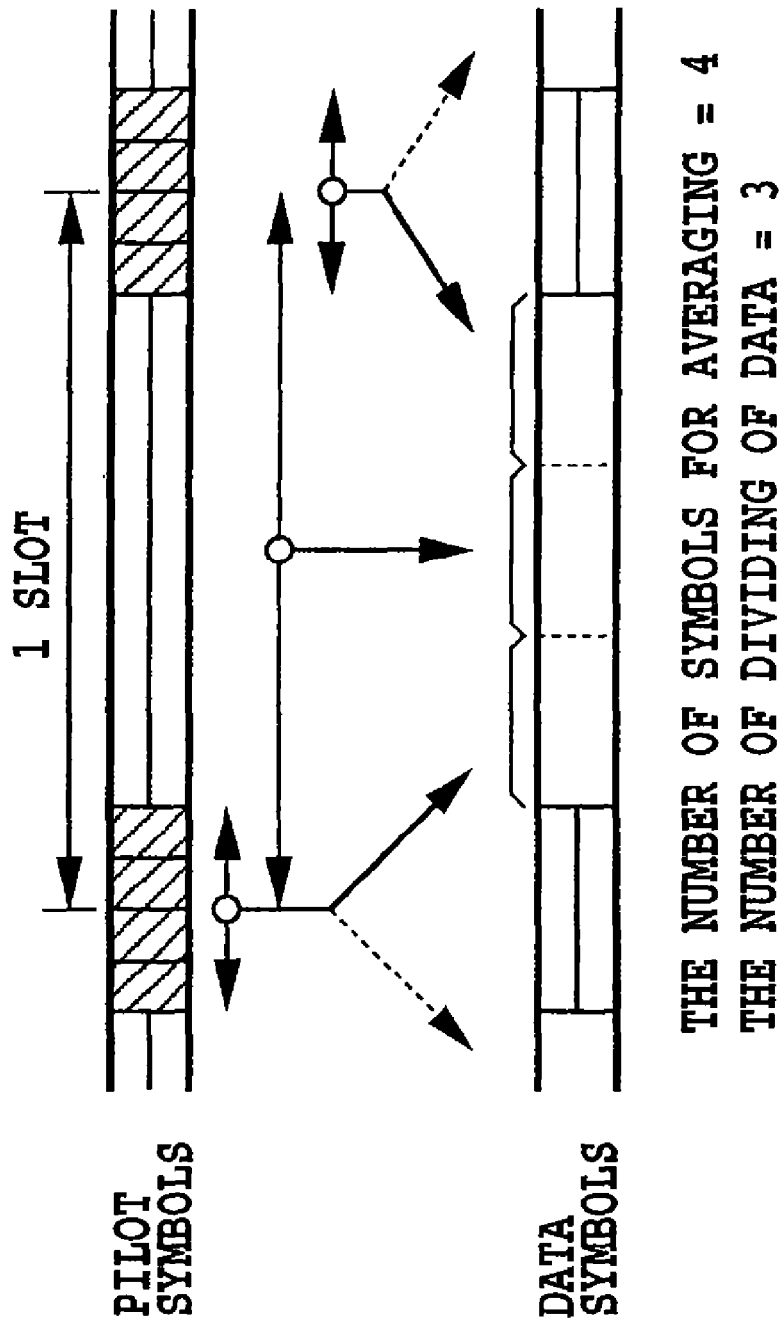
FIG. 19 is a drawing showing a case where data symbols in one slot are divided into a plurality of data symbol intervals and a channel estimation value is calculated for every data symbol interval.
Figure 20:
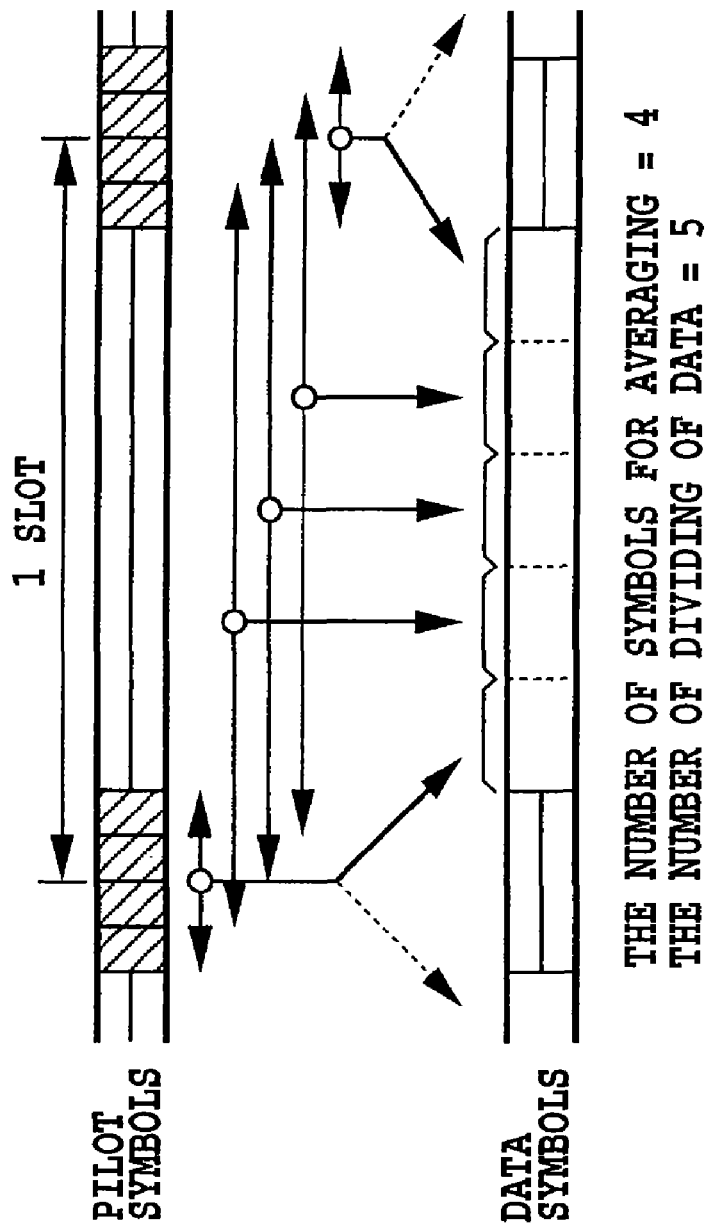
FIG. 20 is a drawing showing a case where data symbols in one slot are divided into a plurality of data symbol intervals and a channel estimation value is calculated for every data symbol interval.
Figure 21:
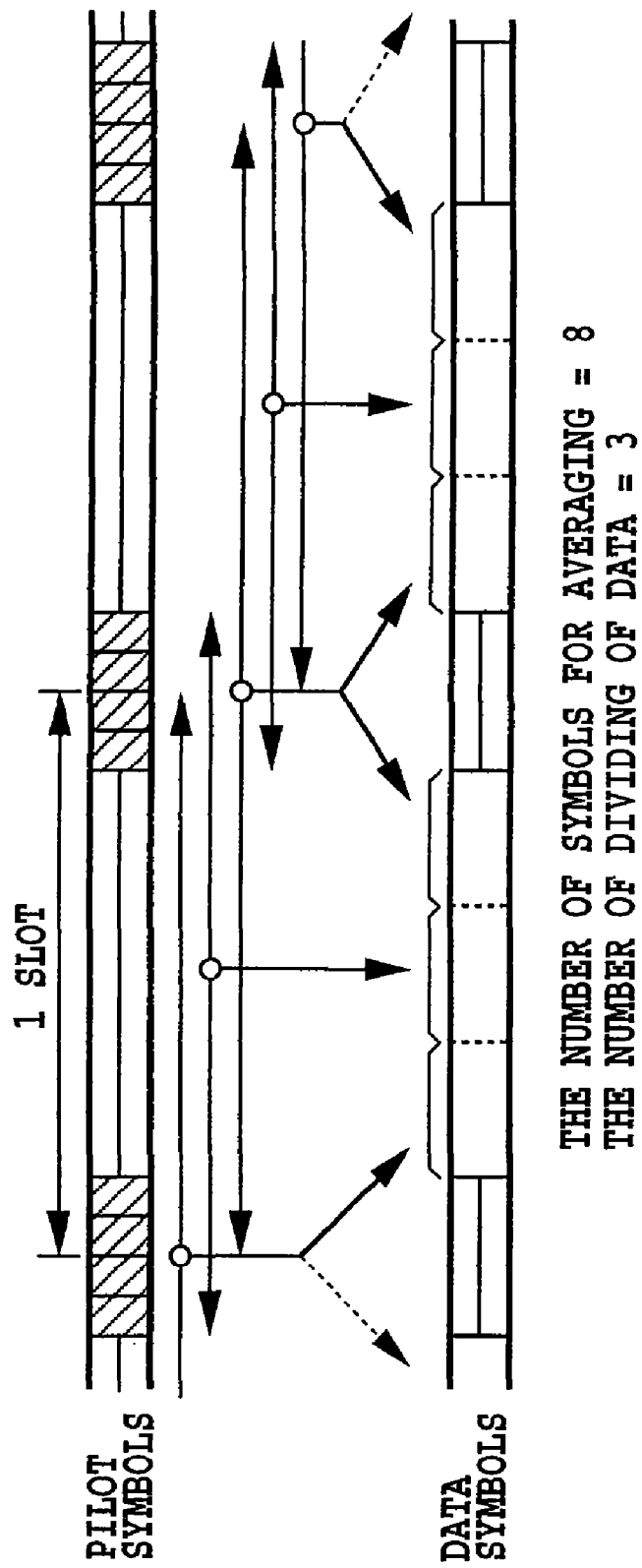
FIG. 21 is a drawing showing a case where data symbols in one slot are divided into a plurality of data symbol intervals and a channel estimation value is calculated for every data symbol interval.

FIG. 19 to FIG. 21 also show cases where data symbols in one slot are divided into a plurality of data symbol intervals and a channel estimation value is calculated for every data symbol interval. In the examples of FIG. 19 to FIG. 21, two symbols before and two symbols after a control channel slot are pilot symbols. Furthermore, in channel estimation, an average value for a certain number of pilot symbols is calculated while moving the symbol position successively. In the examples of FIG. 19 to FIG. 21, pilot symbols are directly weighted and averaged without calculating an average value of pilot symbols for each pilot block.

In the example of FIG. 19, four pilot symbols are used for weighting and averaging and data symbols in one slot are divided into three intervals. In the example of FIG. 20, four pilot symbols are used for weighting and averaging and data symbols in one slot are divided into five intervals. In the example of FIG. 21, eight pilot symbols are used for weighting and averaging and data symbols in one slot are divided into three intervals.

In the examples of FIG. 19 to FIG. 21, in calculating a channel estimation value of data symbols during the last data symbol interval of the ith (i: an integer) slot and calculating a channel estimation value of data symbols during the first data symbol interval of the (i+1)th slot, a same pilot symbol is selected and the pilot symbol is weighted and averaged to calculate a channel estimation value of data symbols during each data symbol interval.

In the present embodiment, weighting factors used for weighting and averaging are changed according to the fading frequency. However, it is also possible to use a fixed weighting factor.

Data symbol channel fluctuations (fading fluctuations) after despreading whose timing is determined by the delay section 204 are compensated using the channel estimation value obtained by the channel estimation section 220. More specifically, channel fluctuations are compensated by multiplying the despread data symbols by a complex conjugate of the channel estimation value. Then, the compensated signals are combined in-phase by the RAKE combiner 210.

In the present embodiment, data symbols and pilot symbols in a channel have a same transmission rate, but data symbols and pilot symbols in the channel can also have different transmission rates.

Third Embodiment

The above concept can also be applied to a parallel system.

Figure 22:
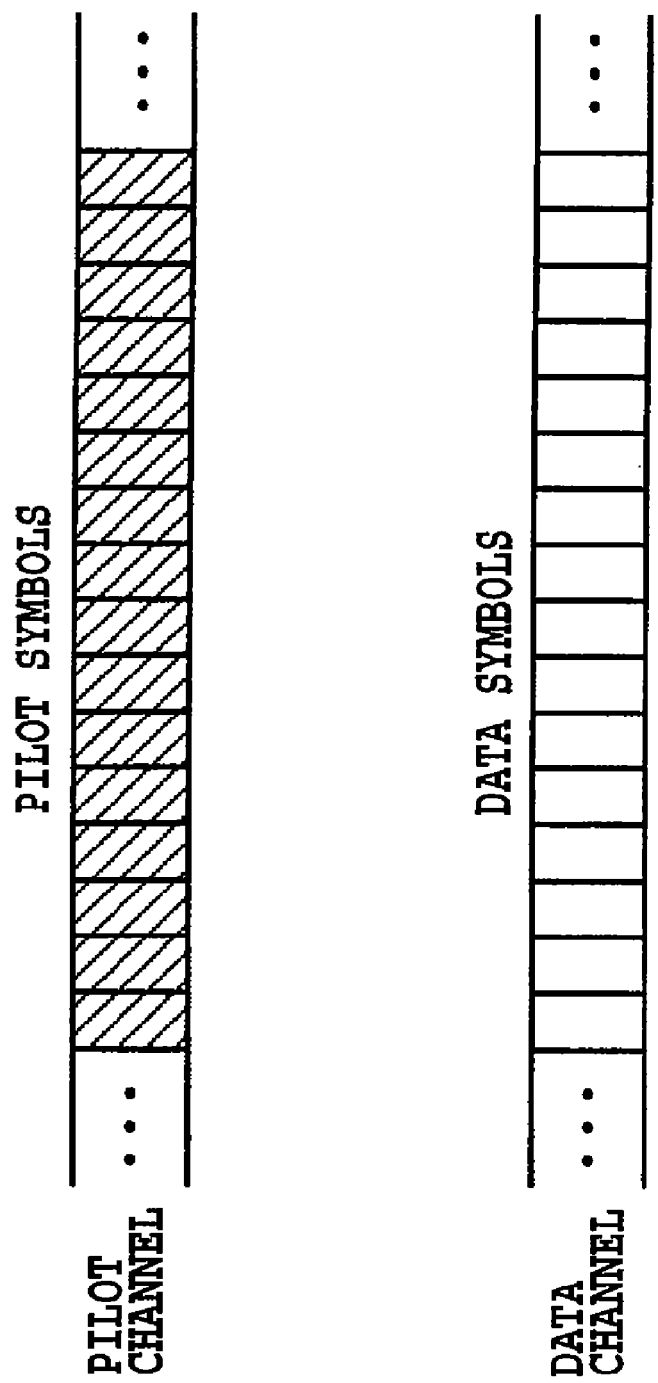
FIG. 22 is a drawing showing a frame configuration example of a signal received by the demodulation device in accordance with the third embodiment of the present invention.

FIG. 22 is a drawing showing a frame configuration example of a signal received by the demodulation device in accordance with the third embodiment of the present invention. The demodulation device in accordance with the present embodiment receives and demodulates signals of a data channel and a pilot channel, which is parallel multiplexed with the data channel (parallel system). A received signal (phase, amplitude) of the pilot symbol of this pilot channel is used as a reference signal to estimate channel fluctuations of data symbols in the data channel. In the parallel system, unlike the parallel time multiplexing system or time multiplexing system that transmit/receive pilot symbols using some slots, pilot symbols are transmitted/received consecutively, and therefore the concept of a "slot" is not so important. For this reason, slots are not indicated in FIG. 22.

The channel estimation method in the demodulation device in accordance with the present embodiment is basically the same as the channel estimation method by the demodulation device in accordance with the first and second embodiments, but specific examples will be explained below.

Figure 23:
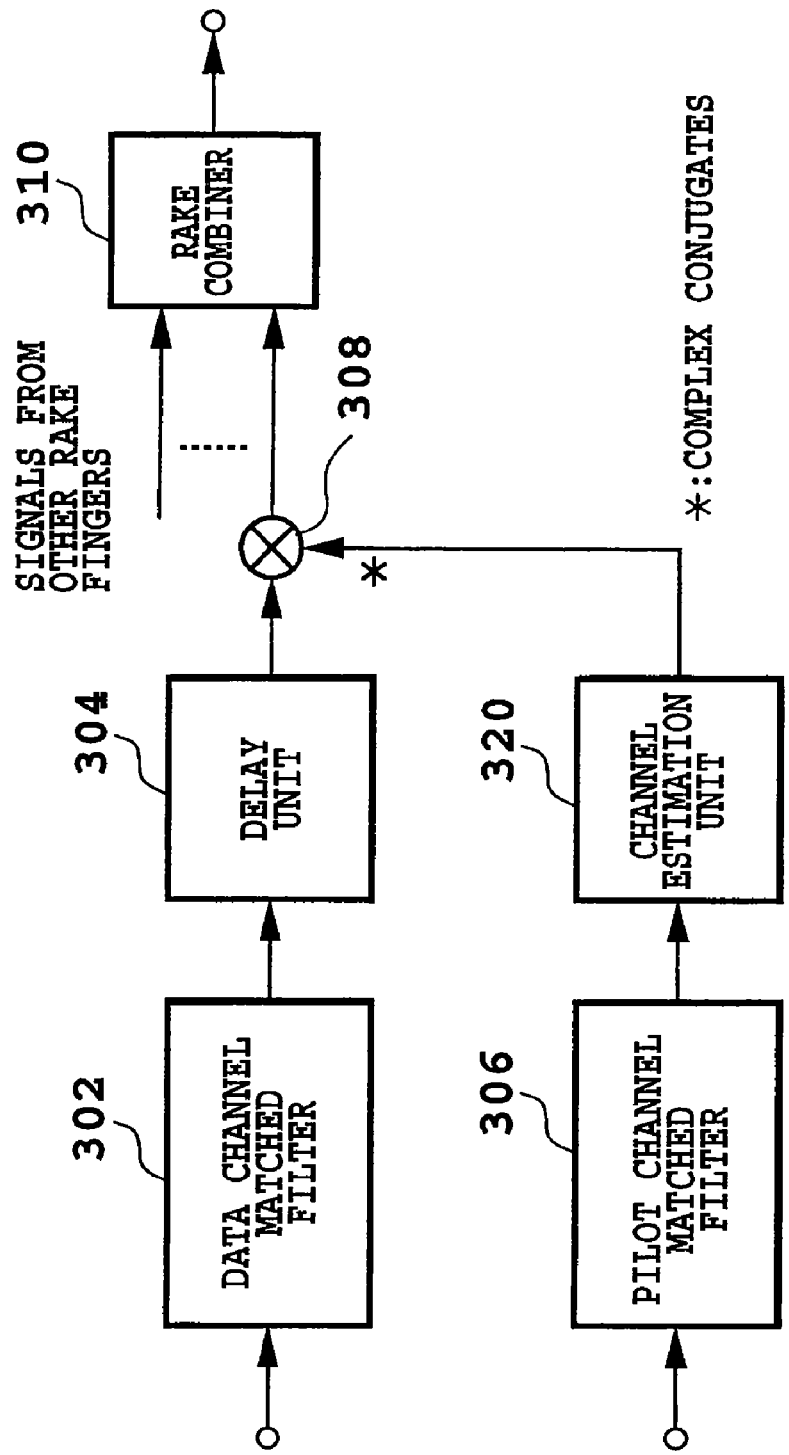
FIG. 23 is a block diagram showing a configuration example of the demodulation device in accordance with the third embodiment.

FIG. 23 is a block diagram showing a configuration example of the demodulation device in accordance with the present embodiment. The demodulation device in accordance with the present embodiment comprises a data channel matched filter 302, a delay unit 304, a pilot channel matched filter 306, a channel estimation unit 320, a multiplication unit 308 and a RAKE combiner 310. Although the demodulation device in the present embodiment is also compliant with a CDMA system, it is also possible to apply the present invention to demodulation devices compliant with other systems (for example, TDMA system and FDMA system).

Figure 24:
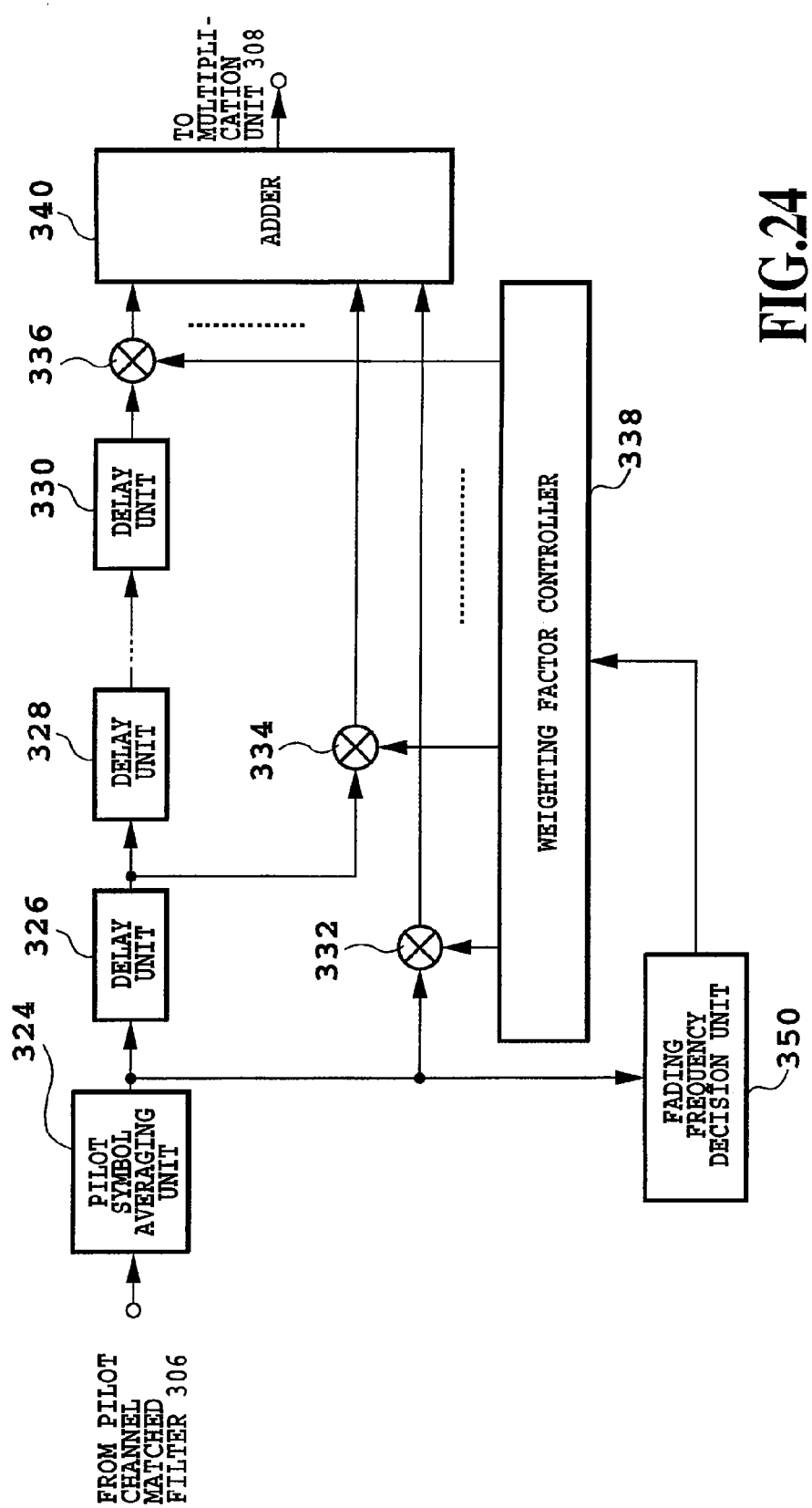
FIG. 24 is a block diagram showing a configuration example of a channel estimation section in accordance with the third embodiment.

FIG. 24 is a block diagram showing a configuration example of a channel estimation section in accordance with the present embodiment. The channel estimation unit 320 of the present embodiment comprises a pilot symbol averaging unit 324, delay units 326, 328, 330, etc., multiplication units 332, 334, 336, etc., a weighting factor controller 338, an adder 340 and a fading frequency decision unit 350. The configuration example of the fading frequency decision unit (fading frequency decision unit 350) of the present embodiment is the same as the configuration example of the fading frequency decision unit 150 of the first embodiment of the present invention shown in FIG. 5 (can also be configured as shown in FIG. 13A and FIG. 13B).

The operation of the demodulation device of the present embodiment is also basically the same as the operation of the demodulation device of the first and second embodiments.

Figure 25:
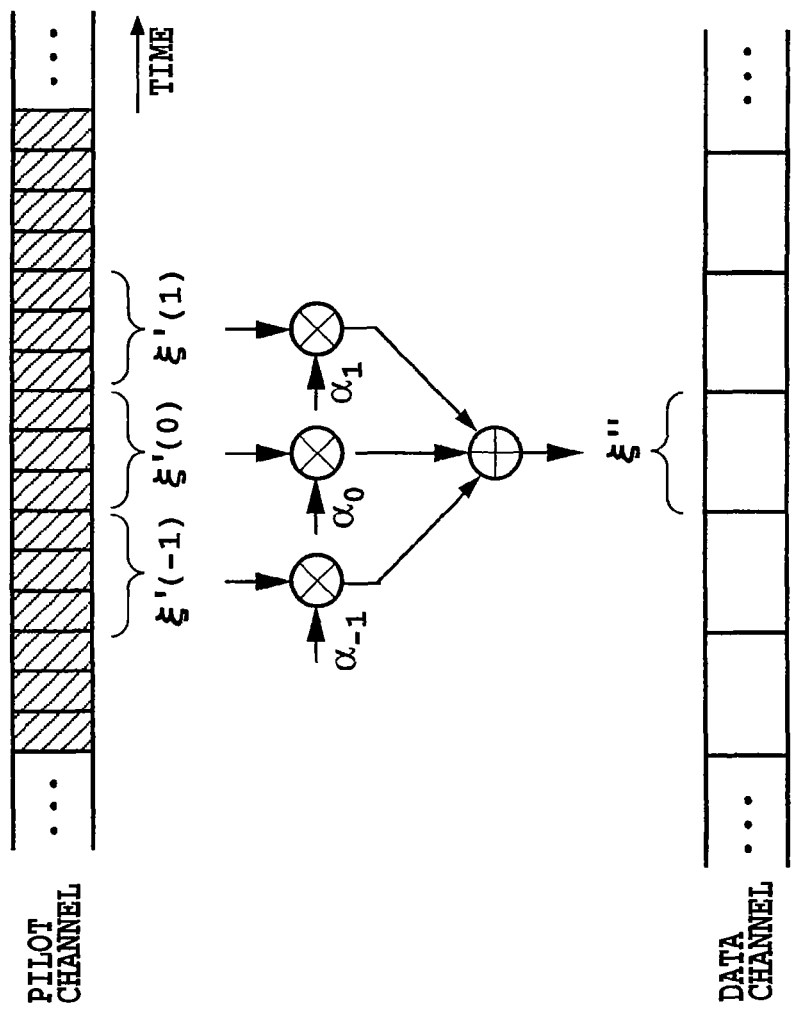
FIG. 25 is a drawing showing a case where data symbols in a data channel are divided into a plurality of data symbol intervals and a channel estimation value is calculated for every data symbol interval.

FIG. 25 is a drawing showing a case where data symbols in a data channel are divided into a plurality of data symbol intervals and a channel estimation value is calculated for every data symbol interval. In the example of FIG. 25, data symbols are divided into intervals, with each interval containing 3 symbols, and a channel estimation value is calculated using the corresponding pilot symbol interval (3-symbol configuration) on the time scale and pilot symbol intervals before and after. More specifically, channel estimation value $\xi''$ is calculated by weighting channel estimation value $\xi'(0)$ obtained from averaging the 3 symbols in the pilot symbol interval corresponding on the time scale, channel estimation values $\xi'(-1)$ and $\xi'(1)$ obtained from averaging during the pilot symbol intervals before and after, with $\alpha_0$, $\alpha_{-1}$ and $\alpha_1$, respectively and averaging them.

Figure 26:
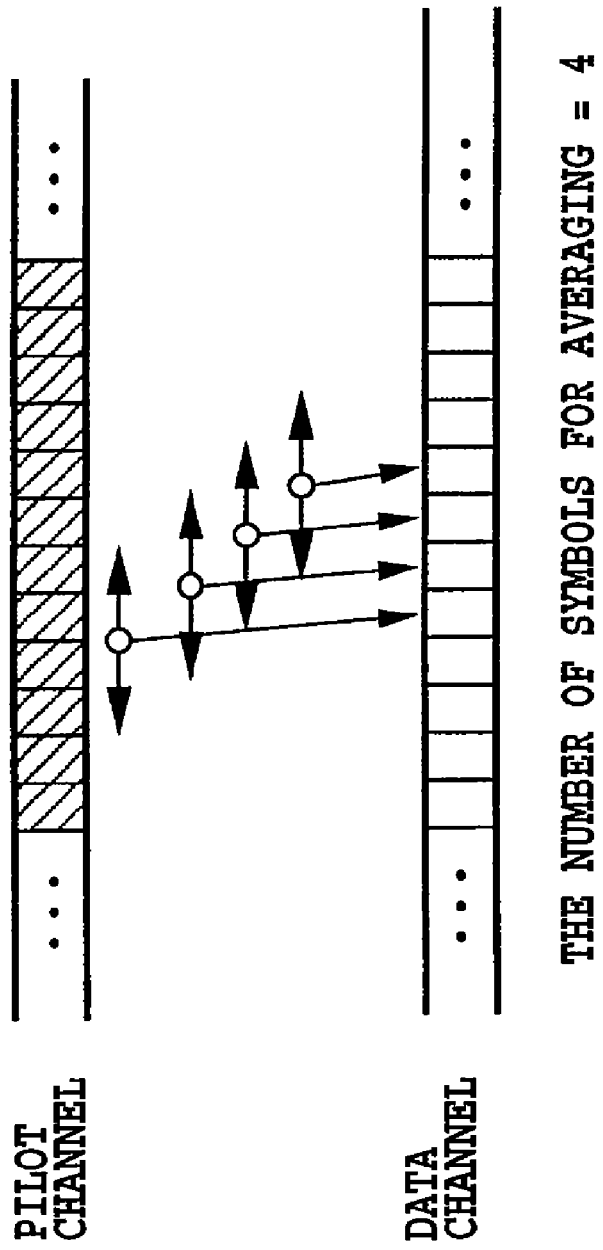
FIG. 26 is a drawing showing a case where data symbols in a data channel are divided into a plurality of data symbol intervals and a channel estimation value is calculated for every data symbol interval.
Figure 27:
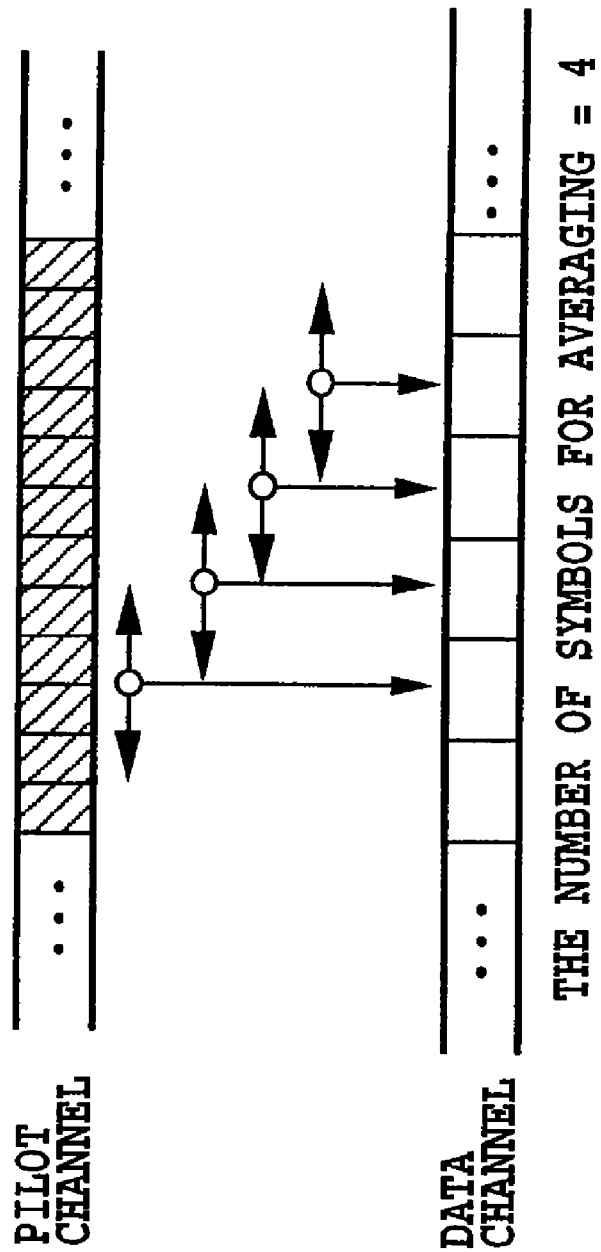
FIG. 27 is a drawing showing a case where data symbols in a data channel are divided into a plurality of data symbol intervals and a channel estimation value is calculated for every data symbol interval.

FIG. 26 and FIG. 27 are also drawings showing cases where data symbols in a data channel are divided into a plurality of data symbol intervals (one interval for one symbol) and a channel estimation value is calculated for every data symbol interval. In channel estimation, an average value for a certain number of pilot symbols is calculated while moving the symbol position successively. In the examples of FIG. 26 and FIG. 27, pilot symbols are directly weighted and averaged without weighting and averaging after obtaining an average value of pilot symbols as in the example of FIG. 25.

In the example of FIG. 26, four pilot symbols are used for weighting and averaging and a pilot symbol used for weighting and averaging is changed for every one data symbol. In the example of FIG. 27, four pilot symbols are used for weighting and averaging and a pilot symbol used for weighting and averaging is changed for every two data symbols.

In the present embodiment, the weighting factor used for weighting and averaging is changed according to a fading frequency. However, it is also possible to use a fixed weighting factor.

Figures 28A, 28B:
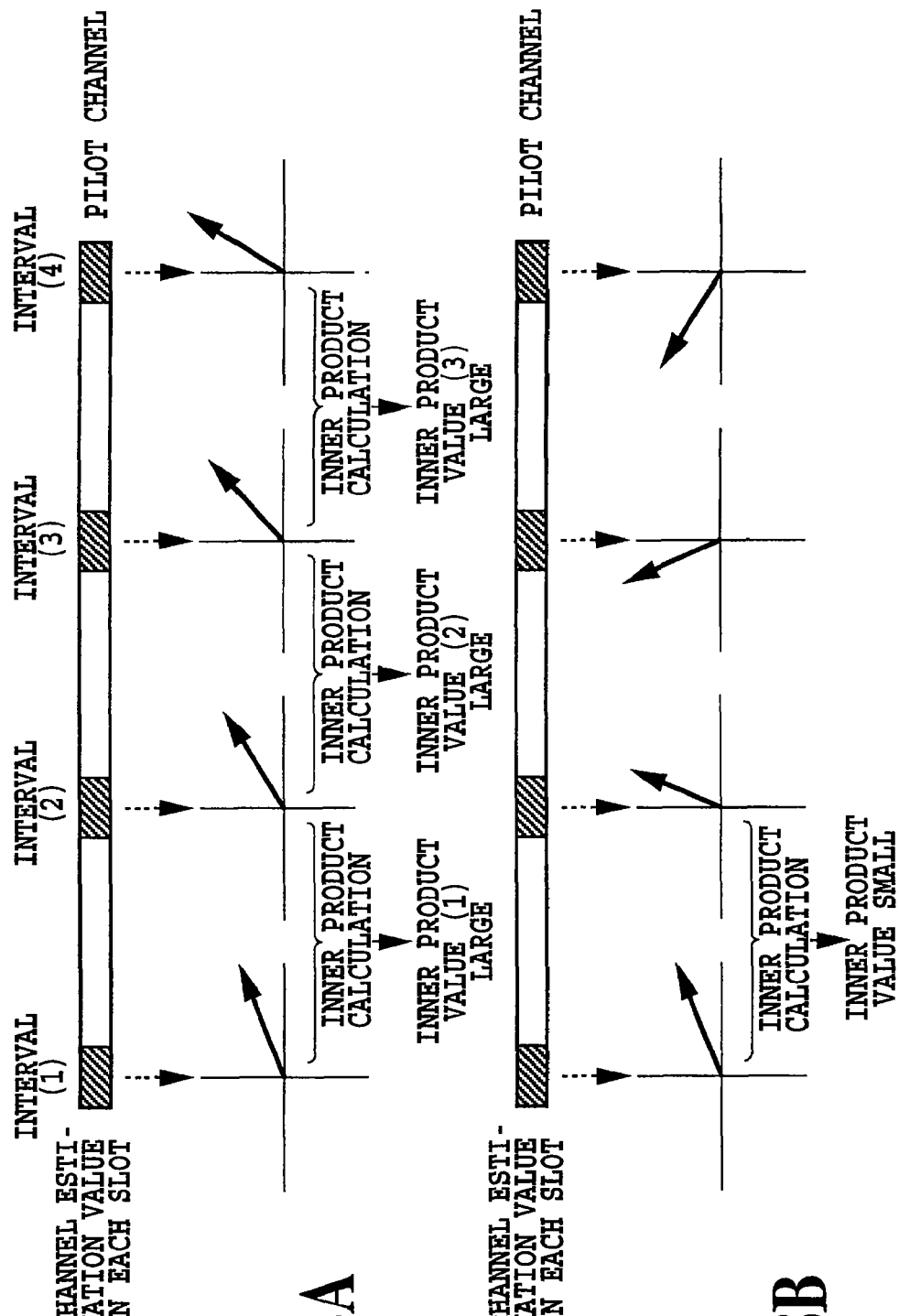
FIGS. 28A and 28B are drawings to explain the concept of determining a fading frequency.

FIG. 28A and FIG. 28B are drawings to explain the concept of determining a fading frequency. The fading frequency determining method of the present embodiment is basically the same as the fading frequency determining method of the first and second embodiments. In the first and second embodiments, an average value of pilot symbols of each of two slots is used. In the present embodiment, an average value of pilot symbols of each of two pilot channel intervals is used. The two intervals can be discontinuous or continuous (discontinuous in the case of FIG. 28). The number of pilot symbols included in one interval can be one or two or more.

In the present embodiment, as in the case of the first and second embodiments, if a calculated inner product value is larger than a predetermined value, it is possible to calculate the inner product value by increasing the interval (inner product measurement interval) at which a pilot symbol used for calculation of the inner product value is inserted. It is also possible to calculate two or more inner products by changing the inner product measurement interval and decides the fading frequency using those inner product values.

Channel fluctuations (fading fluctuations) after despreading whose timing is determined by the delay unit 304 are compensated using the channel estimation value obtained from the channel estimation unit 320. More specifically, channel fluctuations are compensated by multiplying the despread data symbols by a complex conjugate of the channel estimation value. Then, the compensated signals are combined in-phase by the RAKE combiner 310.

In the present embodiment, as in the case of the first embodiment, data channels and pilot channels can also have different transmission rates.

Fourth Embodiment

Figure 29:
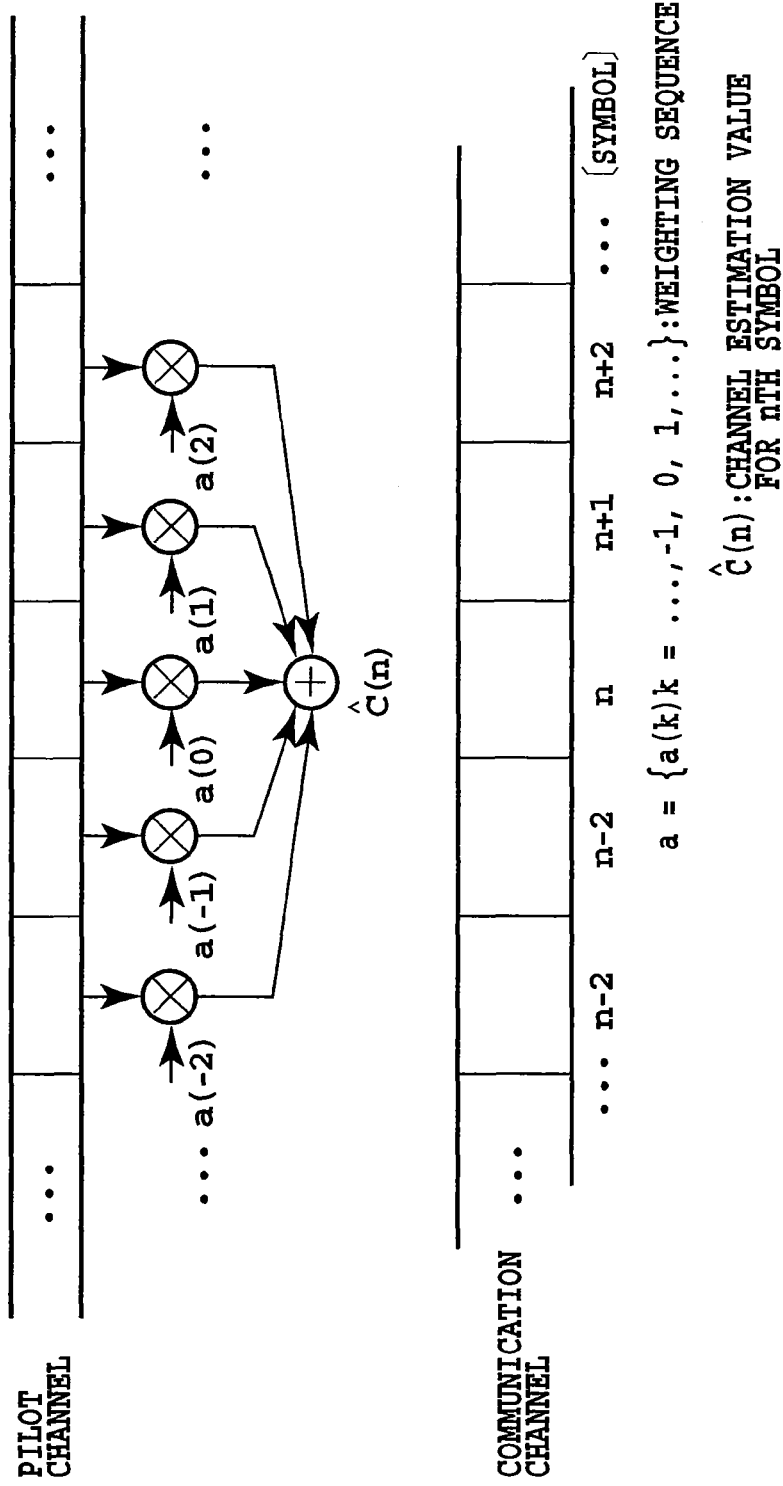
FIG. 29 is a drawing showing an example of channel estimation using pilot signals.

At first, an averaging method of a pilot signal in channel estimation to be used in the fourth to tenth embodiment of the present invention will be described with reference to FIG. 29. As shown in FIG. 29, from a communication counterpart station, a known pilot symbol of a transmission pattern (phase when a primary modulation is phase modulation) is transmitted together with an information data symbol. At this time, the pilot symbol is not transmitted continuously as shown in FIG. 29 but also intermittently. Namely, an insertion method of the pilot symbol may be a parallel time multiplexing system (FIG. 1), time multiplexing system (FIG. 16) and a parallel system (FIG. 22).

In order to perform estimation of phase fluctuation of a propagation path to perform compensation (phase correction) of a communication channel, a channel estimation value is derived by averaging the pilot signal of preceding and following zone of a reception data to be corrected the phase. In the example of FIG. 29, in order to derive a channel vector of N(th) symbol of the communication channel, preceding and following pilot signals are averaged using a weighting sequences a (here a={a(k)|k= ... −1, 0, 1, ... }

It should be noted that when averaging is performed using the weighting sequences, averaging is performed using the weighting sequences after simple averaging per arbitrary block greater than or equal to a chip unit.

In the fourth to tenth embodiment which will be described hereinafter in detail, in a demodulation device according to the direct sequence CDMA system, the channel estimation value is derived by weighted averaging of the pilot signal using a plurality of predetermined weighting sequences. Then, using the derived channel estimation value, the reception data is demodulated. By making judgment for credibility of a plurality of demodulation data, data of the highest quality is selected.

On the other hand, it is also possible to select some of weighting sequences on the basis of result of judgment of credibility of the demodulated data sequence in terms of a certain given period. In this case, demodulation is performed only by the weighting sequences selected, subsequently.
(Construction of the Fourth Embodiment)

Figure 30A:
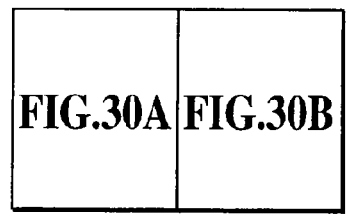
FIGS. 30A and 30B are block diagrams showing the fourth embodiment.
Figure 30A:
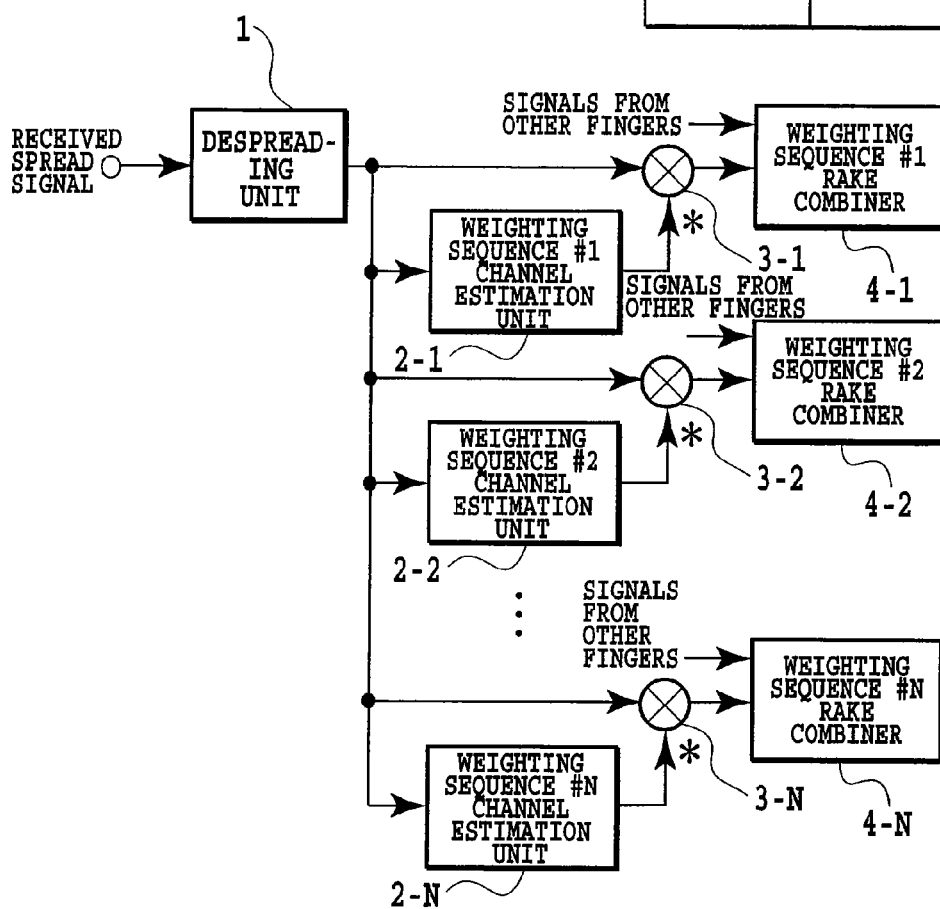
Figure 30B:
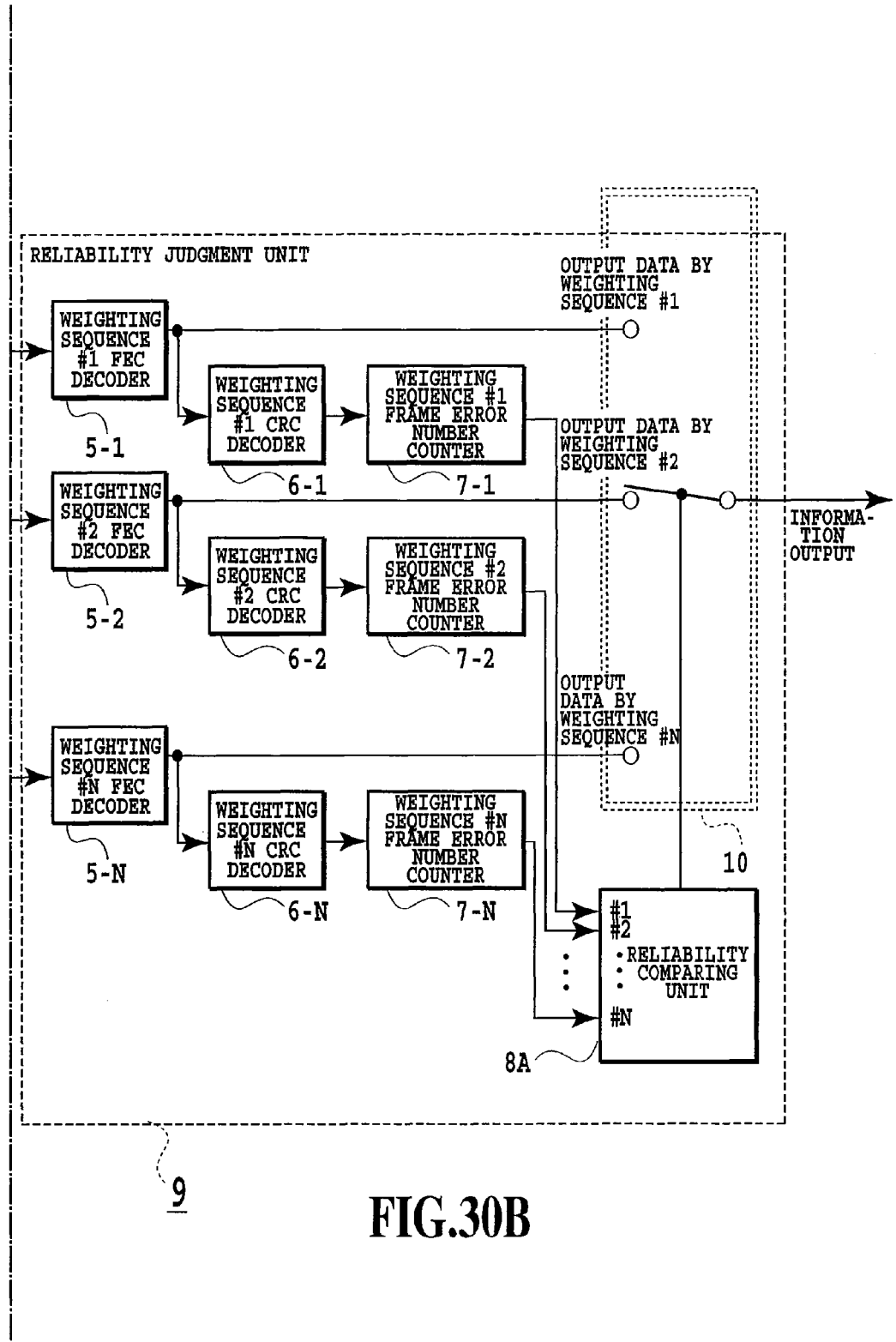

FIGS. 30A and 30B are block diagrams showing the fourth embodiment. In these drawings, 1 denotes a despreading unit, 2 (including 2-1 to 2-N) denote channel estimation units, 3 (including 3-1 to 3-N) denotes multipliers, 4 (including 4-1 to 4-N) denote RAKE combiners, 5 (including 5-1 to 5-N) denote FEC decoders, 6 (including 6-1 to 6-N) denote CRC decoders, 7 (including 7-1 to 7-N) denote frame error number counters, 8A denotes a reliability comparator, 9 denotes a reliability judgment unit and 10 denotes a first switch.
(Operation of Fourth Embodiment)

Next, operation of the fourth embodiment of the CDMA demodulation device shown in FIGS. 30A and 30B will be explained.

At first, a received spread signal is input to the despreader 1. The input reception spread data sequence is despread using a spread code replica depending upon a timing of multiple path.

In the channel estimation units 2, N (N≧2) in number of the weighting sequences for performing averaging of the pilot signals are provided. The pilot signals are averaged with respective weighting sequences in parallel to derive the channel estimation values.

In the multiplier 3, phase correction is performed by multiplying the despread data sequence of the communication channel with complex conjugate of respective channel estimation values.

Next, in the RAKE combiners 4, the signals after phase correction is coherent combined in all of RAKE fingers and input to the reliability judgment unit 9.

In the reliability judgment unit 9, at first, decoding of the error correction code is performed in the FEC decoders 5 to output N in number of decoded data of the weighting coefficient from #1 to #N.

In the CRC decoder 6, decoding of CRC is performed using the extracted CRC bit among decoded data sequence to make judgment whether frame error is present or not to input the result of judgment to the frame error number counter 7.

In the frame error number counter 7, counting of the frame error number present during a period of predetermined number of frames is performed to input the counted number to the reliability comparator 8.

In the reliability comparing and judgment unit 8A, the data sequence having the least frame error number is selected from the frame error information of N sequence to output the foregoing data by switching the first switch 10 to the desired sequence.
(Effect of Fourth Embodiment)

As explained above, by the fourth embodiment, channel estimation using a plurality of weighting coefficients is constantly performed and weighting coefficients corresponding to various motion speeds are used simultaneously by selecting data having high reliability through reliability judgment using the reception data sequence to permit channel estimation at high precision. On the other hand, using the result of CRC decoding, judgment to lower of the frame error ratio can be performed by selecting the weighting sequences having frame error.
(Modification of Fourth Embodiment)

In the explanation set forth above, while channel estimation to CRC decoding is performed constantly using N in number of weighting sequences, load of the system can be reduced by the following modification.

Figure 31A:
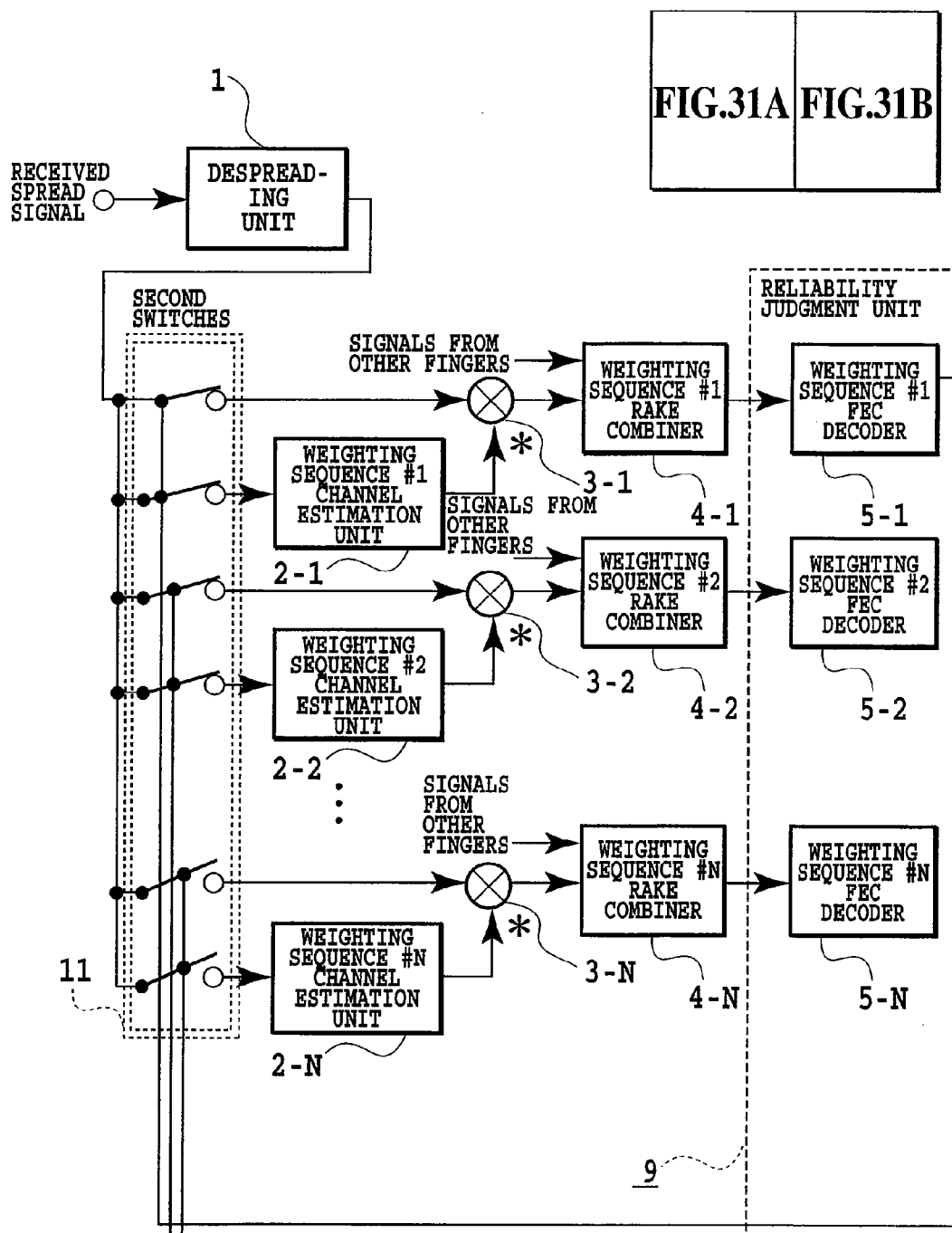
FIGS. 31A and 31B are diagrams showing a modification of the fourth embodiment.
Figure 31B:
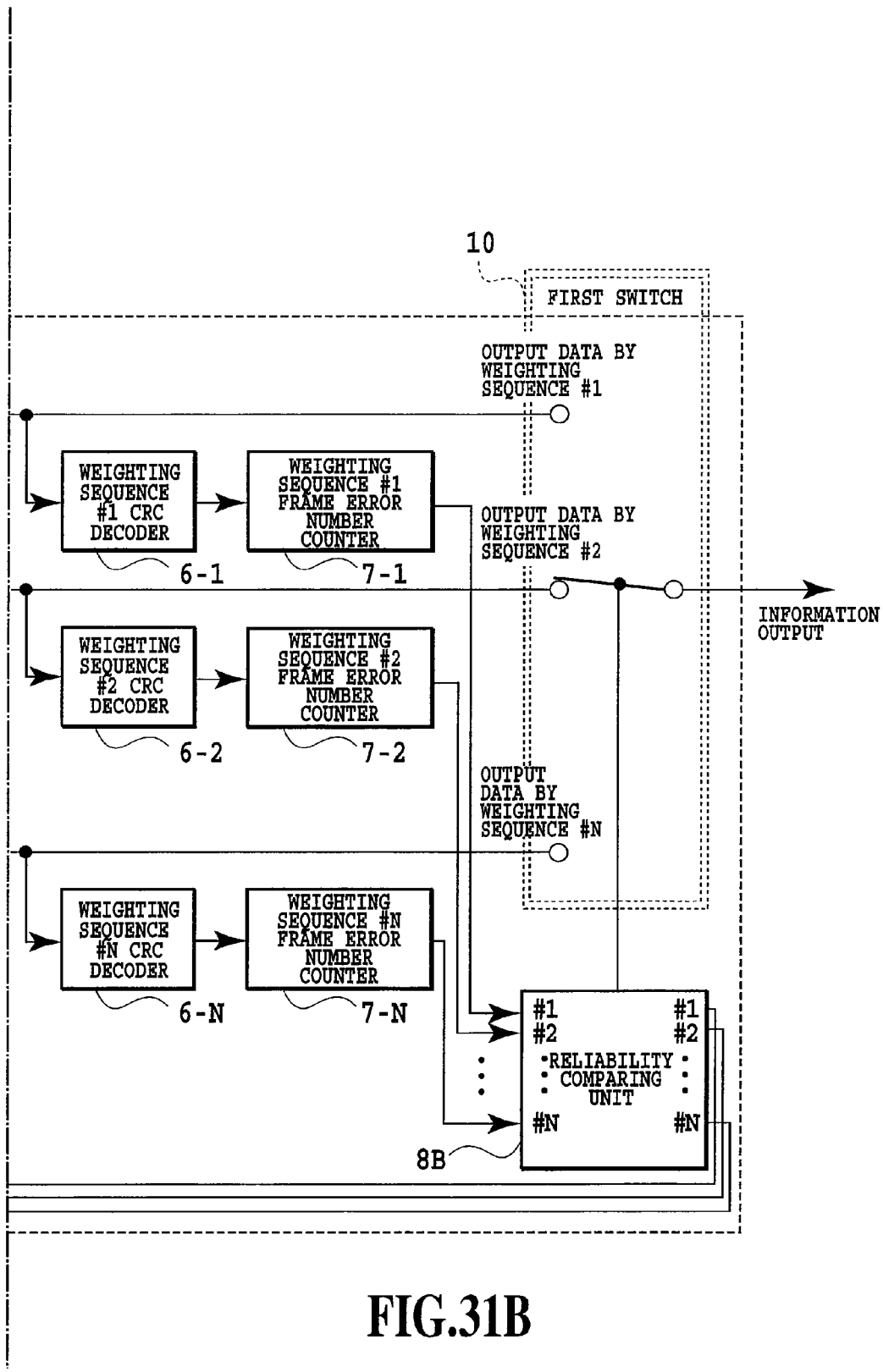

A modification of the fourth embodiment is shown in FIGS. 31A and 31B.

In FIGS. 31A and 31B, the same portions to those in the fourth embodiment shown in FIGS. 30A and 30B are identified by the same reference numerals. 11 denote second switches.

At every given period, concerning data sequence of the predetermined number of frames, all of the second switches 11 are turned ON to perform operation of the foregoing fourth embodiment is performed in N sequences. Also, in the reliability judgment unit 9, N' (here N': natural number, 1≦N'<N) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

It should be noted that FIGS. 31A and 31B show example in which two sequences of weighting sequences #1 and #2 are selected (N'=2) and only two sequences are in operating condition.

Fifth Embodiment (Construction of Fifth Embodiment)

Figure 32:
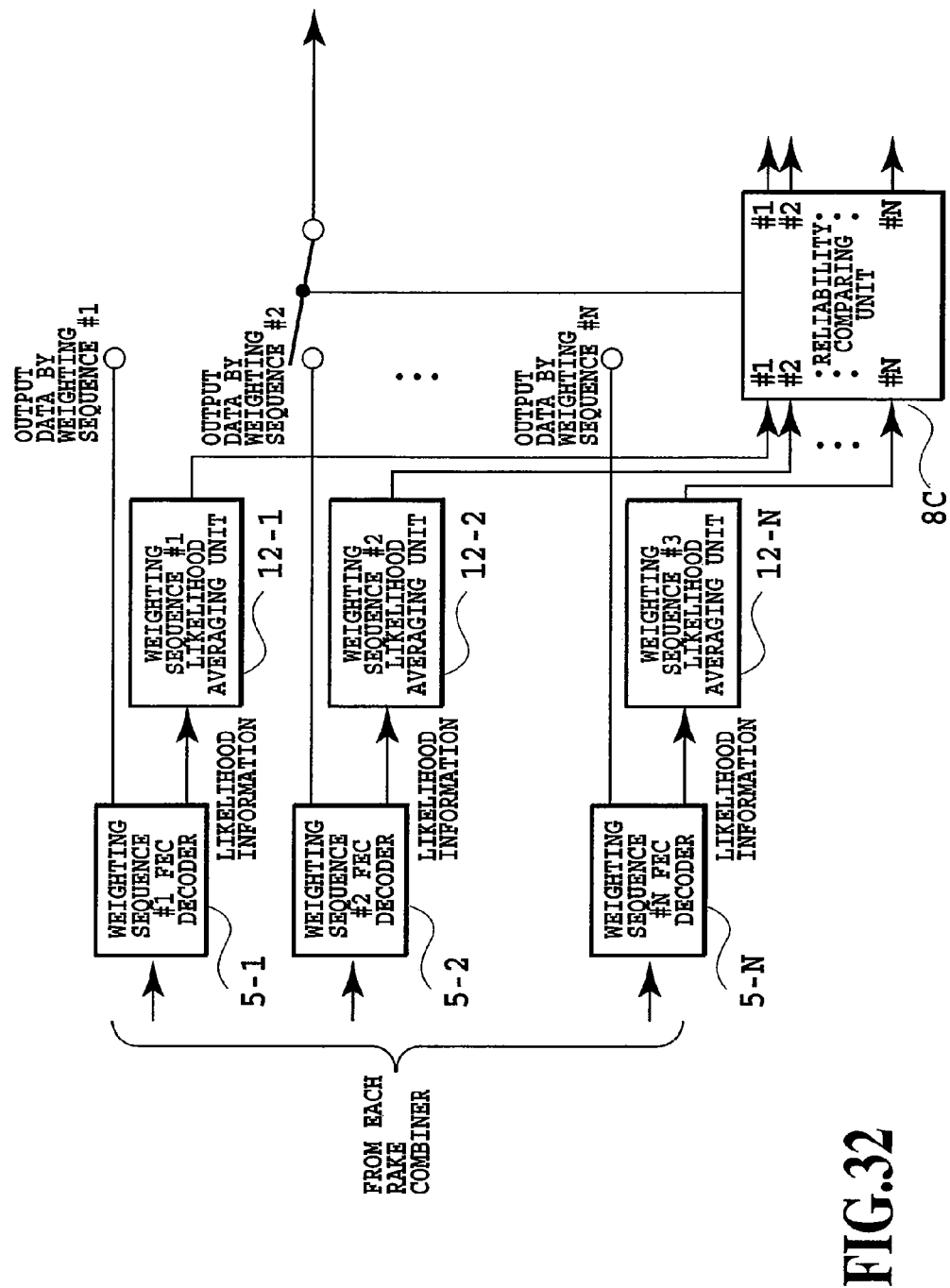
FIG. 32 is a block diagram showing the reliability judgment unit of the fifth embodiment.

FIG. 32 is a block diagram showing the reliability judgment unit of this fifth embodiment. Other functional blocks correspond to the fourth embodiment and will be omitted from disclosure. The same portions to the fourth embodiment shown in FIGS. 30A and 30B are identified by the same reference numerals. 12 (12-1 to 12-N) denote likelihood averaging units.

(Operation of Fifth Embodiment)

Next, operation of the fifth embodiment of the reliability judgment unit will be explained. Operation of other functional block corresponds to those of the fourth embodiment and explanation thereof is omitted.

The RAKE combined signal is input to the FEC decoder 5. In the FEC decoder 5, decoding of the error correction code is performed to output decoding data from the weighting sequence #1 to #N, and in conjunction therewith, likelihood information calculated upon error correction is input to the likelihood averaging unit 12.

In the likelihood averaging unit 12, input likelihood is averaged over the predetermined number of frames, Y frames (here, Y: natural number, Y≧1) to input to the reliability comparator 8. In the reliability comparator 8, from the likelihood information of the N sequences, the data sequence having the highest reliability is selected as information output.

(Effect of Fifth Embodiment)

As explained above, according to the fifth embodiment, by using the likelihood information calculated upon error correction decoding, judgment reflecting communication quality (bit error ratio or the like) can be performed.

(Modification 1 of Fifth Embodiment)

In the foregoing explanation, while channel estimation to CRC decoding is performed constantly using N in number of weighting sequences, load of the system can be reduced by the following modification.

The modification of the fifth embodiment can be constructed by replacing the reliability judgment unit of the modification of the fourth embodiment shown in FIGS. 31A and 31B with the fifth embodiment shown in FIG. 32.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, 1≦N'<N) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

(Modification 2 of Fifth Embodiment)

In the foregoing explanation, in the likelihood averaging unit 12, in addition to a method of simple averaging of the likelihood to predetermined number of frames, Y frames (here, Y: natural number, Y≧1), weighted averaging, method for selecting the minimum value and method for selecting the maximum value may be taken.

Sixth Embodiment (Construction of Sixth Embodiment)

Figure 33:
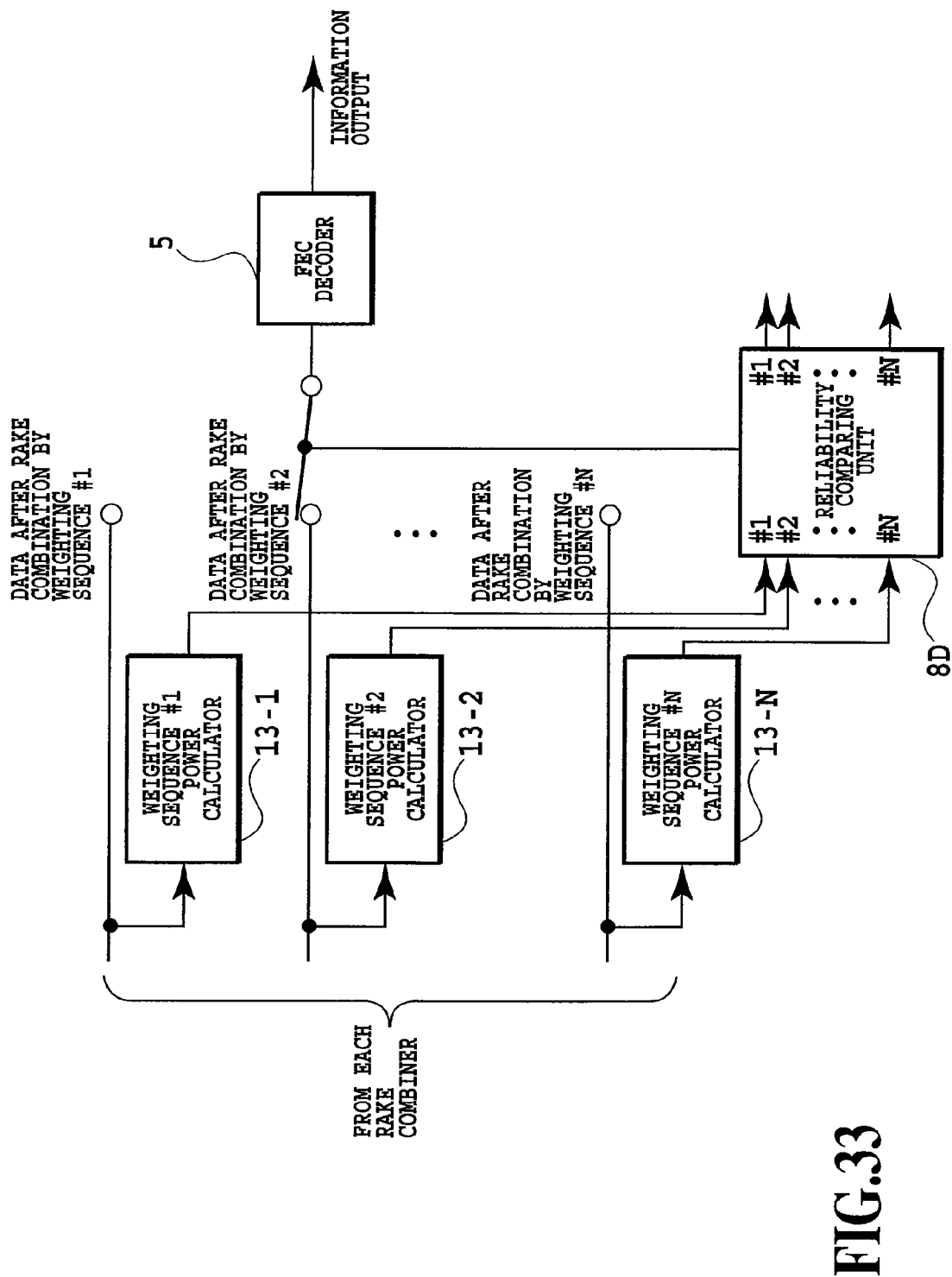
FIG. 33 is a block diagram showing the reliability judgment unit of the sixth embodiment.

FIG. 33 is a block diagram showing the reliability judgment unit of this sixth embodiment. Other functional blocks correspond to the fourth embodiment and will be omitted from disclosure. The same portions to the fourth embodiment shown in FIGS. 30A and 30B are identified by the same reference numerals. 13 (including 13-1 to 13-N) denote power calculators.

(Operation of Sixth Embodiment)

Next, operation of the sixth embodiment of the reliability judgment unit will be explained.

Operation of other functional block corresponds to those of the fourth embodiment and explanation thereof is omitted.

The RAKE combined signals are input to the power calculators 13. In the power calculators 13, powers of the signals after RAKE combination in N sequences are calculated and averaged over the predetermined period.

The averaged power calculated values are input to the reliability comparator. In the reliability comparing and judgment unit 8, the data sequence having the highest reliability is selected from the power calculated values in N sequences to input to the FEC decoder 5. In the error correction decoding is performed in the FEC decoder 5 and is output as information output.

(Effect of Sixth Embodiment)

As explained above, in the shown sixth embodiment, by using the reception power after RAKE combination in reliability judgment, judgment to make the reception power greater can be performed. Thus, communication quality (frame error ratio or the like) can be improved, and also, since judgment of reliability can be made by performing FEC decoding, reduction of the load of the system becomes possible.

(Modification of Sixth Embodiment)

In the foregoing explanation, channel estimation and power calculation is performed constantly using N in number of weighting sequences, load of the system can be reduced by the following modification.

The modification of the sixth embodiment can be constructed by replacing the reliability judgment unit of the modification of the fourth embodiment shown in FIGS. 31A and 31B with the sixth embodiment shown in FIG. 33.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, 1≦N'<N) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

Seventh Embodiment (Construction of Seventh Embodiment)

Figure 34:
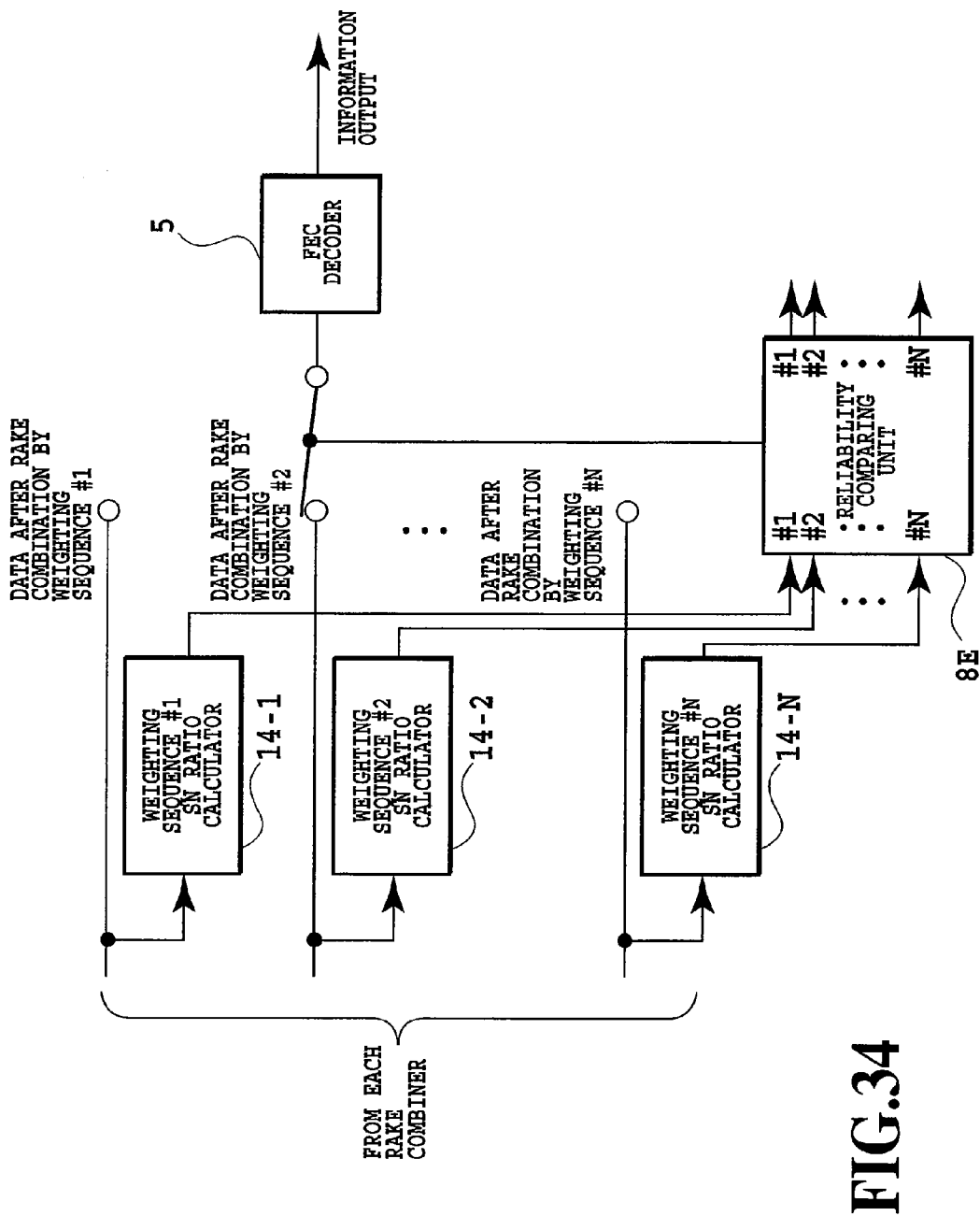
FIG. 34 is a block diagram showing the reliability judgment unit of the seventh embodiment.

FIG. 34 is a block diagram showing the reliability judgment unit of this seventh embodiment. Other functional blocks correspond to the fourth embodiment and will be omitted from disclosure. The same portions to the fourth embodiment shown in FIGS. 30A and 30B are identified by the same reference numerals. 14 (including 14-1 to 14-N) denote SN ratio calculators.

(Operation of Seventh Embodiment)

Next, operation of the seventh embodiment of the reliability judgment unit will be explained. Operation of other functional block corresponds to those of the fourth embodiment and explanation thereof is omitted.

The RAKE combined signals are input to the SN ratio calculators 12. In the SN ratio calculators 14, SN ratios of the signals after RAKE combination in N sequences are calculated and are averaged over the predetermined period. The averaged SN radio calculated values are input to the reliability comparator 8.

In the reliability comparator 8, the data sequence having highest reliability is selected among SN ratio calculated values in N sequences to be input to the FEC decoder 5. Error correction decoding is performed in the FEC decoder 5 to output as the information output.

(Effect of Seventh Embodiment)

As explained above, in the shown seventh embodiment, by using the SN ratio after RAKE combination in reliability judgment, judgment to make the SN ratio greater can be performed. Thus, communication quality (frame error ratio or the like) can be improved, and also, since judgment of reliability can be made by performing FEC decoding, reduction of the load of the system becomes possible.

(Modification of Seventh Embodiment)

In the foregoing explanation, channel estimation and SN ratio calculation is performed constantly using N in number of weighting sequences, load of the system can be reduced by the following modification.

The modification of the seventh embodiment can be constructed by replacing the reliability judgment unit of the modification of the fourth embodiment shown in FIGS. 31A and 31B with the seventh embodiment shown in FIG. 34.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, $1 \leq N' < N$) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

Eighth Embodiment (Construction of Eighth Embodiment)

Figure 35:
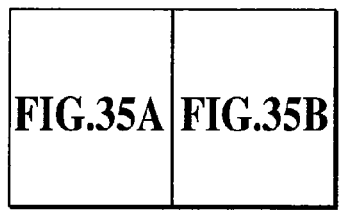
FIG. 35 is a diagram showing relationship between FIGS. 35A and 35B.
Figure 35A:
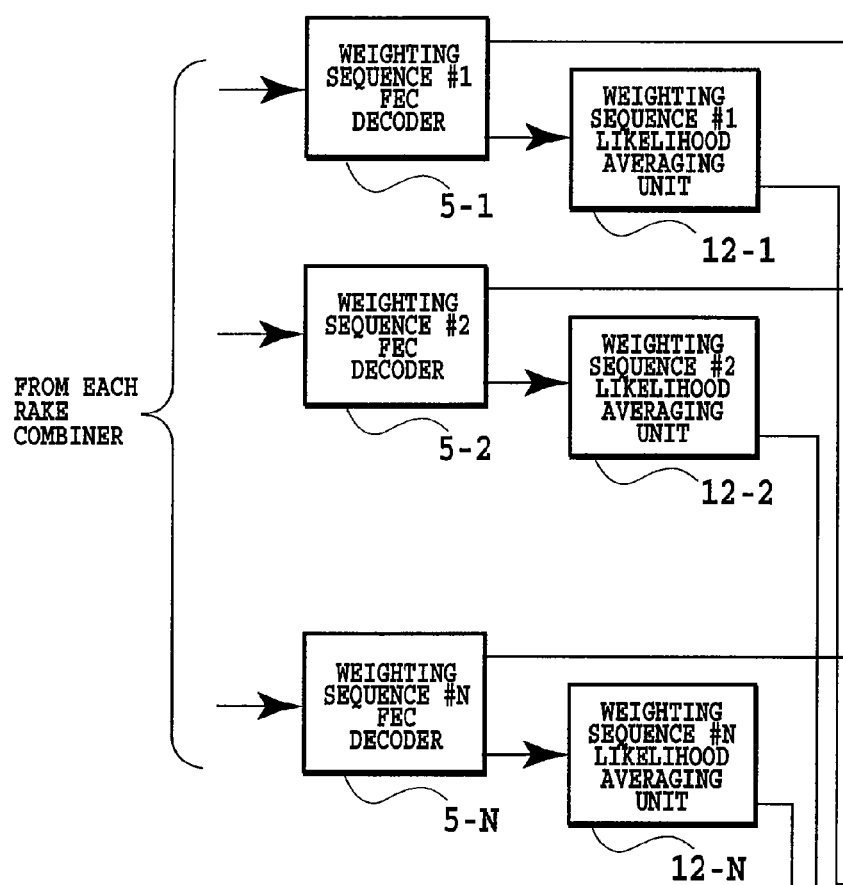
FIGS. 35A and 35B are block diagrams showing the reliability judgment unit of the eighth embodiment.
Figure 35B:
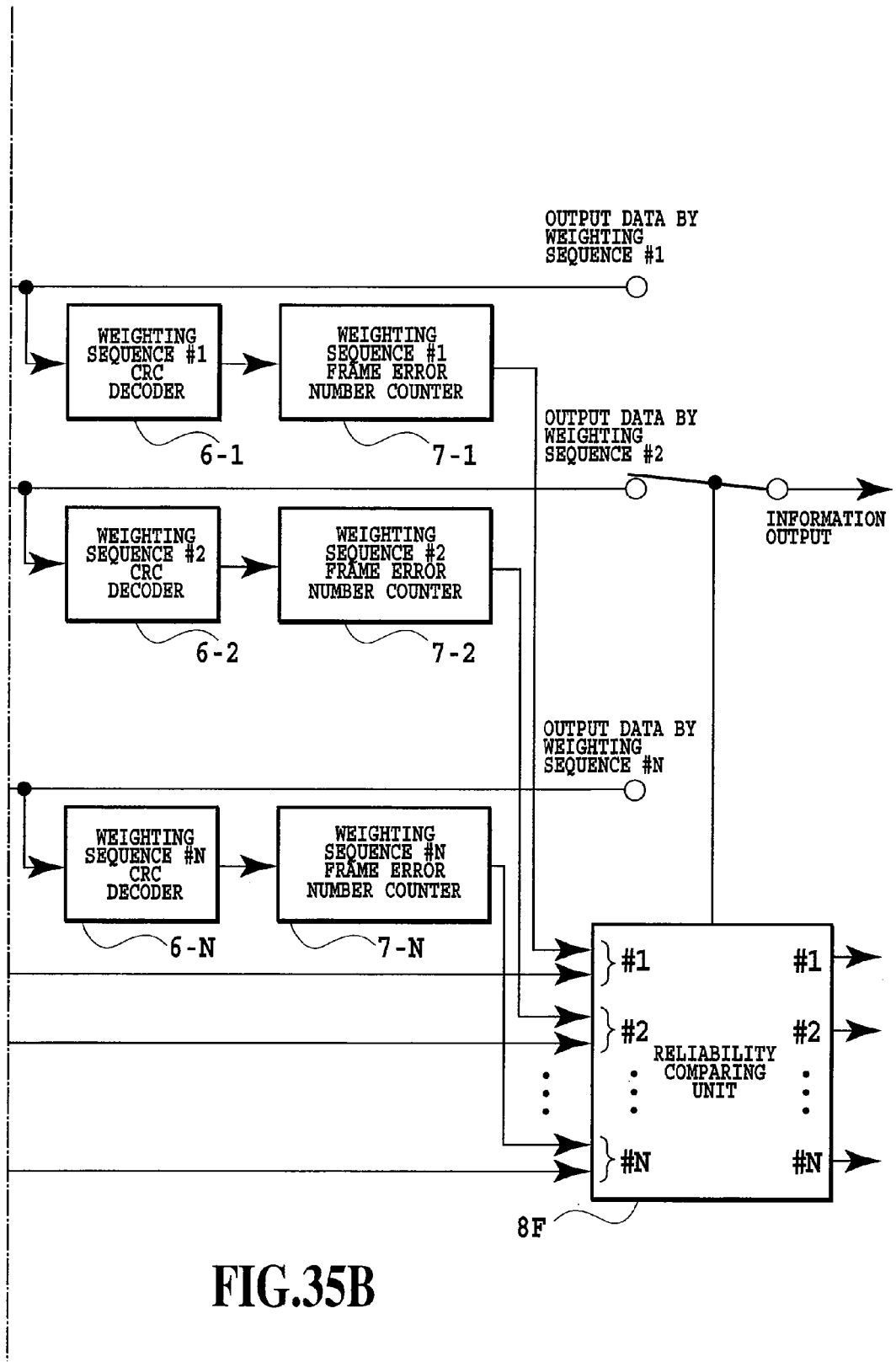

FIGS. 35A and 35B are block diagrams showing the reliability judgment unit of this Eighth embodiment. The functional blocks other than the reliability judgment unit correspond to the fourth embodiment and will be omitted from disclosure. The same portions to the fourth embodiment shown in FIGS. 30A and 30B are identified by the same reference numerals.

(Operation of Eighth Embodiment)

Next, operation of the eighth embodiment of the reliability judgment unit will be explained. Operation of other functional block corresponds to those of the fourth embodiment and explanation thereof is omitted.

The RAKE combined signals are input to the FEC decoders 5. Decoding of the error correction code is performed in the FEC decoders 5 to output decoded data with the weighting coefficients #1 to #N, and also, likelihood information calculated upon error correction is input to the likelihood averaging unit 12.

In the likelihood averaging unit 12, input likelihood is averaged over the predetermined number of frames, Y frames (here, Y: natural number, $Y \geq 1$) to input to the reliability comparator 8.

On the other hand, in the CRC decoder 6, decoding of CRC is performed using CRC bit extracted from the data sequences decoded by the FEC decoder 5 to make judgment whether the frame error is present or not to input the result of judgment to the frame error number calculator 7.

In the frame error number calculator 7, counting of the frame error number present in the predetermined Y2 frame (here Y2: natural number, $Y2 \geq 1$) is performed to input the counted number to the reliability comparator 8.

In the reliability comparator 8, the data sequence having the highest reliability is selected as the information output based on the likelihood information input from the likelihood averaging unit 12, among the sequences having the lest frame error number based on the frame error information of N sequences output from the frame error number calculator 7.

(Effect of Eighth Embodiment)

As explained above, in the shown Eighth embodiment, by using likelihood information calculated upon error correction decoding in addition to the counted frame error number from the result of CRC decoding, in reliability judgment, the judgment factors are mutually combined to permit strict reliability judgment.

(Modification 1 of Eighth Embodiment)

In the foregoing explanation, channel estimation and CRC decoding is performed constantly using N in number of weighting sequences, load of the system can be reduced by the following modification.

The modification of the Eighth embodiment can be constructed by replacing the reliability judgment unit of the modification of the fourth embodiment shown in FIGS. 31A and 31B with the eighth embodiment shown in FIGS. 35A and 35B.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, $1 \leq N' < N$) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

(Modification 2 of Eighth Embodiment)

In the foregoing explanation, in the likelihood averaging unit 12, in addition to a method of simple averaging of the likelihood to predetermined number of frames, Y frames (here, Y1: natural number, $Y1 \geq 1$), weighted averaging, method for selecting the minimum value and method for selecting the maximum value may be taken.

Ninth Embodiment (Construction of Ninth Embodiment)

Figure 36A:
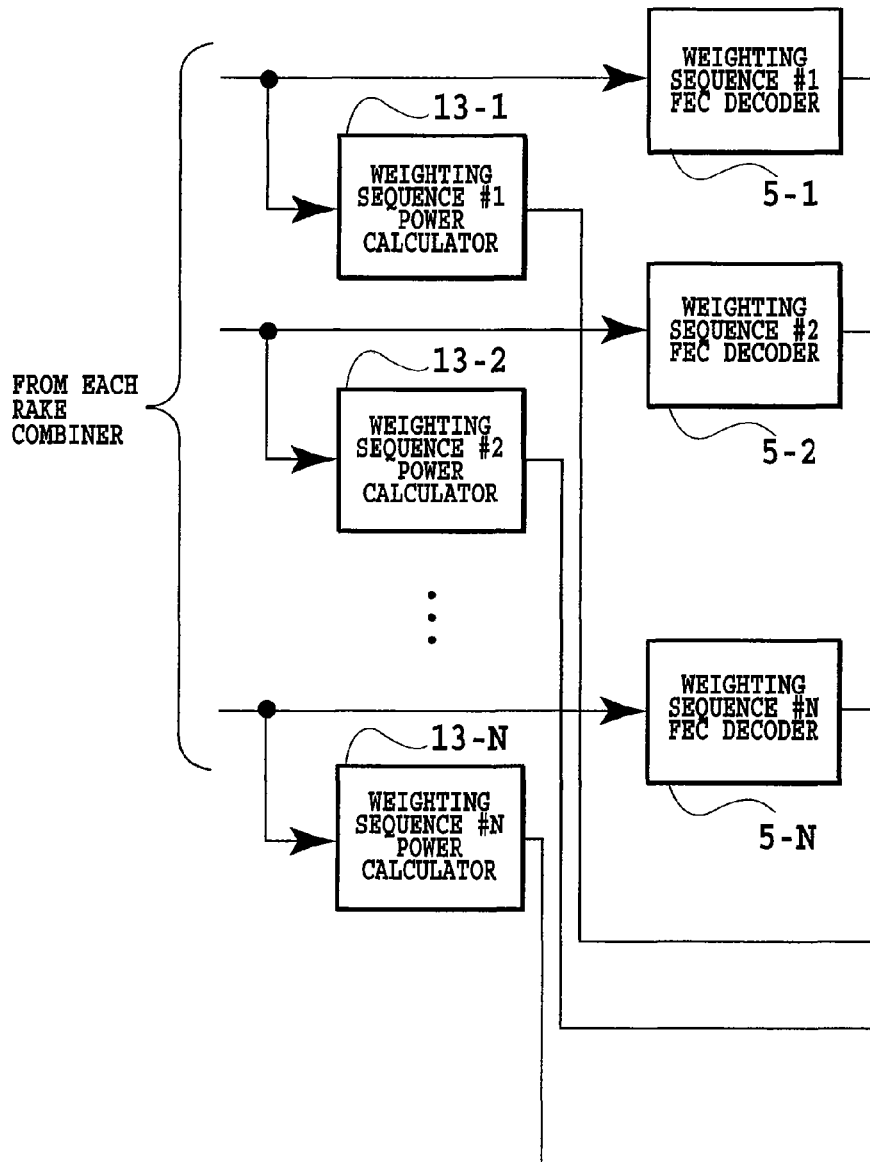
FIGS. 36A and 36B are block diagrams showing the reliability judgment unit of the ninth embodiment.
Figure 36B:
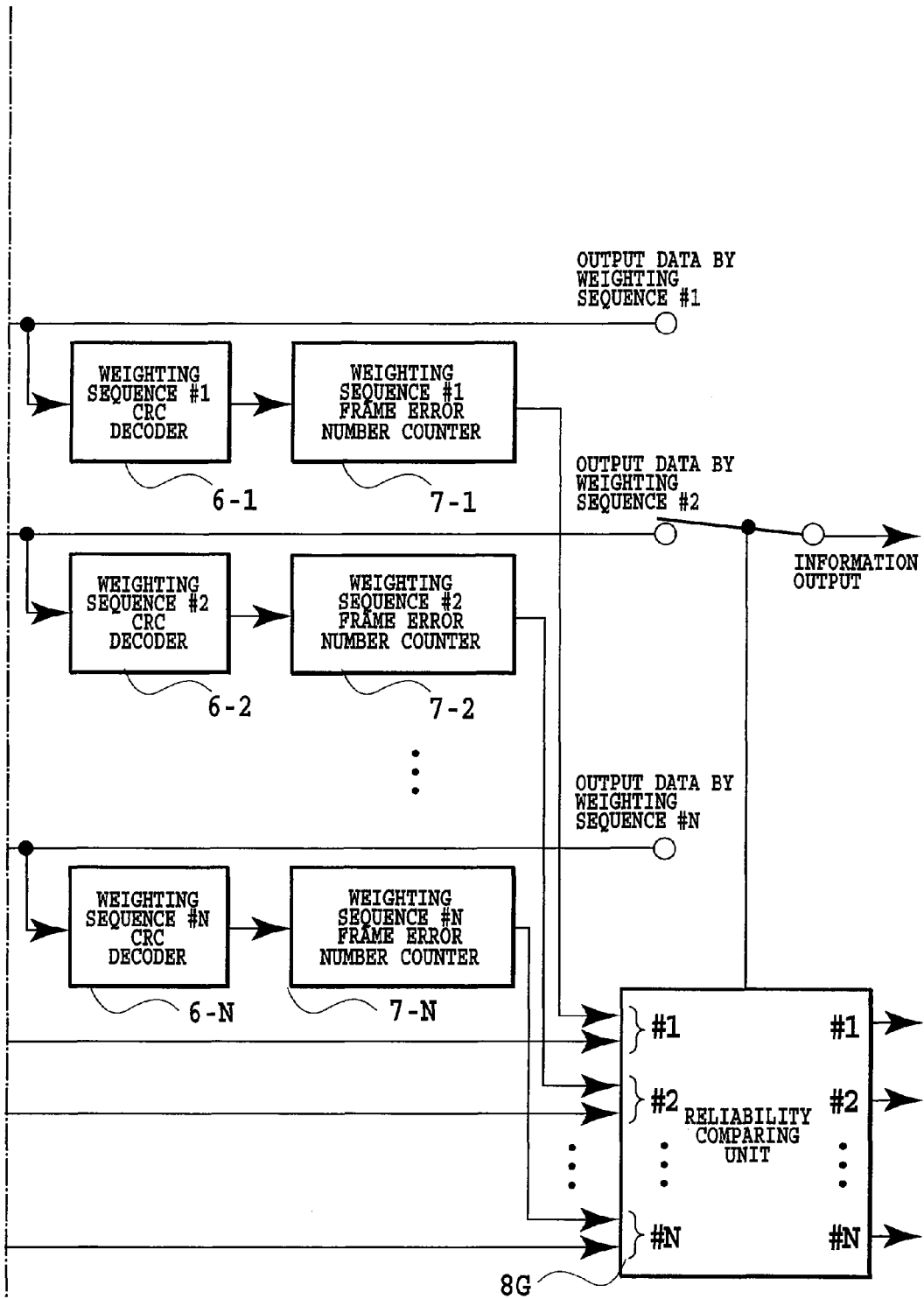

FIGS. 36A and 36B are block diagrams showing the reliability judgment unit of this ninth embodiment. The functional blocks other than the reliability judgment unit correspond to the fourth embodiment and will be omitted from disclosure. The same portions to the fourth embodiment shown in FIGS. 31A and 31B are identified by the same reference numerals.

(Operation of Ninth Embodiment)

Next, operation of the ninth embodiment of the reliability judgment unit will be explained. Operation of other functional block corresponds to those of the fourth embodiment and explanation thereof is omitted.

The RAKE combined signals are input to the power calculator 13. In the power calculator 13, the power of the signals after RAKE combination in N sequences are calculated. After averaging over the predetermined period, the calculated value is input to the reliability comparator 8.

On the other hand, in the FEC decoders 5, decoding of the error correction code is performed to output decoded data with the weighting coefficients #1 to #N, and, in the CRC decoder 6, decoding of CRC is performed using CRC bit extracted from the data sequences decoded by the FEC decoder 5 to make judgment whether the frame error is present or not to input the result of judgment to the frame error number calculator 7.

In the frame error number calculator 7, counting of the frame error number present in the predetermined Y frame (here Y2: natural number, $Y \geq 1$) is performed to input the counted number to the reliability comparator 8.

In the reliability comparator 8, the data sequence having the highest reliability is selected as the information output based on the power calculated value, among the sequences having the lest frame error number based on the frame error information of N sequences output from the frame error number calculator 7.

(Effect of Ninth Embodiment)

As explained above, in the shown ninth embodiment, by using the received power after RAKE combination in addition to the counted frame error number from the result of CRC decoding, in reliability judgment, the judgment factors are mutually combined to permit strict reliability judgment.

(Modification 1 of Ninth Embodiment)

In the foregoing explanation, channel estimation and CRC decoding is performed constantly using N in number of weighting sequences, load of the system can be reduced by the following modification.

The modification of the ninth embodiment can be constructed by replacing the reliability judgment unit of the modification of the fourth embodiment shown in FIGS. 31A and 31B with the ninth embodiment shown in FIGS. 36A and 36B.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, $1 \leq N' < N$) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

Tenth Embodiment (Construction of Tenth Embodiment)

Figure 37A:
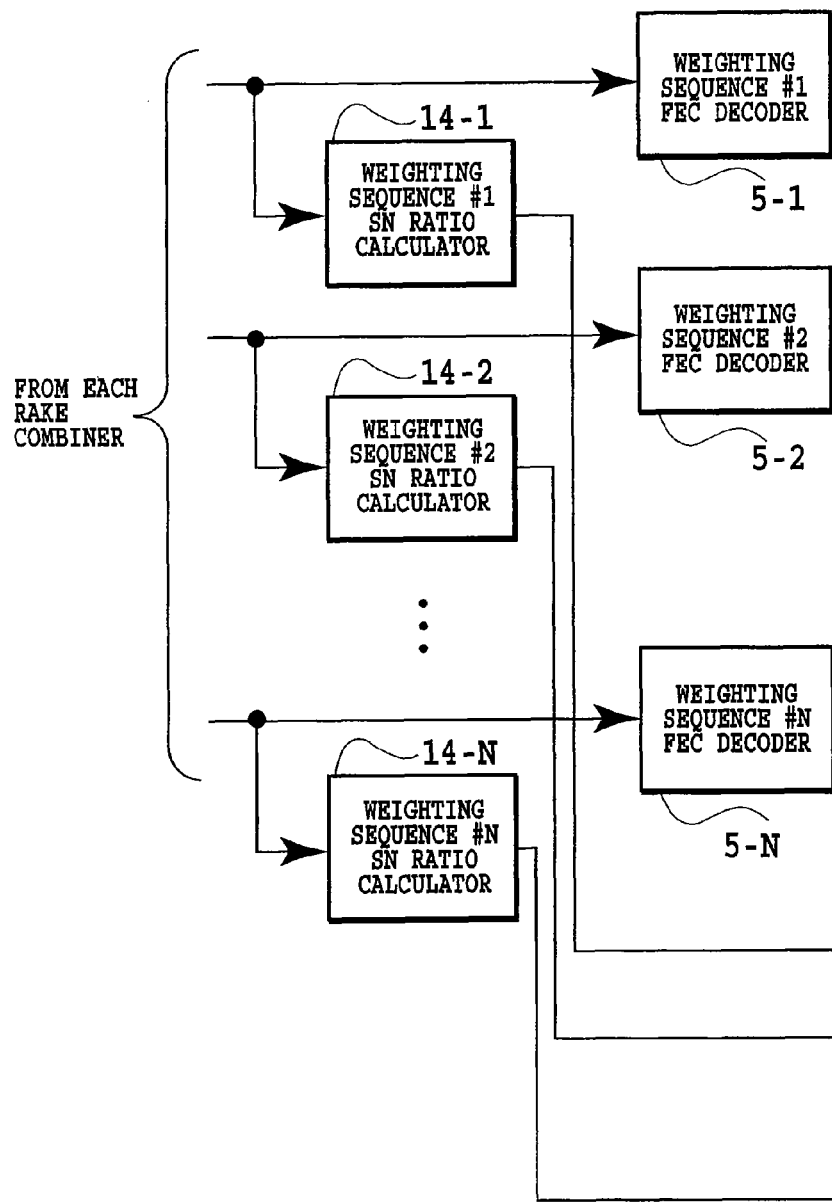
FIGS. 37A and 37B are block diagrams showing the reliability judgment unit of the tenth embodiment.
Figure 37B:
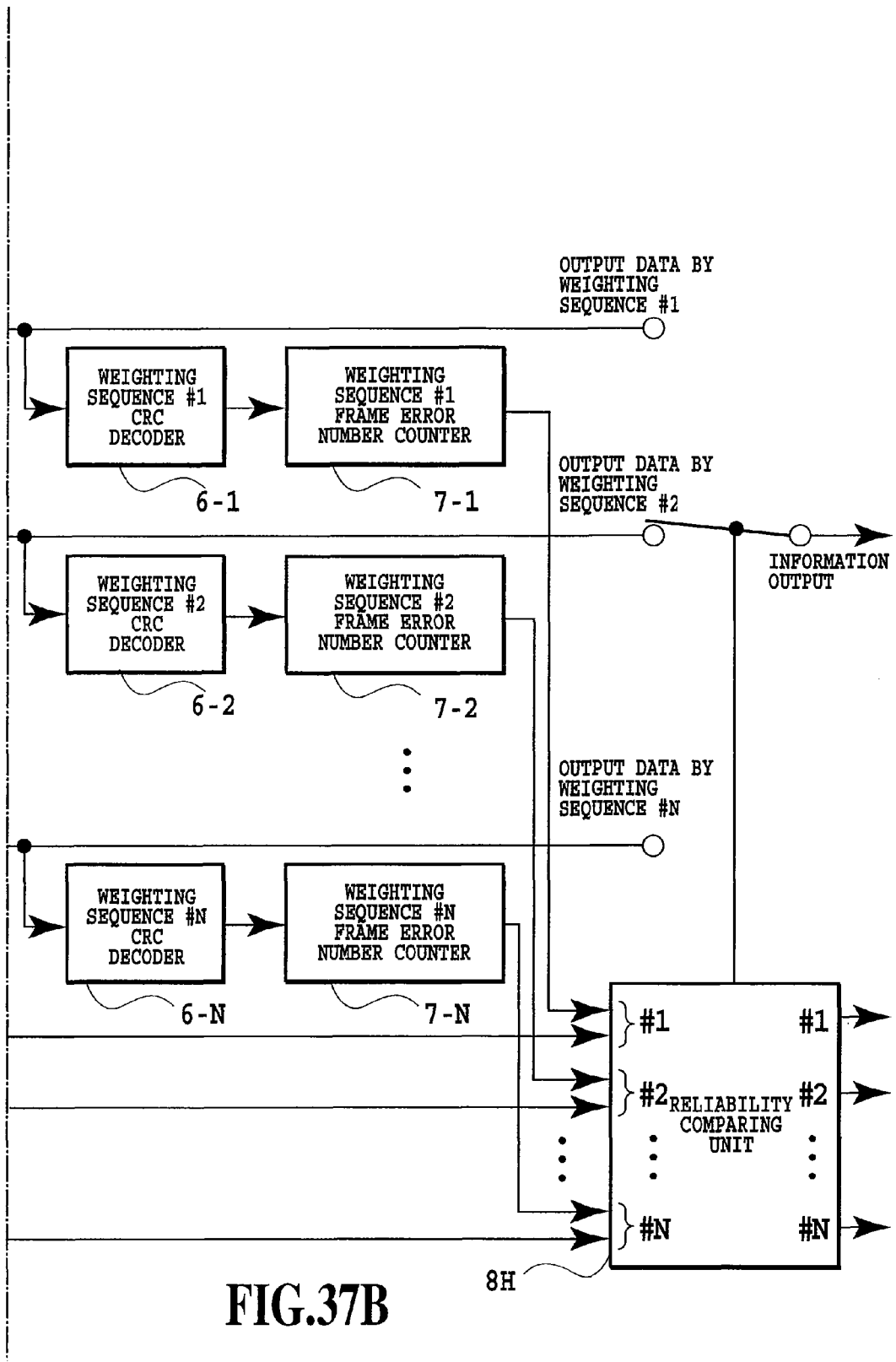

FIGS. 37A and 37B are block diagrams showing the reliability judgment unit of this tenth embodiment. The functional blocks other than the reliability judgment unit correspond to the fourth embodiment and will be omitted from disclosure. The same portions to the fourth embodiment shown in FIGS. 31A and 31B are identified by the same reference numerals.

(Operation of Tenth Embodiment)

Next, operation of the tenth embodiment of the reliability judgment unit will be explained. Operation of other functional block corresponds to those of the fourth embodiment and explanation thereof is omitted.

The RAKE combined signals are input to the SN ratio calculators 12. In the SN ratio calculators 14, SN ratios of the signals after RAKE combination in N sequences are calculated and are averaged over the predetermined period. The averaged SN radio calculated values are input to the reliability comparator 8.

On the other hand, in the FEC decoders 5, decoding of the error correction code is performed to output decoded data with the weighting coefficients #1 to #N, and, in the CRC decoder 6, decoding of CRC is performed using CRC bit extracted from the data sequences decoded by the FEC decoder 5 to make judgment whether the frame error is present or not to input the result of judgment to the frame error number calculator 7.

In the frame error number calculator 7, counting of the frame error number present in the predetermined Y frame (here Y2: natural number, $Y \geq 1$) is performed to input the counted number to the reliability comparator 8.

In the reliability comparator 8, the data sequence having the highest reliability is selected as the information output based on the SN ratio calculated value, among the sequences having the least frame error number based on the frame error information of N sequences output from the frame error number calculator 7.

(Effect of Tenth Embodiment)

As explained above, in the shown tenth embodiment, by using the SN ratio after RAKE combination in addition to the counted frame error number from the result of CRC decoding, in reliability judgment, the judgment factors are mutually combined to permit strict reliability judgment.

(Modification 1 of Tenth Embodiment)

In the foregoing explanation, channel estimation and CRC decoding is performed constantly using N in number of weighting sequences, load of the system can be reduced by the following modification.

The modification of the tenth embodiment can be constructed by replacing the reliability judgment unit of the modification of the fourth embodiment shown in FIGS. 31A and 31B with the tenth embodiment shown in FIGS. 37A and 37B.

At every given period, concerning data sequence of the predetermined number of frames, all of the second switches 11 are turned ON to perform operation of the foregoing fourth embodiment is performed in N sequences. Also, in the reliability judgment unit, N' (here N': natural number, $1 \leq N' < N$) in number of weighting sequences having high reliability in the foregoing frame number are selected. After judgment of reliability, concerning remaining data sequence until performing reliability judgment again in the foregoing time interval, only second switches 11 of the selected weighting sequences are turned ON, and other weighting sequences are turned OFF. Thus, similar operation to the foregoing fourth embodiment is performed in N' sequences using selected N' in number of weighting sequences.

(Summarization of Fourth to Tenth Embodiments)

Figure 38:
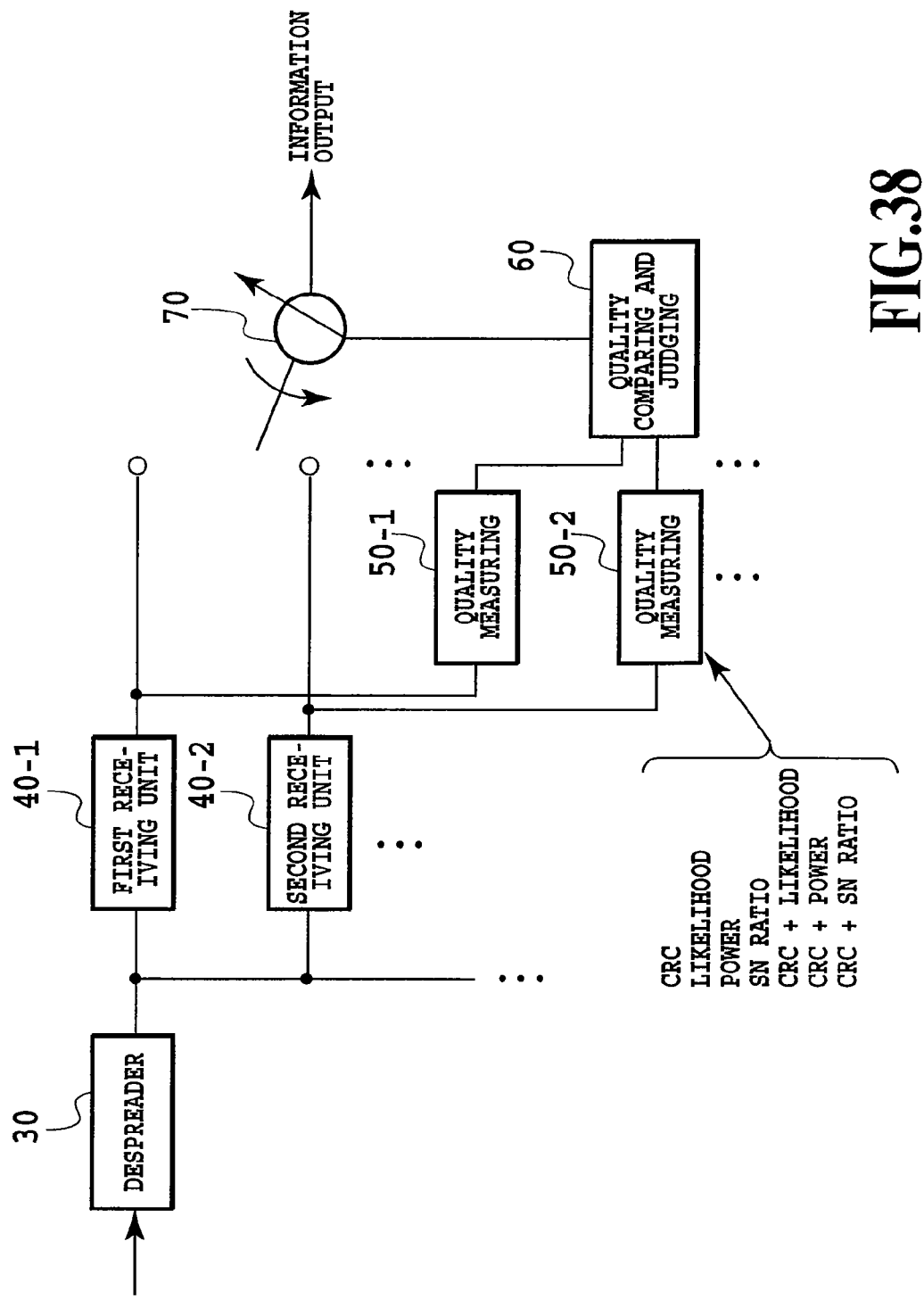
FIG. 38 is an illustration showing a dominant conception in the fourth to tenth embodiments.

FIG. 38 is an illustration showing a dominant conception in the fourth to tenth embodiments explained above. In FIG. 38, 30 denotes despreader, 40 (including 40-1 to 40-N) denote receiving unit, 50 (including 50-1 to 50-N) denote quality measuring units, 60 denotes a quality comparing and judging unit, and 70 denotes an output switch.

Namely, in the demodulation device according to the direct sequence CDMA system, weighted averaging of the pilot signal using predetermined plurality of weighting sequences is performed to derive the channel estimation values. Then, using the derived channel estimation values, the received data is demodulated (40) to make judgment of reliability of a plurality of demodulation data to select one of output data of the best quality (50, 60, 70).

On the other hand, concerning a certain given period, it is possible to select some of the weighting sequences on the basis of the result of judgment of the reliability of the demodulated data sequences. In this case, subsequently, demodulation is performed only by the selected weighting sequences.

It should be noted that, as the channel estimation unit 2 of the fourth to the tenth embodiments, the channel estimation units 120, 220 and 320 in the first to third embodiments may also be used.

As described above, according to the present invention, accurate channel estimation can be carried out in the parallel time multiplexing method by subjecting pilot symbols to weighted averaging to calculate a channel estimated value for data symbols in a data channel.

In addition, accurate channel estimation can be carried out by dividing data symbols within a slot into a plurality of data symbol sections, selecting pilot symbols appropriate for calculation of a channel estimated value for data symbols within each of the data symbol sections, and subjecting the pilot symbols to weighted averaging to calculate the channel estimated value for the data symbols in each data symbol section.

Further, a fading frequency can be decided based on an inner product value of the pilot symbols. In addition, channel estimation optimal for the fading frequency can be realized using a simpler configuration.

Once accurate channel estimation has been achieved, the absolute synchronous detection method can be used to reduce the SNIR required to obtain a required reception quality (reception error rate). As a result, the required transmission power can be diminished to increase the capacity for system subscribers.

The results of decision obtained by the fading frequency decision unit can be used not only for setting the weight factor for channel estimation but also for operation switching or parameter setting for various individual techniques the performance (transmission characteristic) of which is affected by the movement speed of a mobile terminal (portable terminal), for example, switching between an operative and inoperative states for transmission power control or for transmission diversity.

In addition, according to the present invention, a weight sequence effective on a movement speed is directly determined from reception quality for use, thereby enabling improvement of communication quality, a reduction in transmission power required, and an increase in communication capacity achieved. More specifically, the present invention can provide the following effects:

(1) Since weight sequences suitable for various movement speeds can be sequentially selected, accurate channel estimation is possible. This enables a reduction in transmission power required, improvement of reception quality, and an increase in communication capacity achieved.

(2) Except for a fixed period of time, a selected one of the weight sequences alone can be used to simplify the system.

(3) By using the CRC to determine the reliability of data, accurate reliability determination can be achieved.

(4) By using the likelihood obtained during recovery of the FEC to determine the reliability of data, accurate reliability determination can be accomplished.

(5) By using the power or SN ratio of the data sequence during data reliability determination, the reliability can be determined faster and more simply, thereby restraining an increase in hardware scale.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A channel estimation device that calculates a channel estimation value of data symbols of using pilot symbols in a channel in which said data symbols and said pilot symbols are time multiplexed, said channel estimation device comprising:

weighting factor generating means for dividing data symbols in a slot of said channel into a plurality of data symbol sections, each of which includes a plurality of data symbols, selecting for each data symbol section pilot symbols suitable for calculation of a channel estimation value of the data symbols in the data symbol section, and generating for each data symbol section weighting factors which are to be used for weighting and averaging the pilot symbols and which vary from data symbol section to data symbol section in a slot; and channel estimation value calculating means for weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections in the slot of said channel.

2. A channel estimation device that calculates a channel estimation value of data symbols of a data channel using pilot symbols of a pilot channel which is parallel multiplexed with said data channel, said channel estimation device comprising:

weighting factor generating means for dividing data symbols in said data channel into a plurality of data symbol sections, each of which includes a plurality of data symbols, selecting for each data symbol sectio pilot symbols suitable for calculation of a channel estimation value of the data symbols in the data symbol section, and generating for each data symbol section; weighting factors to be used for weighting and averaging the pilot symbols; and channel estimation value calculating means for weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections of said data channel.

3. The channel estimation device as claimed in claim 2, wherein a transmission rate of said data channel differs from a transmission rate of said pilot channel.

4. A demodulation device comprising:
weighting factor generating means for dividing data symbols in a slot of a channel in which said data symbols and said pilot symbols are time multiplexed into a plurality of data symbol sections, each of which includes a plurality of data symbols, selecting for each data symbol section pilot symbols appropriate for calculating a channel estimation value of the data symbols in the data symbol section, and generating for each data symbol section weighting factors which are to be used for weighting and averaging said pilot symbols and which vary from data symbol section to data symbol section in a slot;
channel estimation value calculating means for weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections in the slot of said channel; and
channel variation compensating means for compensating channel variation of said data symbols using the channel estimation values calculated by said channel estimation value calculating means.

5. A demodulation device comprising:
weighting factor generating means for dividing data symbols of a data channel into a plurality of data symbol sections, each of which includes a plurality of data symbols, selecting for each data symbol section, pilot symbols of a pilot channel that is parallel multiplexed with said data channel, appropriate for calculating a channel estimation value of the data symbols in the data symbol section, and generating for each data symbol section, weighting factors to be used for weighting and averaging the pilot symbols;
channel estimation value calculating means for weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections of said data channel; and
channel variation compensating means for compensating channel variation of said data symbols using the channel estimation values calculated by said channel estimation value calculating means.

6. A demodulation device comprising:
channel estimating means for deriving N (N is a natural number greater than or equal to two) channel estimation values by weighted averaging of pilot signals in time using, in each finger, N predetermined weighting sequences in N channel estimation units, each of the N channel estimation units using one of the N predetermined weighting sequences;
compensating means for compensating N data sequences using said respective N channel estimation values in each of the fingers;
RAKE combining means for RAKE combining each of said N data sequences after compensation by the compensating means with signals from other fingers, thereby producing N RAKE combined data sequences; and
reliability judgment means for selecting one RAKE combined data sequence having highest reliability from said N RAKE combined data sequences after RAKE combination.

7. A channel estimation method for calculating a channel estimation value of data symbols using pilot symbols in a channel in which said data symbols and pilot symbols are time multiplexed, comprising the steps of:
dividing data symbols in a slot of said channel into a plurality of data symbol sections, each of which includes a plurality of data symbols;
selecting for each data symbol section pilot symbols appropriate for calculating a channel estimation value of the data symbols in the data symbol section;
generating for each data symbol section weighting factors which are to be used for weighting and averaging the pilot symbols and which vary from data symbol section to data symbol section in a slot; and
weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections in the slot of said channel.

8. A channel estimation method for calculating a channel estimation value of data symbols of a data channel using pilot symbols of a pilot channel that is parallel multiplexed together with said data channel, comprising the steps of:
dividing data symbols of said data channel into a plurality of data symbol sections, each of which includes a plurality of data symbols;
selecting for each data symbol section pilot symbols appropriate for calculating a channel estimation value of the data symbols in the data symbol section;
generating for each data symbol section weighting factors to be used for weighting and averaging the pilot symbols; and
weighting and averaging said pilot symbols using said weighting factors, thereby calculating channel estimation values of the data symbols in the data symbol sections, wherein each channel estimation value is calculated in the weighting and averaging such that multiple weighting factors are used and each weighting factor is applied to multiple pilot symbols, and wherein each channel estimation value commonly corresponds to all of the data symbols in a single data symbol section among the plurality of data symbol sections of said data channel.

9. The channel estimation method as claimed in claim 8, wherein a transmission rate of said data channel differs from a transmission rate of said pilot channel.

10. A demodulation method comprising:

the step of obtaining N channel estimation values by time-weighting and averaging pilot signals using, in each finger, N (N is a natural number greater than or equal to 2) predetermined weighting sequences in N channel estimation units, each of the N channel estimation units using one of the N predetermined weighting sequences;

the step of compensating N data sequences using said respective N said channel estimation values in each of the fingers;

the step of RAKE combining each of the N data sequences after said compensation at the step of compensating with signals from other fingers, thereby producing N RAKE combined data sequences; and the reliability judgment step of selecting one RAKE combined data sequence having the highest reliability from among the N RAKE combined data sequences after said step of RAKE combining.

* * * * *